(12) United States Patent
Enomoto et al.

(10) Patent No.: US 7,894,374 B2
(45) Date of Patent: Feb. 22, 2011

(54) NETWORK SYSTEM, SPANNING TREE CONFIGURATION METHOD, SPANNING TREE CONFIGURATION NODE, AND SPANNING TREE CONFIGURATION PROGRAM

(75) Inventors: Nobuyuki Enomoto, Tokyo (JP); Masaki Umayabashi, Tokyo (JP); Youichi Hidaka, Tokyo (JP); Atsushi Iwata, Tokyo (JP); Makoto Shibutani, Tokyo (JP)

(73) Assignee: NEC Corporation, Tokyo (JP)

( * ) Notice: Subject to any disclaimer, the term of this patent is extended or adjusted under 35 U.S.C. 154(b) by 1986 days.

(21) Appl. No.: 10/642,480

(22) Filed: Aug. 18, 2003

(65) Prior Publication Data

US 2004/0047300 A1    Mar. 11, 2004

(30) Foreign Application Priority Data

Aug. 22, 2002 (JP) .............................. 2002-242621
Feb. 19, 2003 (JP) .............................. 2003-041838

(51) Int. Cl.
*H04L 12/28* (2006.01)

(52) U.S. Cl. ....................................... 370/256; 370/408
(58) Field of Classification Search ................. 370/225, 370/254–256, 395.53, 408, 407; 709/223, 709/235, 238, 253, 252
See application file for complete search history.

(56) References Cited

U.S. PATENT DOCUMENTS

| | | | |
|---|---|---|---|
| 4,811,337 A * | 3/1989 | Hart ............................ | 370/256 |
| 5,606,669 A | 2/1997 | Bertin et al. | |
| 5,630,184 A | 5/1997 | Roper et al. | |
| 6,105,018 A * | 8/2000 | Demers et al. ................. | 707/2 |
| 6,154,463 A * | 11/2000 | Aggarwal et al. ........... | 370/408 |
| 6,189,043 B1 * | 2/2001 | Buyukkoc et al. ........... | 709/241 |
| 6,535,491 B2 * | 3/2003 | Gai et al. ..................... | 370/256 |
| 6,574,197 B1 | 6/2003 | Kanamaru et al. | |
| 6,674,558 B1 * | 1/2004 | Chang et al. .................. | 398/49 |
| 6,868,086 B1 | 3/2005 | Putzolu et al. | |
| 6,879,588 B1 | 4/2005 | Malalur | |
| 6,934,263 B1 * | 8/2005 | Seaman ....................... | 370/256 |
| 6,938,075 B1 | 8/2005 | Abbott et al. | |
| 6,963,575 B1 * | 11/2005 | Sistanizadeh et al. ....... | 370/404 |
| 7,177,946 B1 | 2/2007 | Kaluve et al. | |
| 7,203,743 B2 * | 4/2007 | Shah-Heydari ............. | 709/223 |

(Continued)

FOREIGN PATENT DOCUMENTS

CN            1264077 A       8/2000

(Continued)

OTHER PUBLICATIONS

Japanese Office Action dated Mar. 7, 2005, with partial English translation.

(Continued)

*Primary Examiner*—Pankaj Kumar
*Assistant Examiner*—Saba Tsegaye
(74) *Attorney, Agent, or Firm*—McGinn Intellectual Property Law Group, PLLC

(57) ABSTRACT

A node that configures a spanning tree over a network to which a plurality of nodes are connected generates a tree after a cost change using another LAN while continuing to operate the tree that existed before the change, and switches the tree that is used for forwarding after the new tree has been stable.

24 Claims, 40 Drawing Sheets

U.S. PATENT DOCUMENTS

| | | |
|---|---|---|
| 7,257,086 B2 | 8/2007 | Brown et al. |
| 7,428,237 B1 | 9/2008 | Gai et al. |
| 2001/0021177 A1* | 9/2001 | Ishii .......................... 370/256 |
| 2001/0025318 A1* | 9/2001 | Higashiyama .............. 709/238 |
| 2002/0181412 A1 | 12/2002 | Shibasaki |
| 2004/0027995 A1* | 2/2004 | Miller et al. ................ 370/254 |
| 2004/0062209 A1* | 4/2004 | Goldman et al. ........... 370/256 |

FOREIGN PATENT DOCUMENTS

| | | |
|---|---|---|
| JP | 7-327042 | 12/1995 |
| JP | 11-168491 | 6/1999 |
| JP | 2001-111616 | 4/2001 |
| JP | 2001-257704 | 9/2001 |
| JP | 2002-353987 | 12/2002 |
| JP | 2003-298606 | 10/2003 |
| JP | 2004-526365 | 8/2004 |
| WO | WO 2004/075486 A1 | 9/2004 |

OTHER PUBLICATIONS

Japanese Office Action dated Jun. 1, 2007, with partial English-language translation.

Chinese Office Action dated Feb. 5, 2010 with English translation thereof.

Lusheng Ji et al., "Differential Destination Multicast-A MANET Multicast Routing Protocol for Small Groups" IEEE INFOCOM 2001, pp. 1192-1201.

Office Action dated Mar. 5, 2010 in U.S. Appl. No. 12/073,331.

* cited by examiner

FIG. 5

| MAC DA (2201) |
|---|
| MAC SA (2202) |
| TAG AREA (2203) |
| Type (2204) |
| Protocol Identifier (22051) |
| Protocol Version identifier (22052) |
| BPDU Type (22053) |
| Flags (22054) |
| Root Identifier (22055) |
| Root Path Cost (22056) |
| Bridge Identifier (22057) |
| PORT Identifier (22058) |
| Message Age (22059) |
| MAX Age (2205A) |
| Hello Time (2205B) |
| Forward Delay (2205C) |
| FCS (2206) |

BPDU AREA (2205) spans from Protocol Identifier (22051) through Forward Delay (2205C).

117

| DESTINATION MAC ADDRESS 1171 | INSERTION TAG 1172 |
|---|---|
| VALUE REPRESENTING ALL THE NODES ON THE ENTIRE NETWORK | ID OF THE TAG GROUP THAT IS THE CURRENT SYSTEM NOW |

114γ

(VIEW FROM NODE 11)

| TAG 1141 | OUTPUT PORT 1142 |
|---|---|
| 41 | E N D |
| 42 | LINK 21 SIDE |
| 43 | LINK 21 SIDE |
| 44 | LINK 23 SIDE |
| 45 | LINK 23 SIDE |
| 46 | LINK 21 SIDE |

FIG.44

SETTINGS STATUS OF SPANNING TREE 61 (TAG GROUP 41)

| NODE 6101 | ROOT PORT 6102 | TAG 1141 | OUTPUT PORT 1142 |
|---|---|---|---|
| 11 | N/A | 41 | END |
| 12 | LINK 21 SIDE | 41 | LINK 21 SIDE |
| 13 | LINK 22 SIDE | 41 | LINK 22 SIDE |
| 14 | LINK 23 SIDE | 41 | LINK 23 SIDE |
| 15 | LINK 26 SIDE | 41 | LINK 26 SIDE |
| 16 | LINK 27 SIDE | 41 | LINK 21 SIDE |

114β

(VIEW FROM NODE 11)

| TAG 1141 | OUTPUT PORT 1142 | BROADCAST OUTPUT PORT 1144 |
|---|---|---|
| 41 | TAG REMOVE UNIT SIDE (END) | LINK 21 SIDE, LINK 23 SIDE (END) |
| 42 | LINK 21 SIDE | LINK 23 SIDE (END) |
| 43 | LINK 21 SIDE | — (END) |
| 44 | LINK 23 SIDE | LINK 21 SIDE (END) |
| 45 | LINK 23 SIDE | — (END) |
| 46 | LINK 21 SIDE | — (END) |

FIG. 48

SETTINGS STATUS OF SPANNING TREE 61 (TAG GROUP 41)

| NODE 6101 | ROOT PORT 6102 | DESIGNATED PORT 6104 | TAG 1141 | OUTPUT PORT 1142 | BROADCAST OUTPUT PORT 1144 |
|---|---|---|---|---|---|
| 11 | N/A | LINK 21 SIDE, LINK 23 SIDE | 41 | TAG REMOVE UNIT SIDE | LINK 21 SIDE, LINK 23 SIDE |
| 12 | LINK 21 SIDE | LINK 22 SIDE | 41 | LINK 21 SIDE | LINK 22 SIDE |
| 13 | LINK 22 SIDE | N/A | 41 | LINK 22 SIDE | — |
| 14 | LINK 23 SIDE | LINK 26 SIDE | 41 | LINK 23 SIDE | LINK 26 SIDE |
| 15 | LINK 26 SIDE | LINK 27 SIDE | 41 | LINK 26 SIDE | LINK 27 SIDE |
| 16 | LINK 27 SIDE | N/A | 41 | LINK 27 SIDE | — |

114α

(VIEW FROM NODE 12)

| TAG 1141 | ROOT PORT 1142 | AUXILIARY OUTPUT PORT 1143 |
|---|---|---|
| 41 | LINK 21 SIDE | LINK 24 SIDE |
| 42 | E N D | E N D |
| 43 | LINK 22 SIDE | LINK 24 SIDE |
| 44 | LINK 21 SIDE | LINK 24 SIDE |
| 45 | LINK 24 SIDE | LINK 21 SIDE (OR 22) |
| 46 | LINK 22 SIDE | LINK 24 SIDE |

FIG.52

SETTINGS STATUS OF SPANNING TREE 61 (TAG GROUP 41)

| NODE 6101 | ROOT PORT 6102 | ALTERNATE PORT 6103 | TAG 1141 | OUTPUT PORT 1142 | AUXILIARY OUTPUT PORT 1143 |
|---|---|---|---|---|---|
| 11 | N/A | N/A | 41 | TAG REMOVE UNIT SIDE | — |
| 12 | LINK 21 SIDE | LINK 24 SIDE | 41 | LINK 21 SIDE | LINK 24 SIDE |
| 13 | LINK 22 SIDE | N/A | 41 | LINK 22 SIDE | — |
| 14 | LINK 23 SIDE | N/A | 41 | LINK 23 SIDE | — |
| 15 | LINK 26 SIDE | LINK 24 SIDE | 41 | LINK 26 SIDE | LINK 24 SIDE |
| 16 | LINK 27 SIDE | N/A | 41 | LINK 27 SIDE | — |

NETWORK SYSTEM, SPANNING TREE CONFIGURATION METHOD, SPANNING TREE CONFIGURATION NODE, AND SPANNING TREE CONFIGURATION PROGRAM

BACKGROUNDS OF THE INVENTION

1. Field of the Invention

The present invention relates to a network system, and, more specifically, to a network system, a spanning tree configuration method, and a spanning tree configuration node that prevent a network from stopping at the time of reconfiguration of the spanning tree, and further have a load distribution function.

2. Description of the Related Art

Conventionally, this type of spanning tree has been used to prevent data from circulating permanently in a network arranged in the form of a loop (ring).

For example, in a standardization document issued by IEEE, titled "1998 IEEE Std 802.1D", a control technique referred to as a spanning tree is specified, in which, in order to prevent data from circulating permanently in a network arranged in the form of a loop (ring), a logically tree-like topology is formed by exchanging control information referred to as Bridge Protocol Data Unit (BPDU) between nodes, and logically disabling a portion of the network which is physically loop-like. This is assumed as conventional technology 1.

Moreover, in the standardization document issued by IEEE, titled "2001 IEEE Std 802.1w", a control technique referred to as a high-speed spanning tree is specified, which accelerates tree creation with the conventional technology 1 by extending a method to exchange the control information, further, rapidly sets up a detour path in the event of a failure by presetting the detour path. This is assumed as conventional technology 2.

Problems such as those described below existed with the conventional technologies mentioned above.

First, there was the problem that, due to congestion, delayed arrival and loss of frames occurred.

With the conventional technology 1, since the spanning tree was stopped and reconstructed from the beginning at the time of addition/remove of nodes and links that belong to the spanning tree, due to the fact that the entire network was stopped for an extended time during reconstruction and congestion occurred, such that sometimes arrival of frames was delayed or frames were lost.

With the conventional technology 2, since the spanning tree was reconstructed gradually while forwarding of a data frame was stopped locally at the time of addition/remove of nodes and links that belong to the spanning tree, a portion of the network was stopped and congested during reconstruction, such that sometimes arrival of frames was delayed or frames were lost.

Second, there was the problem that the network stopped at the time of reconfiguration of the spanning tree, such as addition/remove of nodes that belong to the spanning tree.

With the conventional technology 1, since the spanning tree was stopped and reconstructed from the beginning at the time of addition/remove of nodes that belong to the spanning tree, sometimes the entire network stopped for a long time during reconstruction.

With the conventional technology 2, since the spanning tree was reconstructed gradually while forwarding of data frame was stopped locally at the time of addition/remove of nodes that belong to the spanning tree, sometimes a portion of the network was stopped during reconstruction.

Third, there was the problem that the traffic load could not be distributed.

With the conventional technologies 1 and 2, since the cost was calculated using link capacity and used to select a path at the time of spanning tree construction, it was impossible to change the path for dynamic load distribution according to the traffic.

Fourth, there was the problem that due to reconfiguration of the spanning tree, the network stopped when attempting load distribution.

With the conventional technology 1, when attempting to vary the cost dynamically according to the traffic status, the spanning tree was stopped temporarily and reconstructed to change the path, such that sometimes the entire network stopped for an extended time during reconstruction.

With the conventional technology 2, when attempting to vary the cost dynamically according to the traffic status, a portion of the spanning tree was reconstructed gradually to change the path while forwarding of the data frame was stopped locally, such that sometimes a portion of the network stopped during reconstruction.

Fifth, there was the problem that the path with the minimum cost to a destination was not always selected.

With the conventional technologies 1 and 2, since only one system of spanning tree was set up on the network and only one root node was defined on the network by a priority value and a MAC address, which were preset for each node, to create a single tree, when nodes located at the ends of the tree communicated with each other, sometimes, even if a different, shortest path existed, it was blocked and a lengthy path was taken.

Sixth, there was the problem that the load concentrated in the vicinity of the root node while the link utilization rate was low.

With the conventional technologies 1 and 2, since only one system of spanning tree was set up on the network and only one root node was defined on the network by a priority value and a MAC address, which were preset for each node, to create a single tree, the links not used even though they are located at the ends of the tree appeared, reducing the link utilization rate. On the contrary, sometimes the traffic concentrated in the vicinity of the root node, increasing the possibility of occurrence of congestion.

Seventh, there was the problem that tree construction in the event of a root node failure took time, the network being stopped during that period.

With the conventional technology 1, since only one system of spanning tree was set up on the network and there was only one root node, if a failure occurred at the root node, the spanning tree was stopped and reconstructed from the beginning, such that sometimes the entire network was stopped for an extended time during reconstruction.

With the conventional technology 2, if a failure occurred at the root node, the spanning tree was reconstructed gradually while forwarding of the data frame was stopped locally, such that sometimes a portion of the network was stopped during reconstruction.

Eighth, there was the problem that in the section using IEEE 802.1D, switching of the route was slow in the event of a failure, also taking a long time to reconfigure the spanning tree.

This is because, with the conventional technology 1, it sometimes took several tens of seconds until data could be exchanged at the time of construction of the tree.

Furthermore, ninth, with the conventional technologies 1 and 2, since there was only a single tree, the traffic concentrated and congested in the vicinity of the root node, such that sometimes arrival of frames was delayed or frames were lost.

SUMMARY OF THE INVENTION

The first purpose of the present invention is to provide a network system, a spanning tree configuration method, a spanning tree configuration node, and a spanning tree configuration program, capable of lowering the probability of occurrence of congestion and reducing the frequency with which delayed arrival or loss of frames occurs due to congestion.

The second purpose of the present invention is to provide a network system, a spanning tree configuration method, a spanning tree configuration node, and a spanning tree configuration program, capable of reconfiguring a spanning tree, such as performing addition/remove of a node that belongs to the spanning tree, without stopping the network.

The third purpose of the present invention is to provide a network system, a spanning tree configuration method, a spanning tree configuration node, and a spanning tree configuration program, capable of distributing the traffic load.

The fourth purpose of the present invention is to provide a network system, a spanning tree configuration method, a spanning tree configuration node, and a spanning tree configuration program, capable of distributing the load, without stopping the network for spanning tree reconfiguration that accompanies a path change.

The fifth purpose of the present invention is to provide a network system, a spanning tree configuration method, a spanning tree configuration node, and a spanning tree configuration program in which a path with the minimum cost to a destination is selected.

The sixth purpose of the present invention is to provide a network system, a spanning tree configuration method, a spanning tree configuration node, and a spanning tree configuration program, capable of increasing the utilization ratio of a link, and distributing the load without concentrating the load in the vicinity of the root node.

The seventh purpose of the present invention is to provide a network system, a spanning tree configuration method, a spanning tree configuration node, and a spanning tree configuration program, capable of circumventing a network halt due to a root node failure.

The eighth purpose of the present invention is to provide a network system, a spanning tree configuration method, a spanning tree configuration node, and a spanning tree configuration program, capable of preventing the spanning tree from being set up by passing through the IEEE802.1D-using section, speeding up switching and route changes in the event of a failure, and reducing the possibilities of occurrence of congestion and loss of a frame.

According to the first aspect of the invention, a node that configures a spanning tree over a network to which a plurality of nodes are connected, comprising generating a new spanning tree after a network configuration change while continuing to operate the spanning tree that existed before the configuration change, and switching the spanning tree to be used for forwarding to the new spanning tree after the new spanning tree has been stabile.

According to the second aspect of the invention, a node that configures a spanning tree over a network to which a plurality of nodes are connected, comprising generating, at the time of a link cost change of the network, a new spanning tree after the cost change while continuing to operate an existing spanning tree, and switching the spanning tree to be used for forwarding to the new spanning tree after the new spanning tree has been stable.

According to another aspect of the invention, a node that configures a spanning tree over a network to which a plurality of nodes are connected, comprising a plurality of tree managers that generate a plurality of independently operating spanning trees, a tag table that returns a tag corresponding to the spanning tree that is used for forwarding, a tag insertion unit that inserts the tag that has been returned from the tag table into a frame, a tree selector that determines the spanning tree used for forwarding, a forwarding table in which a forwarding output destination of the frame is recorded by destination, a frame forwarding unit that forwards the frame to the forwarding output destination that is specified in the forwarding table, and a separator that determines the tree manager of the forwarding destination of the frame according to the tag.

According to another aspect of the invention, a node that configures a spanning tree over a network to which a plurality of nodes are connected, comprising generating a spanning tree in which each node in the network serves as a root node, and forwarding a frame (frames) using a spanning tree in which the destination serves as a root node.

According to another aspect of the invention, a node that configures a spanning tree over a network to which a plurality of nodes are connected, comprising a plurality of tree managers that generate a plurality of independently operating spanning trees, a tag table that returns a tag corresponding to the spanning tree that is used for forwarding, a tag insertion unit that inserts the tag that has been returned from the tag table into a frame, a tree selector that generates as many tree managers as the number of root nodes that exist in the network, a forwarding table in which a forwarding output destination of the frame is recorded by destination, a frame forwarding unit that forwards the frame to the forwarding output destination that is specified in the forwarding table, and a separator that determines the tree manager of the forwarding destination of the frame according to the tag.

According to another aspect of the invention, a node that configures a spanning tree over a network to which a plurality of nodes are connected wherein a tree manager that generates the spanning tree comprises a cost operator that adjusts a cost value based on the type and the version of a spanning tree protocol.

According to another aspect of the invention, a node that configures a spanning tree over a network to which a plurality of nodes are connected, comprising generating a spanning tree in which the cost of each link is maximum for each link that exists in the network and that uses a protocol whose operation is slow and in case a failure occurs at the each link, forwarding a frame using the tree in which the cost of the link is maximum.

According to another aspect of the invention, a node that configures a spanning tree over a network to which a plurality of nodes are connected, comprising a plurality of tree managers that generate a plurality of independently operating spanning trees, a tag table that returns a tag corresponding to the tree that is used for forwarding, a tag insertion unit that inserts the tag that has been returned from the tag table into a frame, a tree selector that generates as many tree managers as the number of links that exist in the network and use a protocol whose operation is slow, a forwarding table in which a forwarding output destination of the frame is recorded by destination, a frame forwarding unit that forwards the frame to the forwarding output destination that is specified in the forwarding table, and a separator that determines the tree manager of the forwarding destination according to the tag.

According to another aspect of the invention, a network system in which a forwarding path is set by a spanning tree over a network to which a plurality of nodes are connected wherein each of the nodes generates a new spanning tree after a network configuration change while continuing to operate the spanning tree that existed before the configuration change, and switches the spanning tree to be used for forwarding to the new spanning tree after the new spanning tree has been stable.

According to another aspect of the invention, a network system in which a forwarding path is set by a spanning tree over a network to which a plurality of nodes are connected wherein each of the nodes generates, at the time of a link cost change of the network, a new spanning tree after the cost change while continuing to operate an existing spanning tree, and switches the spanning tree to be used for forwarding to the new spanning tree after the new spanning tree has been stable.

According to another aspect of the invention, a network system in which a forwarding path is set by a spanning tree over a network to which a plurality of nodes are connected wherein each of the nodes comprises a plurality of tree managers that generate a plurality of independently operating spanning trees, a tag table that returns a tag corresponding to the spanning tree that is used for forwarding, a tag insertion unit that inserts the tag that has been returned from the tag table into a frame, a tree selector that determines the spanning tree used for forwarding, a forwarding table in which a forwarding output destination of the frame is recorded by destination, a frame forwarding unit that forwards the frame to the forwarding output destination that is specified in the forwarding table, and a separator that determines the tree manager of the forwarding destination of the frame according to the tag.

According to another aspect of the invention, a network system in which a forwarding path is set by a spanning tree over a network to which a plurality of nodes are connected, comprising generating a spanning tree in which each node in the network serves as a root node, and forwarding a frame using a tree in which the destination serves as a root node.

According to another aspect of the invention, a network system in which a forwarding path is set by a spanning tree over a network to which a plurality of nodes are connected, comprising a plurality of tree managers that generate a plurality of independently operating spanning trees, a tag table that returns a tag corresponding to the tree that is used for forwarding, a tag insertion unit that inserts the tag that has been returned from the tag table into a frame, a tree selector that generates as many tree managers as the number of nodes that exist in the network, a forwarding table in which a forwarding output destination of the frame is recorded by destination, a frame forwarding unit that forwards the frame to the forwarding output destination that is specified in the forwarding table, and a separator that determines the tree manager of the forwarding destination of the frame according to the tag.

According to another aspect of the invention, a network system in which a forwarding path is set by a spanning tree over a network to which a plurality of nodes are connected wherein a tree manager that generates the spanning tree executes a cost operation processing that adjusts a cost value based on the type and the version of a spanning tree protocol.

According to another aspect of the invention, a network system in which a forwarding path is set by a spanning tree over a network to which a plurality of nodes are connected wherein a tree manager that generates the spanning tree comprises a cost operator that adjusts a cost value based on the type and the version of a spanning tree protocol.

According to another aspect of the invention, a network system in which a forwarding path is set by a spanning tree over a network to which a plurality of nodes are connected, comprising generating a spanning tree in which the cost of each link is maximum for each link that exists in the network and that uses a protocol whose operation is slow and in case a failure occurs at the each link, forwarding a frame using the tree in which the cost of the link is maximum.

According to another aspect of the invention, a network system in which a forwarding path is set by a spanning tree over a network to which a plurality of nodes are connected, comprising a plurality of tree managers that generate a plurality of independently operating spanning trees, a tag table that returns a tag corresponding to the tree that is used for forwarding, a tag insertion unit that inserts the tag that has been returned from the tag table into a frame, a tree selector that generates as many tree managers as the number of links that exist in the network and use a protocol whose operation is slow, a forwarding table in which a forwarding output destination of the frame is recorded by destination, a frame forwarding unit that forwards the frame to the forwarding output destination that is specified in the forwarding table, and a separator that determines the tree manager of the forwarding destination of the frame according to the tag.

According to another aspect of the invention, a spanning tree configuration method in a network to which a plurality of nodes are connected, comprising the steps of generating a new spanning tree after a network configuration change while continuing to operate the spanning tree that existed before the configuration change, and switching the spanning tree to be used for forwarding to the new spanning tree after the new spanning tree has been stable.

According to another aspect of the invention, a spanning tree configuration method in a network to which a plurality of nodes are connected, comprising the steps of generating, at the time of a link cost change of the network, a new spanning tree after the cost change while continuing to operate an existing spanning tree, and switching the spanning tree to be used for forwarding to the new spanning tree after the new spanning tree has been stable.

According to another aspect of the invention, a spanning tree configuration method in a network to which a plurality of nodes are connected, comprising the step of making a new node participate in an auxiliary spanning tree only, not in an existing spanning tree, when adding the new node.

According to another aspect of the invention, a spanning tree configuration method in a network to which a plurality of nodes are connected, comprising the step of making a removing node participate in an existing spanning tree only, not in an auxiliary spanning tree, when removing the node.

According to another aspect of the invention, a spanning tree configuration method in a network to which a plurality of nodes are connected, comprising the step of creating a tree after a change using an auxiliary system, when a network configuration has changed.

According to another aspect of the invention, a spanning tree configuration method in a network to which a plurality of nodes are connected, comprising the step of using a link free bandwidth to calculate a cost.

According to another aspect of the invention, a spanning tree configuration method in a network to which a plurality of nodes are connected, comprising the step of creating a plurality of spanning trees so that all the nodes in the network serve as the root node of any one spanning tree among the spanning trees that have all the nodes as members.

According to another aspect of the invention, a spanning tree configuration method in a network to which a plurality of nodes are connected, comprising the steps of creating spanning trees that have all the nodes that exist in the network as members, and, among them, creating a plurality of spanning trees for each link that uses a protocol whose failure recovery is slow.

According to another aspect of the invention, method of forming a logical topology that is used for signal transmission in a network to which a plurality of nodes are connected, comprising the steps of generating a logical topology after a network configuration change with the signal transmission being performed using the logical topology that existed before the network configuration change, and after the logical topology after the configuration change has been stable, switching the logical topology to be used for signal transmission to the logical topology after the configuration change.

According to another aspect of the invention, a node comprising a element which generates a logical topology after a network configuration change, when changing the configuration of a network to which it belongs itself, with the signal transmission being performed using the logical topology in the network, and a element which switches, after the logical topology after the configuration change has been stable, the logical topology to be used for signal transmission to the logical topology after the configuration change.

According to another aspect of the invention, a network system to which a plurality of nodes are connected, comprising generating a logical topology after a network configuration change with the signal transmission being performed using the logical topology that existed before the network configuration change, and after the logical topology after the configuration change has been stable, switching the logical topology to be used for signal transmission to the logical topology after the configuration change.

According to another aspect of the invention, a node comprising a element which generates a correspondence between the information on a destination, which a frame to be entered retains, and a forwarding destination of the frame using a spanning tree protocol, and a element which refers to the correspondence to determine the forwarding destination of the frame that has been entered.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 5 is a format diagram illustrating a frame configuration of a Configuration BPDU frame in the present invention;

FIG. 44 is a table illustrating an example of setting status of a tree 61 in the eighth embodiment of the present invention;

FIG. 48 is a table illustrating an example of setting status of a tree 61 in the ninth embodiment of the present invention;

FIG. 52 is a table illustrating an example of setting status of a tree 61 in the tenth embodiment of the present invention;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the following description, although a description will be given using a tag as an identifier that identifies a plurality of spanning trees and a plurality of node groups, the tag means a single one, or any one or more combinations among the expansion tags disclosed in Japanese Patent Application No. 2002-204673 by the patent applicant and other tags or identifying means, in addition to a VLAN tag.

Here, among the tags used in the present invention, the format of an expansion tagged frame disclosed in the Japanese Patent Application No. 2002-204673 will be described.

Figure 1:
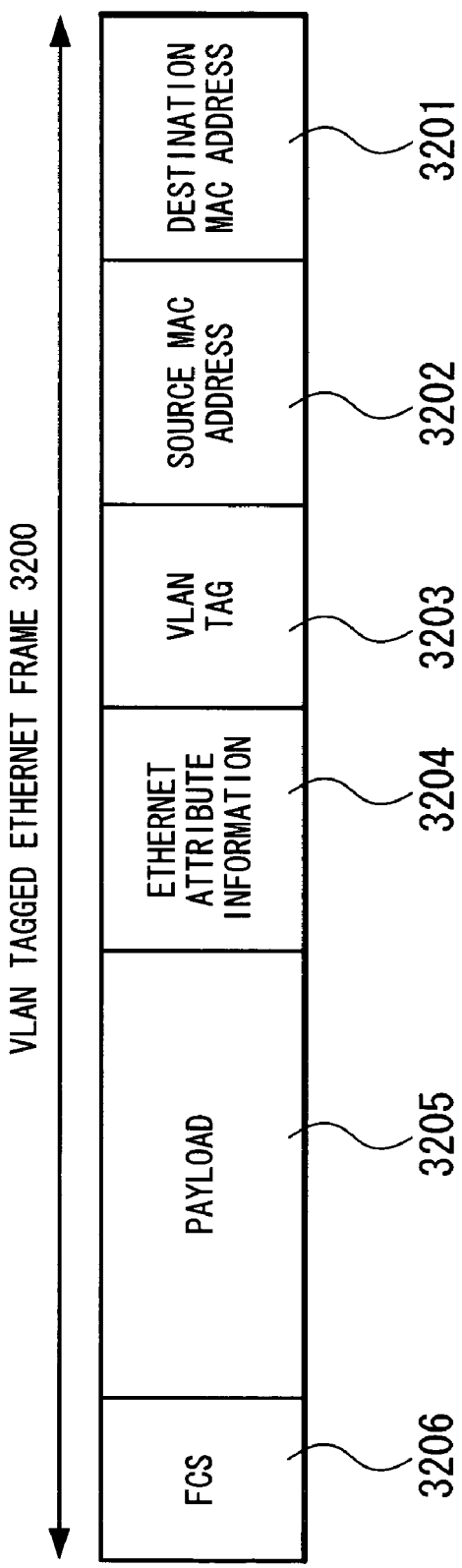
FIG. 1 is a diagram illustrating a configuration example of a VLAN tagged Ethernet frame of the prior art.

FIG. 1 shows the format of a VLAN tagged Ethernet frame specified in IEEE 802.1Q. The VLAN tagged Ethernet frame 3200 consists of a destination MAC address 3201, a source MAC address 3202, a VLAN tag 3203, an Ethernet attribute information 3204, a payload 3205, and an FCS 3206.

Figure 2:
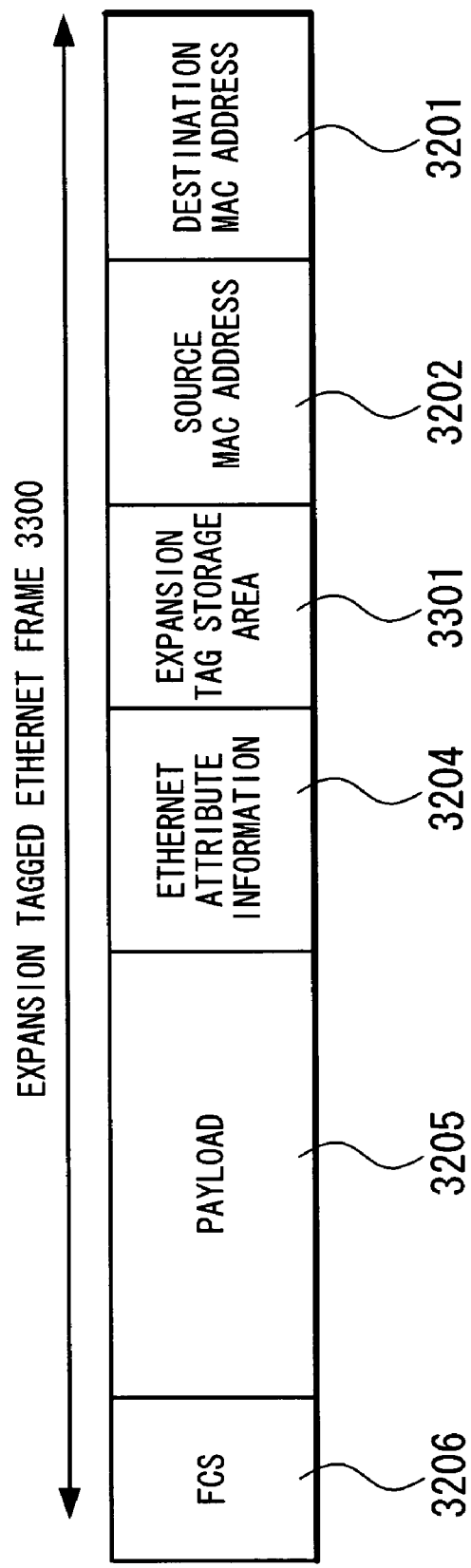
FIG. 2 is a diagram illustrating a configuration example of an expansion tagged Ethernet frame of the present invention.

On the other hand, FIG. 2 shows the format of an expansion tagged Ethernet frame of the present invention. The expansion tagged Ethernet frame 3300 consists of the destination MAC address 3201, the source MAC address 3202, an expansion tag storage area 3301, the Ethernet attribute information 3204, the payload 3205, and the FCS 3206, in which the VLAN tag 3203 of the existing VLAN tagged Ethernet frame 3200 is replaced by the expansion tag storage area 3301.

Figure 3:
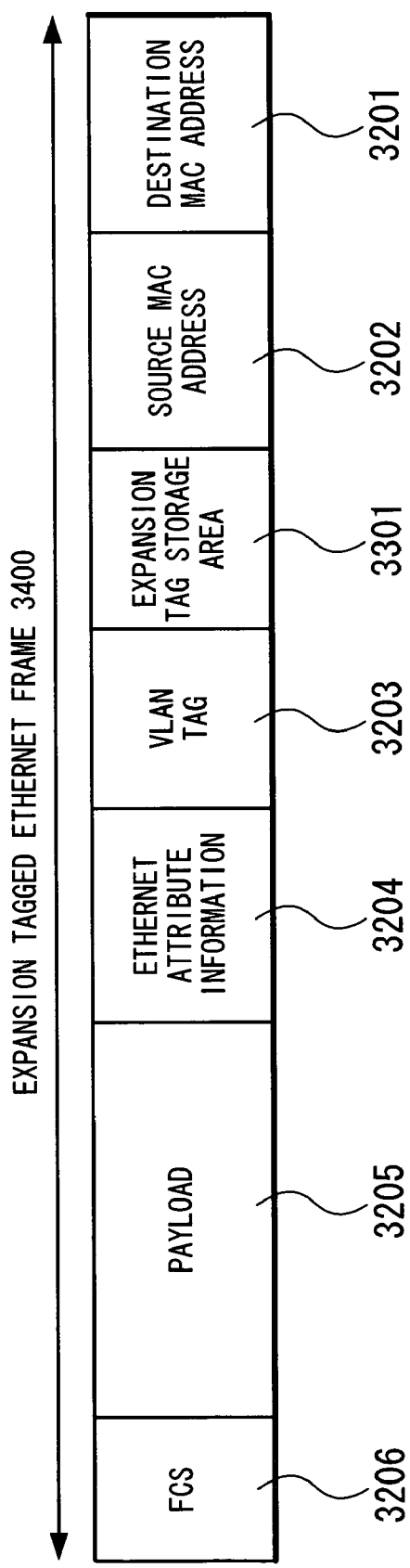
FIG. 3 is a diagram illustrating another configuration example of an expansion tagged Ethernet frame of the present invention.

Moreover, as shown in FIG. 3, an expansion tagged Ethernet frame 3400 also exists with another configuration, and consists of the destination MAC address 3201, the source MAC address 3202, the expansion tag storage area 3301, the VLAN tag 3203, the Ethernet attribute information 3204, the payload 3205, and the FCS 3206, in which the expansion tag storage area 3301 is inserted after the source MAC address 3202.

One or more expansion tags can be stored in the expansion tag storage area 3301. The size of the expansion tag is 4 bytes, which is the same size as the VLAN tag 3203. The topmost expansion tag of the expansion tagged Ethernet frames 3300 and 3400 and the VLAN tag of the VLAN tagged Ethernet frame 3200 are stored at the same position with the same size, and they are distinguished by changing the values stored in the upper 2 bytes of each tag (the details will be given later).

The expansion tagged Ethernet frames 3300 and 3400 are thus compatible with the VLAN tagged Ethernet frame 3200, and can be processed in both the existing nodes and the expansion tag handling nodes.

Figure 4:
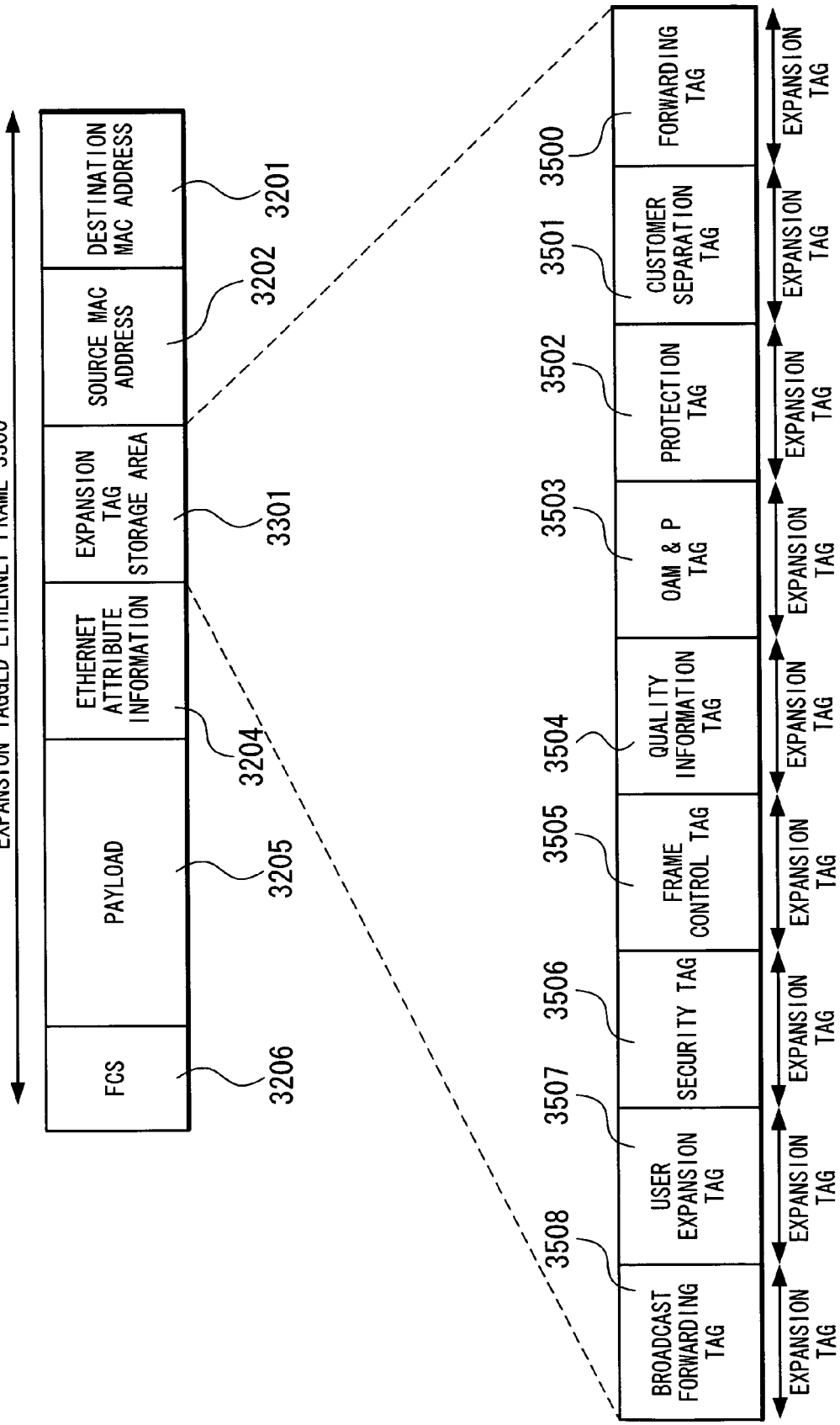
FIG. 4 is a diagram illustrating a configuration example of an expansion tag storage area of the present invention.

FIG. 4 shows the expansion tag storage area 3301. In the storage example shown in FIG. 4, eight expansion tags 3500-3507 are stored.

An identifier of the destination node or a label (e.g. MPLS label) to the destination is stored in a forwarding tag 3500. An identifier of the source node may also be stored in addition to the forwarding tag 3500 in which the identifier of the destination node is stored. Each node determines the forwarding destination of a frame by referring to the forwarding tag. The forwarding tag 3500 is always stored in the expansion tagged Ethernet frames 3300 and 3400.

As far as types of expansion tag are concerned, a customer separation tag 3501, a protection tag 3502, an OAM & P tag 3503, a quality information tag 3504, a frame control tag 3505, a security tag 3506, and a user expansion tag 3507 are stored.

An identifier for separating information for each customer accommodated in each node is stored in the customer separation tag 3501. As far as customers are concerned, customers to whom the same VLAN belongs may be treated as the same customer, customers accommodated in specific ports of two or more nodes may be treated as the same customer, or two or more hosts connected to the node in the net may be treated as the same customer. A separation identifier is assigned to these customers, and the separation identifier is stored in the customer separation tag 3501 of the frames from each customer. By identifying customers with the customer separation tag 3501, added services for each customer (e.g. priority control with respect to a specific customer) can be offered. Moreover, a plurality of customer separation tags 3501 can also be stacked for use. In this case, the number of separable customers can be increased substantially. In addition, when stacking customer separation tags 3501, the customer separation tag 3501 stacked at the last stage uses a special customer separation tag that indicates that it is the last stage.

Fault information in the event of a failure and detour path information for recovery from the failure are stored in the protection tag 3502. Operation/management information is stored in the OAM & P tag 3503.

Quality information such as delay, jitter, a packet loss ratio, time stamp which indicates the time of inflow of the frame into the network, and band control information are stored in the quality information tag 3504. If the time stamp value is stored in the quality information tag 3504, the node which receives the frame can calculate the delay within the net (time of stay in the network) of the frame from the current time and the time stamp value. If a guaranteed value of the delay within the net is specified, priority processing can be performed so as to achieve the guaranteed value. Moreover, if band control information such as a requested band, the amount of accumulated data, or a traffic class is stored in the quality information tag 3504, by considering the amount of accumulated data and the traffic class of the flow and the traffic status of other flows, band control can be performed to secure the requested band.

Information such as a hop counter (TTL: Time To Live) to limit the survival time of the frame in the network or CRC for detecting errors is stored in the frame control tag 3505. If TTL is stored, the TTL value is subtracted for each node through which the frame passes, and the frame is discarded when TTL=0. This prevents the frame from circulating permanently even if the path is looped. If CRC is stored, the CRC calculation result of the expansion tag storage area 3301 at the entrance node is stored, thus, by performing CRC calculation at the exit node again and comparing it with the stored value, errors in the expansion tag storage area 3301 can be detected.

Information for ensuring frame reliability, and confidentiality at the time of network construction and at the time of network configuration change is stored in the security tag 3506. The following examples of utilization of the security tag 3506 may be cited. A security identifier is preset for each customer who communicates in the network, and the identifier is retained in each node the customer connects to. By always storing the set security identifier in the security tag 3506 when each customer forwards a frame, the frames from a malicious customer who tampered with the information in the customer separation tag 3501 can be prevented from being transmitted/received. At the time of the network construction and at the time of network configuration change, a negotiation is performed between nodes to set a common security identifier. By always storing the set security identifier in the security tag 3506 when the frame is forwarded between the nodes, a malicious node can be prevented from being connected to the network.

Any information that a user individually defines is stored in the user expansion tag 3507. Individual definition of the format and the storage information of the tag and its processing contents by the user allows user's own functions to be extended and the flexibility of the network to be improved.

The expansion tags 3501-3507 other than the forwarding tag 3500 are stored if necessary. The forwarding tag 3500 is stored at the head of the expansion tag storage area 3301, and the other expansion tags 3501-3507 are stored behind it. They may be placed at a predetermined, fixed position or at any position, if behind the forwarding tag 3500.

Hereinafter, out of two systems of spanning trees that are present, the spanning tree used to forward a data frame that is newly inserted into the network is referred to as the current tree or current system tree, and the spanning tree which is not the current tree is referred to as the auxiliary tree or the auxiliary system tree.

Moreover, a tree manager that generates a current system tree is referred to as a current system tree manager, and a tree manager that generates an auxiliary system tree is referred to as an auxiliary system tree manager.

A tag group means a group of nodes which is identified using tags and other identifiers, that is, a collection of a plurality of nodes. If the tag group is formed using the VLAN tag as an identifier, the tag group is referred to as VLAN.

BPDU (Bridge Protocol Data Unit) means control data described in IEEE 802.1D (conventional technology 1) and IEEE 802.1w (conventional technology 2), that are exchanged to generate a spanning tree, and the control frame that includes identification information on the current system, the auxiliary system or the like of the present invention.

FIG. 5 is a format diagram illustrating the structure of a Configuration BPDU frame 2205 described in IEEE 802.1D (conventional technology 1) and IEEE 802.1w (conventional technology 2).

MAC DA 2201 is an area in which the destination MAC address is stored.

MAC DA 2202 is an area in which the source MAC address is stored.

Tag area 2203 is an area in which a tag is inserted as an identifier for identifying a plurality of spanning trees. Moreover, although it is not described in the prior art, the tag may be any one or more combinations of the expansion tag disclosed in Japanese Patent Application No. 2002-204673 by the patent applicant, and other tags or identifying means, in addition to the VLAN tag.

Type 2204 is an area in which the type identifier of the frame is stored.

The BPDU area 2205 is an area in which information corresponding to the Configuration BPDU parameters described in IEEE 802.1D (conventional technology 1) and IEEE 802.1w (conventional technology 2) is stored.

FCS 2206 is an area in which a frame check sequence is stored.

Protocol Identifier 22051 is an area in which information equivalent to the Protocol Identifier described in IEEE 802.1D (conventional technology 1) or IEEE 802.1w (conventional technology 2) is stored.

Protocol Version Identifier 22052 is an area in which information equivalent to the Protocol Version Identifier described in IEEE 802.1D (conventional technology 1) or IEEE 802.1w (conventional technology 2) is stored.

BPDU Type 22053 is an area in which information equivalent to the BPDU Type described in IEEE 802.1D (conventional technology 1) or IEEE 802.1w (conventional technology 2) is stored.

Flags 22054 is an area in which information equivalent to the Flags described in IEEE 802.1D (conventional technology 1) or IEEE 802.1w (conventional technology 2) is stored.

Root Identifier 22055 is an area in which information equivalent to the Root Identifier described in IEEE 802.1D (conventional technology 1) or IEEE 802.1w (conventional technology 2) is stored.

Root Path Cost 22056 is an area in which information equivalent to the Root Path Cost described in IEEE 802.1D (conventional technology 1) or IEEE 802.1w (conventional technology 2) is stored.

Bridge Identifier 22057 is an area in which information equivalent to the Bridge Identifier described in IEEE 802.1D (conventional technology 1) or IEEE 802.1w (conventional technology 2) is stored.

Port Identifier 22058 is an area in which information equivalent to the Port Identifier described in IEEE 802.1D (conventional technology 1) or IEEE 802.1w (conventional technology 2) is stored.

Message Age 22059 is an area in which information equivalent to the Message Age described in IEEE 802.1D (conventional technology 1) or IEEE 802.1w (conventional technology 2) is stored.

MAX Age 2205A is an area in which information equivalent to the MAX Age described in IEEE 802.1D (conventional technology 1) or IEEE 802.1w (conventional technology 2) is stored.

Hello Time 2205B is an area in which information equivalent to the Hello Time described in IEEE 802.1D (conventional technology 1) or IEEE 802.1w (conventional technology 2) is stored.

Forward Delay 2205C is an area in which information equivalent to the Forward Delay described in IEEE 802.1D (conventional technology 1) or IEEE 802.1w (conventional technology 2) is stored.

Figure 6:
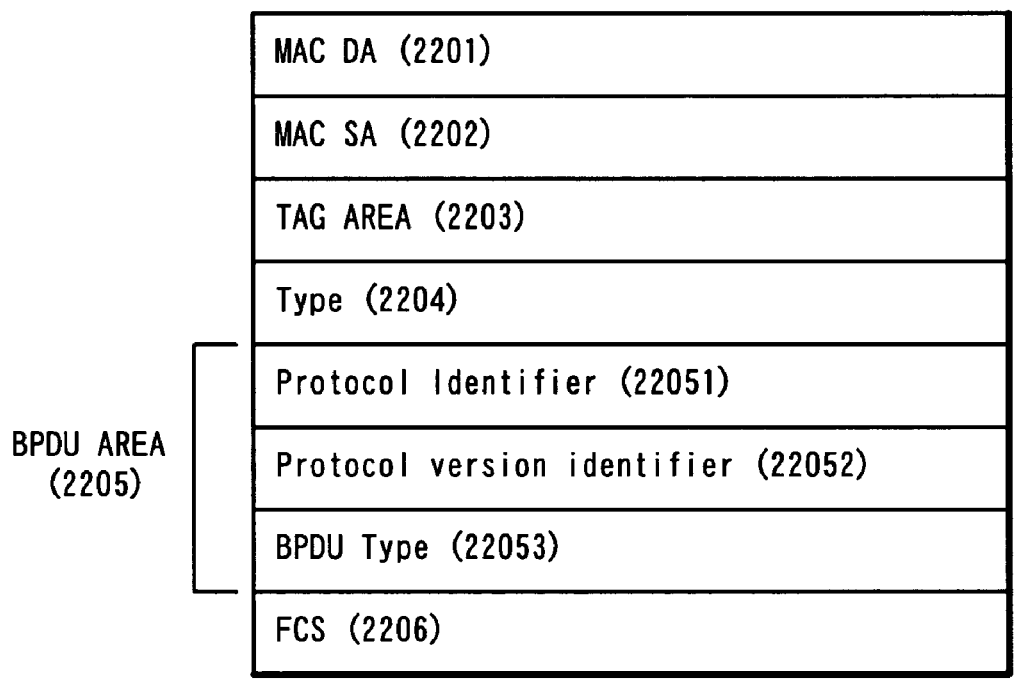
FIG. 6 is a format diagram illustrating the frame configuration of a Topology Change Notification BPDU frame in the present invention.

FIG. 6 is a format diagram illustrating the structure of a Topology Change Notification BPDU frame described in IEEE 802.1D (conventional technology 1) and IEEE 802.1w (conventional technology 2).

MAC DA 2201 is an area in which the destination MAC address is stored.

MAC DA 2202 is an area in which the source MAC address is stored.

Although it is not described in the prior art, tag area 2203 is an area in which a tag is inserted as an identifier for identifying a plurality of spanning trees. The tag may be any one or more combinations of the expansion tag disclosed in the Japanese Patent Application No. 2002-204673, and other tags or identifying means, in addition to the VLAN tag.

Type 2204 is an area in which the type identifier of the frame is stored.

The BPDU area 2205 is an area in which information equivalent to the Topology Change Notification BPDU parameters described in the IEEE 802.1D (conventional technology 1) and the IEEE 802.1w (conventional technology 2) is stored.

FCS 2206 is an area in which a frame check sequence is stored.

GVRP means a control frame which is transmitted/received for managing tag groups, discriminating between the current system and the auxiliary system, and exchanging various setting information between nodes.

The format of the expansion tag frames 3300 and 3400 and other frames will be described in FIG. 53. In addition, hereinafter, the frame format of the expansion tag frames 3500-3508 described in FIG. 4 is referred to as expansion tag frame format (1), and the frame format which will be described below in FIG. 53 is referred to as expansion tag frame format (2).

Figure 53:
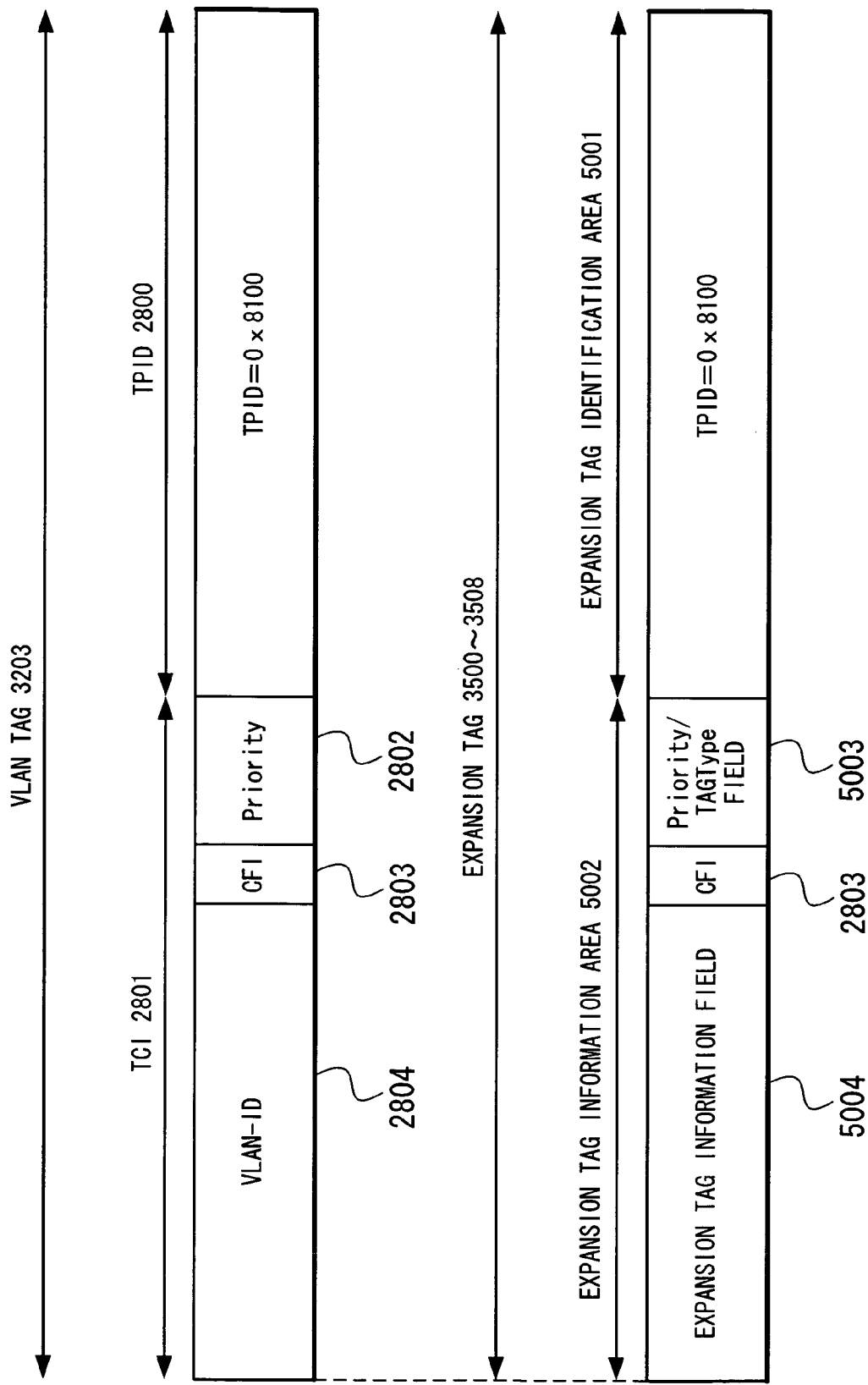
FIG. 53 is a diagram illustrating another configuration example of an expansion frame in the present invention.

The upper portion of FIG. 53 shows a detailed frame format of the VLAN tag 3203. A value of "0x8100" is set to the TPID (Tag Protocol Identifier) 2800. In addition, a value of "0x9100" may be used, although it does not meet the standards. Moreover, the TCI 2801 consists of a Priority field 2802, a CFI 2803, and a VLAN-ID field 2804.

The priority of a frame is stored in the Priority field 2802, and the value of the priority is specified in IEEE 802.1p. Moreover, a value which indicates the presence/absence of special routing information or the type of the format of the MAC address is stored in the CFI, and a VLAN-ID is stored in the VLAN-ID field 2804.

On the other hand, in the expansion tag frame format (2) shown in the lower portion of FIG. 53, the TPID 2800 and the CFI 2803 in the TCI 2801 are the same as the VLAN tag 3203, the Priority field 2802 is changed to a Priority/tag Type field 5003, and the VLAN-ID field 2804 is changed to an expansion tag information field 5004. In addition, the sizes of the corresponding fields are the same.

In the present expansion tag frame format (2), the types of the expansion tags 3500-3508 are stored in the Priority/tag Type field 5003. When the expansion tags 3500-3508 are used, a portion of the Priority values in the Priority field 2802 (IEEE 802.1p) of the existing VLAN tag 3203 is used as the type of the expansion tags 3500-3508 so as to support IEEE 802.1p.

Specifically, 110, 100, 001, 000 are used for the expansion tags 3500-3508, 111 (for reservation), 101 (for interactive multimedia), 011 (for critical application), and 010 (for standard stream) are compatible with IEEE 802.1p.

Therefore, usable expansion tags 3500-3508 are limited to four, for example, the forwarding tag 3500, the broadcast forwarding tag 3508, the customer separation tag 3501, and the OAM & P tag 3503 are used, and the correspondences with the Priority values are 001=forwarding tag 3500, 000=broadcast forwarding tag 3508, 110=customer separation tag 3501, and 110=OAM & P tag 3503. This allows the four expansion tags to be identified, and the four priorities in IEEE 802.1p to be supported. In addition, the selection of the expansion tag that is used, and the setting of the Priority value corresponding thereto are not limited to this example.

Moreover, in the expansion tag frame format (2), information such as address information which meets the tag types of the expansion tags 3500-3508 is stored in the expansion tag information field 5004. For example, the address information of the destination node is stored in the forwarding tag 3500, the address information of the source node is stored in the broadcast forwarding tag 3508, and the identification information of a customer is stored in the customer separation tag 3501.

First Embodiment

Hereafter, a first embodiment of the present invention will be described in detail by referring to the drawings.

Figure 7:
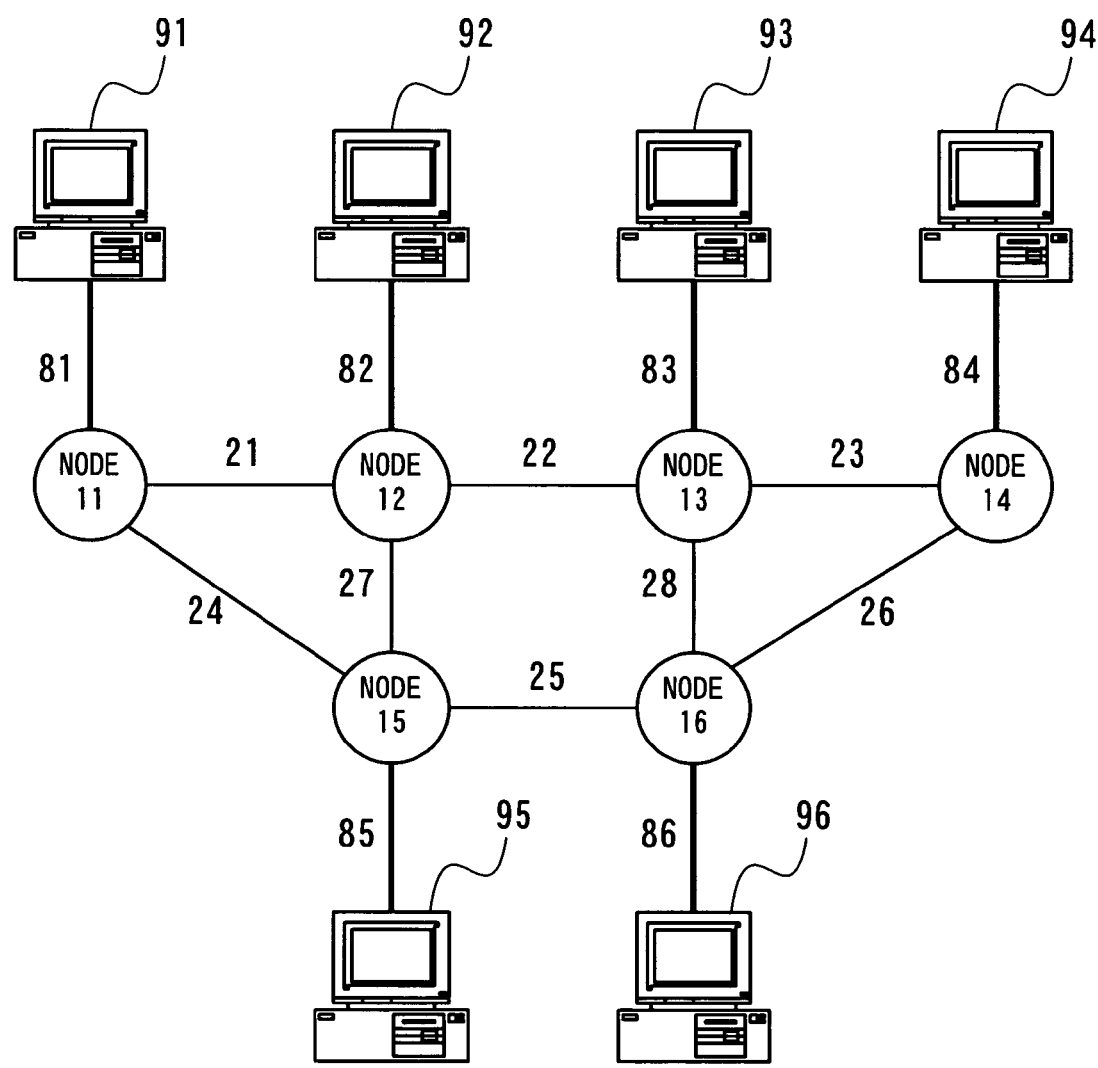
FIG. 7 is a block diagram illustrating the configuration of a first embodiment of the present invention.

Referring to FIG. 7, the first embodiment of the present invention includes nodes 11-16, clients 91-96, links 81-86, and links 21-28.

The node 11 is realized by a program-controlled CPU and the like, and possesses the following functions:

1) forwards a frame that has arrived from the link 21 or the link 24 to the link 24 or the link 21.

2) forwards a frame that has arrived from the link 81 to the link 21 or the link 24, after adding a tag required for forwarding.

3) forwards a frame that has arrived from the link 21 or 24 to the link 81, after removing a tag required for forwarding.

4) transmitting/receiving the control frame between other nodes and itself to configure the spanning tree, and closes the port of the link if necessary.

5) monitors the flow rate of frames that flow through the link.

The nodes 12-16 are the same node as the node 11. Hereafter, although a description will be given using the node 11 as a representative of the nodes 11-16, the description in regard to the node 11 can also be achieved equally for the other nodes 12-16, unless otherwise noted.

The client 91 is a collection of one or more clients, and possesses a function of transmitting/receiving frames between the node 11 and itself through the link 81.

The clients 92-96 are in the same client group as the client 91. Hereafter, although a description will be given using the client 91 as a representative of the clients 91-96, the description in regard to the client 91 is also applicable equally to the other clients 92-96, unless otherwise noted.

The link 81 is a two-way link that connects from the client 91 to the node 11 and from the node 11 to the client 91.

The links 82-86 are the same link as the link 81. Hereafter, although a description will be given using the link 81 as a representative of the links 81-86, the description in regard to the link 81 is also applicable equally to the other links 82-86, unless otherwise noted.

The link 21 is a two-way link that connects from the node 11 to the node 12 and from the node 12 to the node 11.

The links 22-26 are the same link as the link 21. Hereafter, although a description will be given using the link 21 as a representative of the links 21-26, the description in regard to the link 21 is also applicable equally to the other links 22-26, unless otherwise noted.

Figure 8:
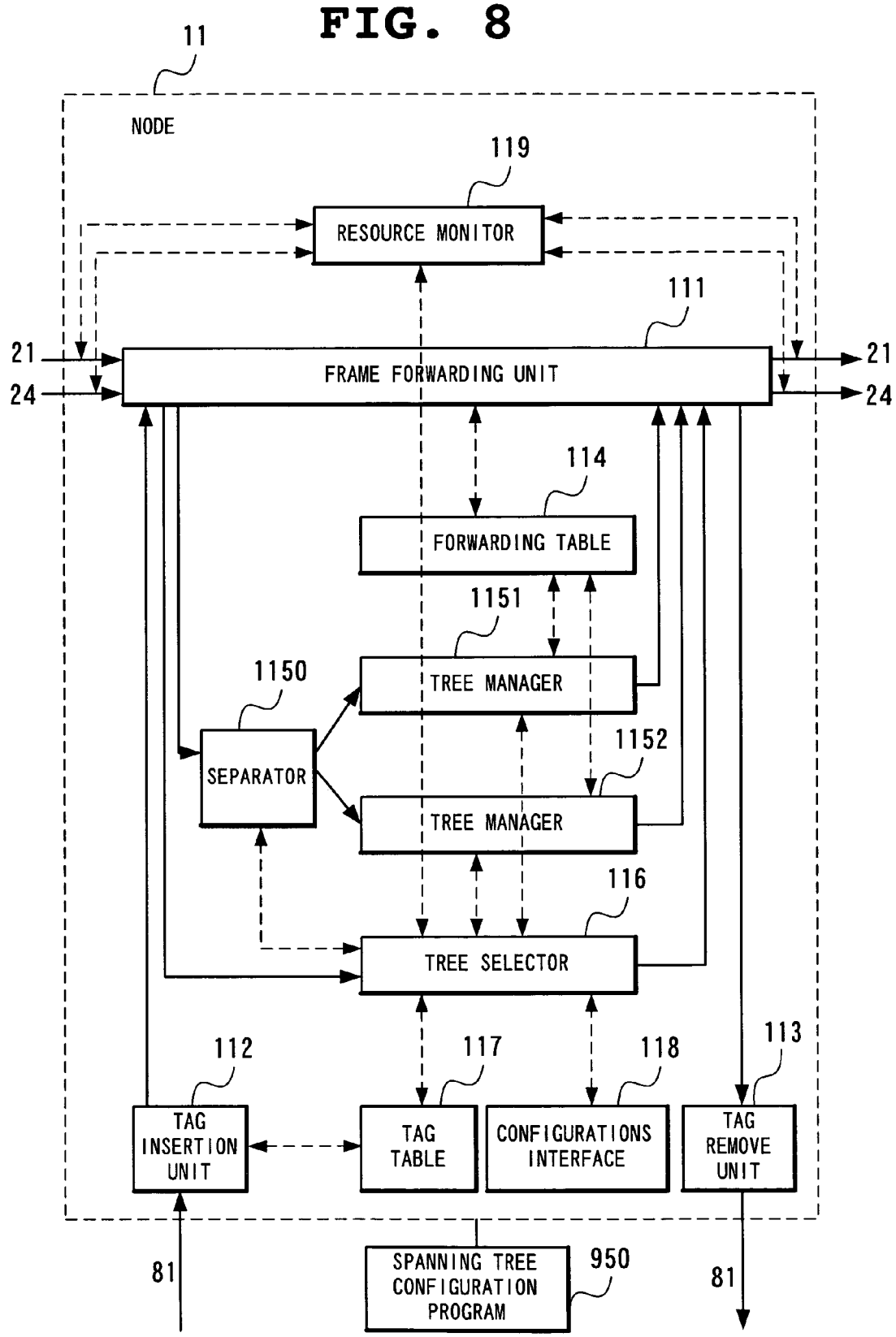
FIG. 8 is a block diagram illustrating the configuration of a node 11 in the first embodiment of the present invention.

FIG. 8 is a diagram illustrating in detail the configuration of the node 11. The node 11 includes a frame forwarding unit 111, a tag insertion unit 112, a tag remove unit 113, a forwarding table 114, a separator 1150, a tree manager 1151, a tree manager 1152, a tree selector 116, a tag table 117, and a configurations interface 118.

The frame forwarding unit 111 forwards a frame that has been received from the link 21 or the link 24 and the tag insertion unit 112 to the link 21 or the link 24 and the tag remove unit 113 or the tree selector 116 according to the description in the forwarding table 114.

The tag insertion unit 112 inserts a tag into the frame that has been received from the link 81 according to the description in the tag table 117 and forwards it to the frame forwarding unit 111. In addition, depending on the description in the tag table 117, not only it may forward the frame that has been received to the frame forwarding unit 111 as is without inserting a tag, it may also insert a plurality of zero or more tags into the same frame, or copy the frame that has arrived, and insert a plurality of zero or more identical or different tags into each of the frames that have been copied.

The tag remove unit 113 removes the tag added to the frame that has been received from the frame forwarding unit 111 and forwards it to the link 81. In addition, depending on the setting, it may forward the frame that has been received to the link 81 as is without removing the tag.

In response to an inquiry from the frame forwarding unit 111, the forwarding table 114 returns one or more frame forwarding destination ports by taking, in addition to the MAC address, the tag, or the input port, one or more combinations thereof as a key. The key and the forwarding destination port are set by the tree manager 1151 or the tree manager 1152.

The separator 1150 determines the output destination port according to the tag of the frame that has been received and forwards the frame to the tree manager 1151 or the tree manager 1152. Which tagged frames is forwarded to the tree manager 1151 or the tree manager 1152 can be set by the tree selector 116.

The tree manager 1151 follows the instruction of the tree selector 116, uses a spanning tree algorithm to receive the BPDU from the separator 1150, and transmits the BPDU to the frame forwarding unit 111 to set the forwarding table 114. Moreover, the tree manager receives setting information from the tree selector 116 and uses it as the parameter for the BPDU. The tree manager also extracts control information contained in the BPDU and notifies the tree selector 116 of it.

The tree manager 1152 is the same tree manager as the tree manager 1151. Hereafter, although a description will be given using the tree manager 1151 as a representative of the tree managers 1151-52, the description in regard to the tree manager 1151 is also applicable equally to the tree manager 1152, unless otherwise noted.

The tree selector 116 receives a setting frame such as GVRP from the frame forwarding unit 111, the control information contained in the BPDU from the tree manager 1151 or 1152, and a notice of link information from a resource monitor 119 or a setting notice from the configurations interface 118, and sets the tree manager 1151, the tree manager 1152, and the tag table 117 according to the setting frame or the information contained in the notice. It also transmits the setting frame to the frame forwarding unit 111.

In response to an inquiry from the tag insertion unit 112, the tag table 117 returns the information on the tag to be inserted, or a command to forward without adding a tag to the tag insertion unit 112. The tag to be inserted or the command to forward without inserting a tag are set by the tree selector 116. Settings in which a plurality of zero or more tags are inserted into the same frame, or in which the frame that has arrived is copied, and a plurality of zero or more identical or different tags are inserted into each of the copied frames are also possible.

The configurations interface 118 communicates a tree selection command, a node remove request, a link cost, a spanning tree parameter value and so on from a user to the tree selector 116 through a command line interface such as a serial connection or TELNET, or a web server.

The resource monitor 119 monitors the status of each link port of the nodes and, when it detects the connection of a link, transmits a linkup notice to the tree selector 116. The resource monitor also counts and retains one or more values of the number of accumulated bytes of the frame that passes through the link, the number of elapsed TCP sessions, the number of HTTP requests, and in addition to notifying the tree selector 116 of the retained value upon request from the tree selector 116, it also resets the retained value to zero upon command from the tree selector 116. Moreover, the resource monitor monitors frame passages, which are of the types pre-specified by the tree elector 116, and notifies of it the tree selector 116 when the frame being monitored passes.

Figure 9:
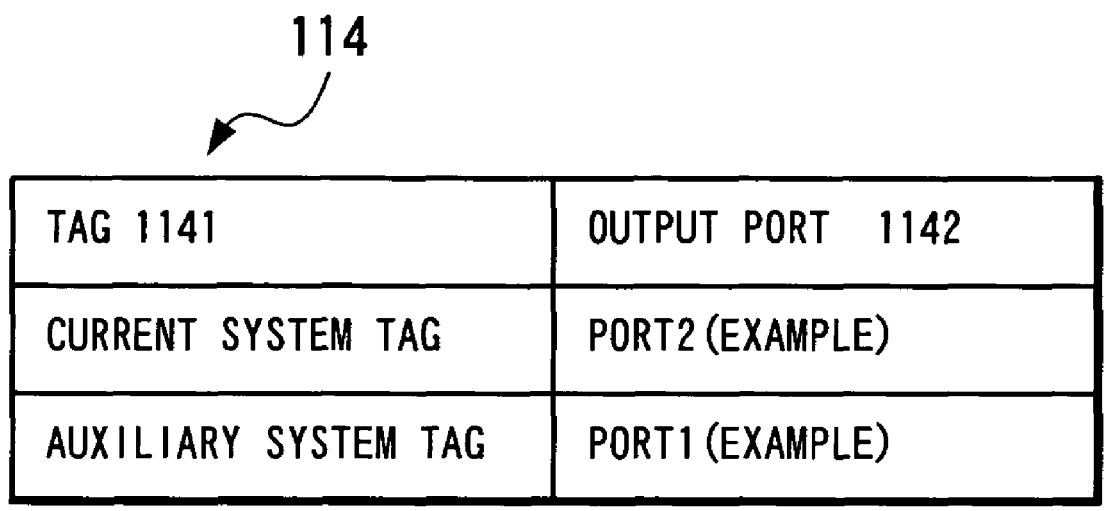
FIG. 9 is a table illustrating a configuration example of a forwarding table 114 in the first embodiment of the present invention.

FIG. 9 is a configuration example of a forwarding table 114 in FIG. 8 of the embodiment, in which an output port is determined by taking the tag as a key.

The tag field 1141, which is a field serving as an index for searches, checks whether the information in this field matches the contents written in the tag of the frame that has been received.

The output port 1142 is a field in which the ports to which the frame should be forwarded when the contents written in the tag of the frame that has been received match the contents of the field 1141 is described.

In addition, the embodiment is applicable not only to cases where tag forwarding is performed to determine a forwarding destination port according to the contents of the tag as shown in the operational example, but equally to normal MAC address forwarding, which determines a forwarding destination according to a MAC address. In this case, a plurality of ports are written in the output port field 1142.

Figure 10:
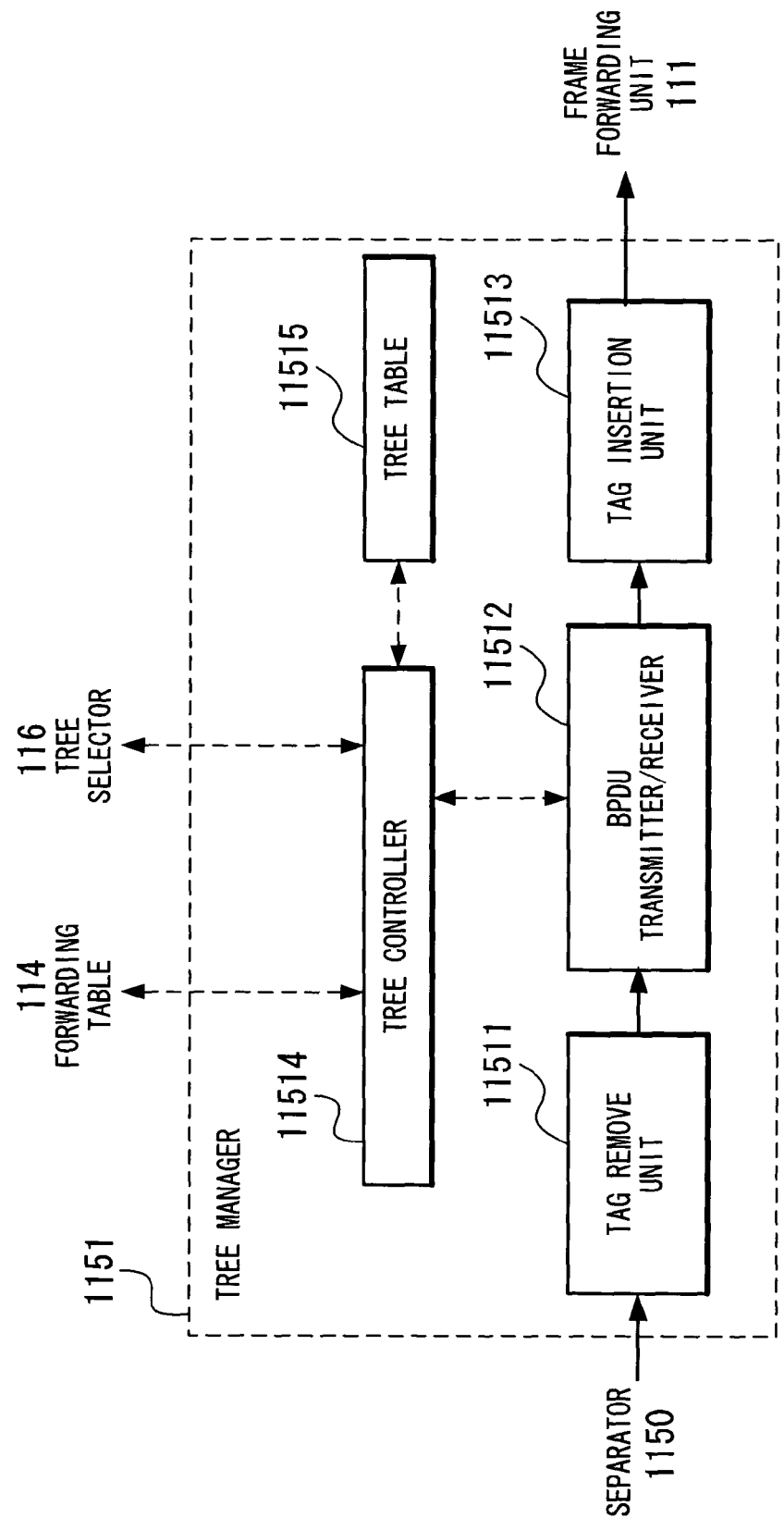
FIG. 10 is a block diagram illustrating the configuration of a tree manager 1151 in the first embodiment of the present invention.

FIG. 10 is a diagram illustrating in detail the configuration of a tree manager 1151 in FIG. 8 of the first embodiment of the present invention. The tree manager 1151 includes a tag remove unit 11511, a BPDU transmitter/receiver 11512, a tag insertion unit 11513, a tree controller 11514, and a tree table 11515.

The tag remove unit 11511 removes the tag that is inserted into a frame, which was entered by the separator 1150, and forwards it to the BPDU transmitter/receiver 11512. If no tag is attached to the frame that has been received from the separator 1150, the tag remove unit 11511 forwards the frame that has been received to the BPDU transmitter/receiver 11512 as is.

The BPDU transmitter/receiver 11512 receives the BPDU from the tag remove unit 11511, and notifies the tree controller 11514 of the information contained in the frame via a BPDU reception notice. It also receives a BPDU transmission notice from the tree controller 11514, generates and transmits a frame to the tag insertion unit 11513.

The tag insertion unit 11513 receives the frame from the BPDU transmitter/receiver 11512, inserts a preset tag, and transmits it to the frame forwarding unit 111. In addition, setting is also possible, in which the frame is forwarded as is, without inserting a tag.

The tree controller 11514 possesses the following four functions:

1) Stop Operation (initial state): stops a BPDU transmission notice to the BPDU transmitter/receiver 11512, according to the stop command from the tree selector 116. Also registers the state of the port with the tree table 11515 as all links down.

2) Start Operation: starts the BPDU transmission notice to the BPDU transmitter/receiver 11512 according to the start command from the tree selector 116. Also registers the ports in the up state with the tree table 11515 based on information contained in the start command.

3) BPDU Reception Operation: receives a BPDU reception notice from the BPDU transmitter/receiver 11512, and updates the tree table 11515. Also extracts identification information of the current system tree and the auxiliary system tree contained in the BPDU reception notice, and notifies of it a main controller 1164 in the tree selector 116.

4) Topology Update Operation: after the stop operation, the start operation, and the BPDU reception operation, refers to the tree table 11515 according to a spanning tree protocol shown in the conventional technology 1 or 2, and, if required, sets the tree table 11515 and the forwarding table 114, and transmits the BPDU. The BPDU to be transmitted contains the identification information of the current system tree and the auxiliary system tree. Also notifies the tree selector 116 whether a topology has been changed as a result of recalculation of the trees.

The tree table 11515 is a table in which parameters related to the states of the ports and the nodes are described, which are needed for the spanning tree protocol shown in the conventional technology 1 or 2. The priority of each port or each link and the link cost are also described in this table. In the first embodiment, a case which supposes that the width of the link band is used as the link cost will be described.

Figure 11:
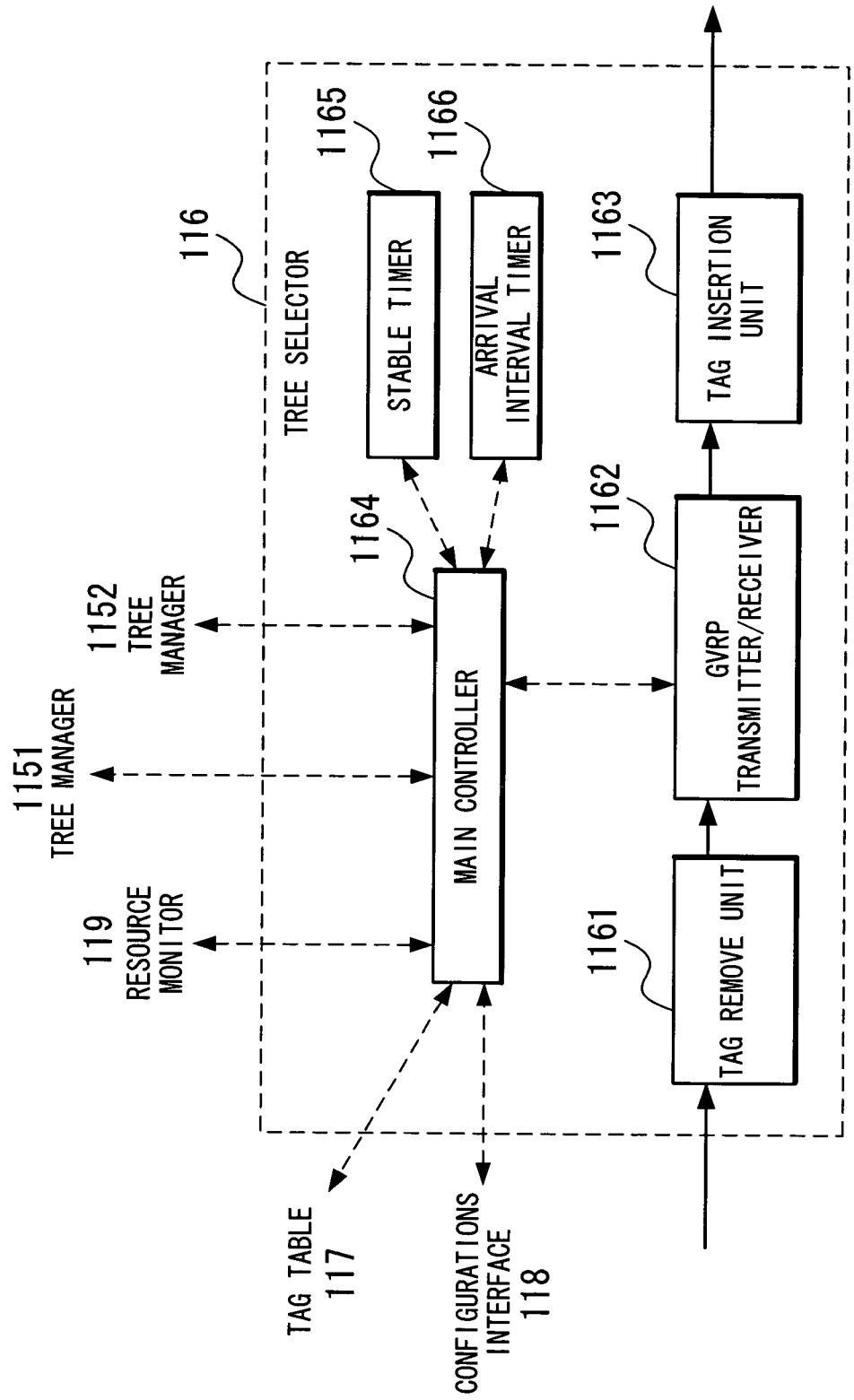
FIG. 11 is a block diagram illustrating the configuration of a tree selector 116 in the first embodiment of the present invention.

FIG. 11 is a diagram illustrating in detail the configuration of the tree selector 116 in FIG. 8 of the first embodiment of the present invention. The tree selector 116 includes a tag remove unit 1161, a GVRP transmitter/receiver 1162, a tag insertion unit 1163, a main controller 1164, a stable timer 1165, and an arrival interval timer 1166.

The tag remove unit 1161 removes the tag that is inserted into a frame, which was entered by the frame forwarding unit 111, and forwards it to the GVRP transmitter/receiver 1162. If no tag is attached to the frame that has been received from the frame forwarding unit 111, the tag remove unit 1161 forwards the frame that has been received to the GVRP transmitter/receiver 1162 as is.

The GVRP transmitter/receiver 1162 receives a control frame from the tag remove unit 1161, and notifies the main controller 1164 of the information contained in the frame via a GVRP frame reception notice. It also receives a GVRP, transmission notice from the main controller 1164, generates and transmits a frame to the tag insertion unit 1163.

The tag insertion unit 1163 receives the frame from the GVRP transmitter/receiver 1162, inserts a preset tag, and transmits it to the frame forwarding unit 111. In addition, setting is also possible, in which the frame is forwarded as is without inserting a tag.

The main controller 1164 possesses the following four functions:

1) Linkup Detection: receives a linkup notice from a resource monitor 119, and notifies of linkup (start command) the tree manager, which is the auxiliary system at the present time. Information on the links that are up is stored in the start command. Also sets the stable timer 1165 after transmitting the start command. Upon reception of a notice of expiration of the stable timer 1165, notifies the tag table 117 of a command to change the insertion tag, and commands the GVRP transmitter/receiver 1162 to transmit a tree switch request frame to the root node of a new tree so as to invert the registrations of the auxiliary system and the current system. Also sets the stable timer 1165, and adds its own node to the old tree after the timer expires.

2) Reception of Node Remove Request: upon reception of the node remove request notice from the configurations interface 118, transmits a stop command to the tree manager, which is the auxiliary system at the present time. Moreover, after transmitting the stop command, upon setting of the stable timer 1165 and reception of a notice of expiration of the stable timer 1165, the main controller notifies the tag table 117 of a command to change the insertion tag, and commands the GVRP transmitter/receiver 1162 to transmit a change of utilization tag group GVRP frame to the root node of a new tree so as to invert the registrations of the auxiliary system and the current system. Also sets the stable timer 1165, and indicates permission to remove its own node to the configurations interface 118 after the timer expires.

3) Change of Utilization Tag Group GVRP Reception: when its own node is the root node of the new tree, upon reception of the change of utilization tag group GVRP frame, commands the tree manager 1151 or the tree manager 1152 to transmit the BPDU to be transmitted from its own node after adding the current system flag. Also commands the GVRP transmitter/receiver 1162 to cancel attachment of the current system flag to the root node of the old tree.

4) Reception of Change of Current System Bit Notice: the tree manager 1151 or the tree manager 1152 checks the current system flag that was added to the BPDU at the time of BPDU reception, and whether its own group is the current system or the auxiliary system, and notifies the main controller of it. After receiving the notice, if a change occurs in the current system and the auxiliary system, the main controller transmits a change of insertion tag notice to the tag table 117 so as to invert the registrations of the current system and the auxiliary system.

5) Reception of Specified Frame Passage Notice: upon reception of a notice from the resource monitor 119 indicating that the preset target frame being monitored passed, transmits a setting notice to the arrival interval timer 1166. If a timer expiration notice arrives from the arrival interval timer 1166, it is understood that the arrival interval of the target frame being monitored is longer than the time set by the setting notice. This allows to detect such facts that the arrival interval of the BPDU has become longer, or that the arrival interval of the frames that flow through the auxiliary system has become longer.

The stable timer 1165 transmits a timer expiration notice to the main controller 1164 after a preset time has elapsed since the reception of the setting notice that has been transmitted by the main controller 1164.

Upon reception of a setting command from the main controller 1164, the arrival interval timer 1166 resets the time currently retained to zero, activates the timer, and, after the time specified by the setting command has elapsed, transmits the timer expiration notice to the main controller 1164.

Figure 12:
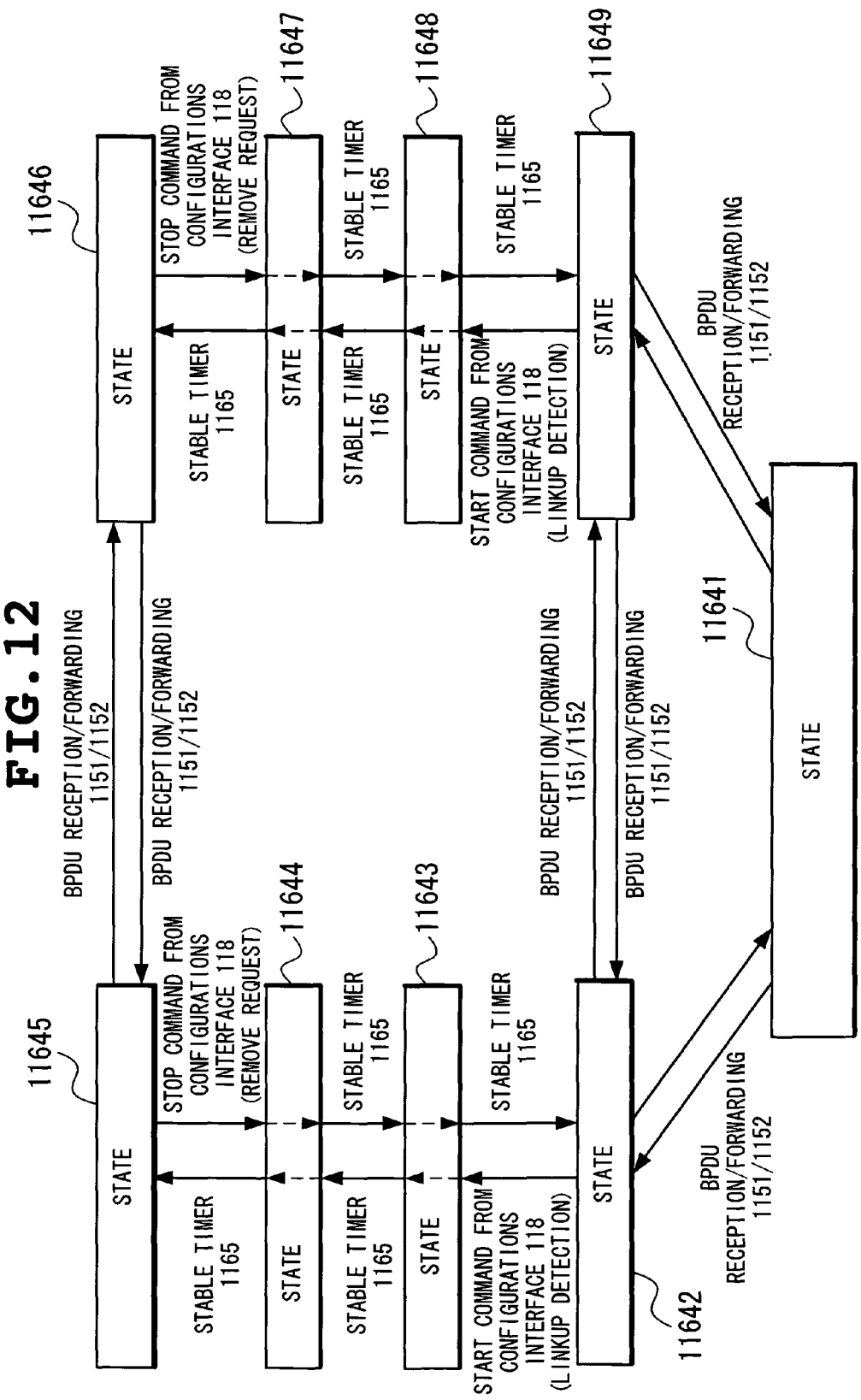
FIG. 12 is a flow diagram illustrating the operation of a main controller 1164 in the first embodiment of the present invention.

FIG. 12 is a diagram illustrating in detail the state transition of a main controller 1164 in FIG. 11 of the first embodiment of the present invention.

Hereinafter, out of two systems of spanning trees that are present, the spanning tree used to forward a data frame that is newly inserted into the network is referred to as a current tree or a current system tree, and the spanning tree which is not the current tree is referred to as an auxiliary tree or an auxiliary system tree.

Moreover, a tree manager that generates the current system tree is referred to as a current system tree manager, and a tree manager that generates the auxiliary system tree is referred to as an auxiliary system tree manager.

State 11641 is a state in which whether the current system tree manager is the tree manager 1151 or the tree manager 1152 cannot be determined, and in which the transmission functions of a BPDU transmitter/receiver 11512 in the tree manager 1151 and a BPDU transmitter/receiver 11522 in the tree manager 1152 are disabled, and only the BPDU reception functions are enabled.

State 11642 is a state in which the current system tree manager is the tree manager 1151 and the auxiliary system tree manager is the tree manager 1152, and in which the BPDU transmission function of the BPDU transmitter/receiver 11512 in the tree manager 1151 is disabled, and the BPDU transmission function of the BPDU transmitter/receiver 11522 in the tree manager 1152 is also disabled. In addition, the BPDU reception functions of the BPDU transmitter/receiver 11512 and the BPDU transmitter/receiver 11522 are always enabled regardless of whether the transmission function is enabled or disabled.

State 11643 is a state in which the current system tree manager is the tree manager 1151 and the auxiliary system tree manager is the tree manager 1152, and in which the BPDU transmission function of the BPDU transmitter/receiver 11512 in the tree manager 1151 is disabled, and the BPDU transmission function of the BPDU transmitter/receiver 11522 in the tree manager 1152 is enabled. In addition, the BPDU reception functions of the BPDU transmitter/receiver 11512 and the BPDU transmitter/receiver 11522 are always enabled regardless of whether the transmission function is enabled or disabled.

State 11644 is a state in which the current system tree manager is the tree manager 1152 and the auxiliary system tree manager is the tree manager 1151, and in which the BPDU transmission function of the BPDU transmitter/receiver 11522 in the tree manager 1152 is enabled, and the BPDU transmission function of the BPDU transmitter/receiver 11512 in the tree manager 1151 is disabled. In addition, the BPDU reception functions of the BPDU transmitter/receiver 11512 and the BPDU transmitter/receiver 11522 are always enabled regardless of whether the transmission function is enabled or disabled.

State 11645 is a state in which the current system tree manager is the tree manager 1152 and the auxiliary system tree manager is the tree manager 1151, and in which the BPDU transmission function of the BPDU transmitter/receiver 11522 in the tree manager 1152 is enabled, and the BPDU transmission function of the BPDU transmitter/receiver 11512 in the tree manager 1151 is also enabled. In addition, the BPDU reception functions of the BPDU transmitter/receiver 11512 and the BPDU transmitter/receiver 11522 are always enabled regardless of whether the transmission function is enabled or disabled.

State 11646 is a state in which the current system tree manager is the tree manager 1151 and the auxiliary system tree manager is the tree manager 1152, and in which the BPDU transmission function of the BPDU transmitter/receiver 11512 in the tree manager 1151 is enabled, and the BPDU transmission function of the BPDU transmitter/receiver 11522 in the tree manager 1152 is also enabled. In addition, the BPDU reception functions of the BPDU transmitter/receiver 11512 and the BPDU transmitter/receiver 11522 are always enabled regardless of whether the transmission function is enabled or disabled.

State 11647 is a state in which the current system tree manager is the tree manager 1151 and the auxiliary system tree manager is the tree manager 1152, and in which the BPDU transmission function of the BPDU transmitter/receiver 11512 in the tree manager 1151 is enabled, and the BPDU transmission function of the BPDU transmitter/receiver 11522 in the tree manager 1152 is disabled. In addition, the BPDU reception functions of the BPDU transmitter/receiver 11512 and the BPDU transmitter/receiver 11522 are always enabled regardless of whether the transmission function is enabled or disabled.

State 11648 is a state in which the current system tree manager is the tree manager 1152 and the auxiliary system tree manager is the tree manager 1151, and in which the BPDU transmission function of the BPDU transmitter/receiver 11522 in the tree manager 1152 is disabled, and the BPDU transmission function of the BPDU transmitter/receiver 11512 in the tree manager 1151 is enabled. In addition, the BPDU reception functions of the BPDU transmitter/receiver 11512 and the BPDU transmitter/receiver 11522 are always enabled regardless of whether the transmission function is enabled or disabled.

State 11649 is a state in which the current system tree manager is the tree manager 1152 and the auxiliary system tree manager is the tree manager 1151, and in which the BPDU transmission function of the BPDU transmitter/receiver 11522 in the tree manager 1152 is disabled, and the BPDU transmission function of the BPDU transmitter/receiver 11512 in the tree manager 1151 is disabled. In addition, the BPDU reception functions of the BPDU transmitter/receiver 11512 and the BPDU transmitter/receiver 11522 are always enabled regardless of whether the transmission function is enabled or disabled.

Next, the operation of the main controller 1164 will be described by referring to FIG. 12.

Upon reception of a notice that it is newly connected to the network from the resource monitor 119, the main controller 1164 waits for a current system notice from the tree manager 1151 or the tree manager 1152 to arrive. Upon reception of the current system notice contained in the BPDU from the tree manager 1151 or the tree manager 1152, the main controller 1164 sets the tree manager 1151 or the tree manager 1152 specified in the notice to current, and the tree manager 1151 or 1152 specified for auxiliary use to auxiliary, and transitions into the state 11642 or the state 11649. Here, although a case where transition is into the state 11642 is described as an example, the following description is identical for a case where transition is into the state 11649. (State 11641)

The main controller 1164 sets the tree manager 1151 to current and the tree manager 1152 to auxiliary. Moreover, it transmits a command to stop BPDU transmission to each of the tree managers 1151 and 1152. (State 11642)

In the state 11642, in the case that the main controller 1164 receives a node addition request from the configurations interface 118, it transitions into the state 11643. In the case that it receives a current system notice from the tree manager 1151 or the tree manager 1152, and a change occurs in the relationship between the current system and the auxiliary system, it transitions into the state 11649. (State 11642)

The main controller 1164 transmits a linkup notice to the tree manager 1152 and at the same time authorizes the tree manager 1152 to transmit the BPDU. Moreover, it activates the stable timer 1165. (State 11643)

Upon reception of the timer expiration notice from the stable timer 1165, the main controller 1164 replaces the tree manager 1151 registered as current with the tree manager 1152 registered as auxiliary, such that the tree manager 1152 newly becomes current, and the tree manager 1151 becomes auxiliary. Moreover, it transmits the tag group changing notification to the root node of the new tree through the GVRP transmitter/receiver 1162. The contents of the tag group changing notification is reflected in the BPDU, and communicated to all the nodes. Thereafter, it activates the stable timer 1165. (State 11644)

Upon reception of the timer expiration notice from the stable timer 1165, the main controller 1164 transmits a linkup notice to the tree manager 1151 and at the same time authorizes the tree manager 1152 to transmit the BPDU. It normally is stable in this state. (State 11645)

In the state 11645, in the case that the main controller 1164 receives a current system notice contained in the BPDU from the tree manager 1151 or the tree manager 1152, and a change occurs in the relationship between the current system and the auxiliary system, it transitions into the state 11646. The main controller then replaces the tree manager 1152 registered as current with the tree manager 1151 registered as auxiliary, such that the tree manager 1151 newly becomes current, and the tree manager 1152 becomes auxiliary. (State 11645)

In the state 11645, in the case that the main controller 1164 receives a node remove request from the configurations interface 118, it transitions into the state 11644. (State 11645)

The main controller 1164 notifies the tree manager 1151 of link down of all the links that are connected and at the same time transmits the command to stop BPDU transmission to the tree manager 1151. Moreover, it activates the stable timer 1165. (State 11644)

Upon reception of the timer expiration notice from the stable timer 1165, the main controller 1164 replaces the tree manager 1152 registered as current with the tree manager 1151 registered as auxiliary, such that the tree manager 1151 newly becomes current, and the tree manager 1152 becomes auxiliary. Moreover, it transmits the tag group changing notification to the root node of the new tree through the GVRP transmitter/receiver 1162. The contents of the tag group changing notification is reflected in the BPDU, and communicated to all the nodes. Thereafter, it activates the stable timer 1165. (State 11643)

Upon reception of the timer expiration notice from the stable timer 1165, the main controller 1164 notifies the tree manager 1151 of the link down, and at the same time transmits the command to stop BPDU reception to the tree manager 1151. Moreover, it transitions unconditionally into the state 11641 and waits until node separation. (State 11642)

Figures 13, 14:
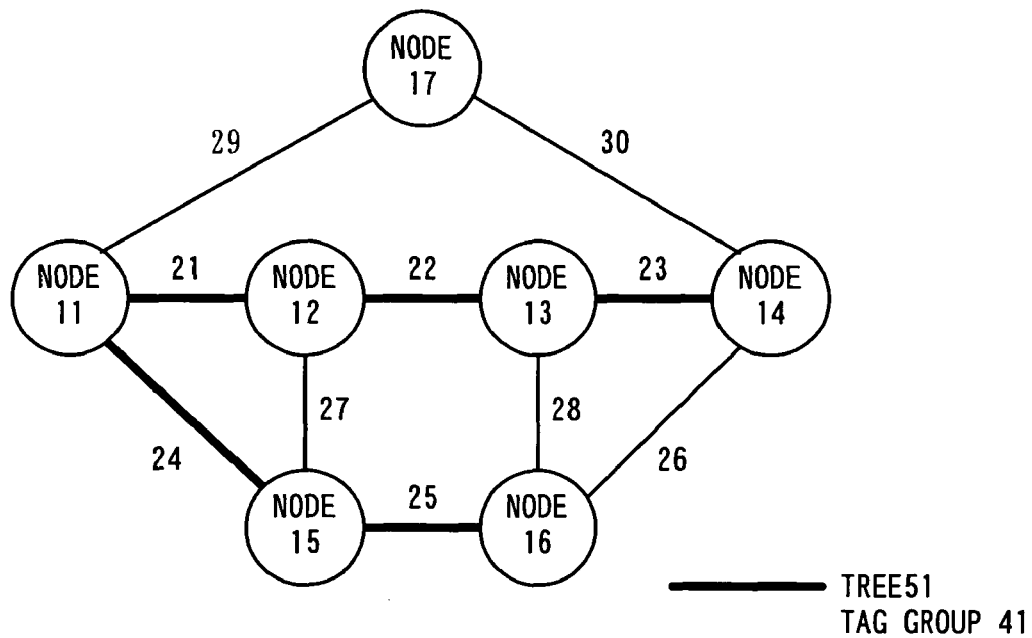
FIG. 13 is a table illustrating a configuration example of a tag table 117 in the first embodiment of the present invention.
FIG. 14 is a block diagram illustrating the configuration of a spanning tree 51 before a node 700 is added in the first embodiment of the present invention.

FIG. 13 is a configuration example of a tag table 117 in FIG. 8 of the embodiment, which determines the tags into which the destination MAC address is inserted as a key.

A destination MAC address 1171, which is a field serving as an index for searches, checks whether the information in this field matches the contents written in the destination MAC address field, that is, a MAC DA field, of the frame that has been received and if they match, inserts the tag described in an insertion tag field 1172 into the frame that has been received.

The insertion tag field 1172 is a field in which a tag to be inserted is written with respect to the destination MAC address field 1171. In the embodiment, the tag of a tag group, which is the current system at the present time, is inserted. The insertion tag field 1172 is rewritten by the tree selector 116 into the tag, which is the current system at the present time.

By referring to FIGS. 8, 14, 15, and 16, an operation for adding the node 17 in the embodiment will be described in detail using a concrete example.

In the initial state (the state before the node 17 is connected to links 29 and 30), the two systems of spanning trees are in the same connection relationship. The same connection relationship results from the fact that the protocol that sets the spanning tree bases on information such as priority of nodes and links to set the spanning tree, and that two spanning trees are set in the same network. In this initial state, one of the spanning trees is set to current, the other is set to auxiliary (specifically, the tree managers 1151 and 1152 rewrite the tree table 11515, and the tree selector 116 rewrites the tag table 117 to carry out each setting), and the network is operated using the current spanning tree.

It is assumed that two spanning trees 51 are set in the initial state, shown with thick lines in the network shown in FIG. 10.

Referring to FIG. 14, the operational example possesses nodes 11-17, links 21-30, and a tree 51. However, the node 17 and the links 29 and 30 are not connected in the initial state.

Figure 15:
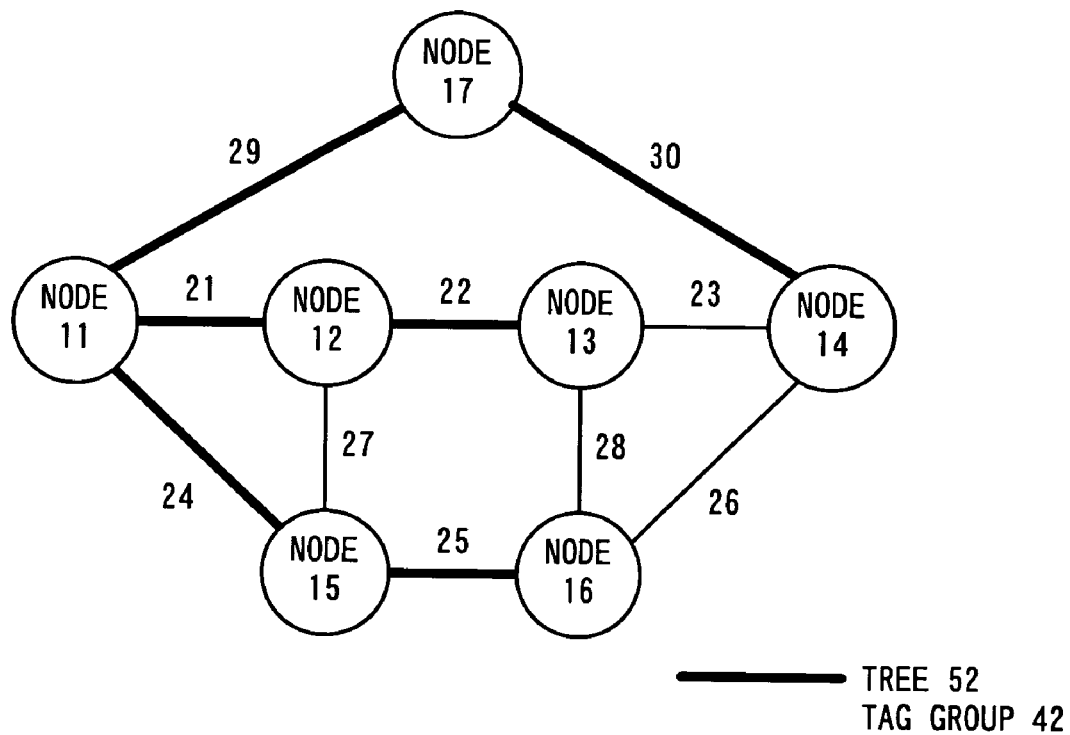
FIG. 15 is a block diagram illustrating the configuration of a spanning tree 52 after the node 700 is added in the first embodiment of the present invention.

Moreover, FIG. 15 shows the state of a spanning tree 52 after the node 17 has been added in the operational example. The tree 52 is shown with the thick line in FIG. 11.

All the nodes 11-16, and two tag groups to which all the ports belong have already been set; the first tag group is referred to as a tag group 41, and the second tag group is referred to as a tag group 42.

In addition, although basically all the nodes and all the ports participate in the two tag groups, a tag group may be created which consists of only some of the ports or the nodes. Hereafter, a description will be given assuming that all the nodes and all the ports participate in the two tag groups.

The nodes 11-16 have two spanning tree circuits that operate independently; the spanning tree that operates on the tag group 41 is referred to as a tree 51, and the spanning tree that operates on the tag group 42 is referred to as a tree 52.

Two systems must be created for the spanning tree, however creating two tag groups is not necessary. It is also possible to refer to as the tree 51 a spanning tree that operates on the tag group 41, and as the tree 52 a spanning tree that operates without belonging to a tag group, by setting the tag group 41 only and without using the tag group 42. Conversely, it is also possible to refer to as the tree 51 a spanning tree that operates without belonging to a tag group, and as the tree 52 a spanning tree that operates on the tag group 42, by setting the tag group 42 only and without using the tag group 41.

Although a description will particularly be given herein for a case where both the tag group 41 and the tag group 42 are used, the operation in a case where the tag group 41 and the tag group 42 are used is equally applicable to a case where only the tag group 41 is used, or only the tag group 42 is used.

In this network, the tree 51 becomes the current system spanning tree, and the tree 52 becomes the auxiliary system spanning tree according to the initial setting from the configurations interface 118, and the BPDU of the tree 51 is marked with the current system flag and the tag of the tag group 41, and the BPDU of the tree 52 is marked with the auxiliary system flag and the tag of the tag group 42.

All the nodes transmit the BPDU frames flagged as the current system or as the auxiliary system in a constant cycle specified in IEEE Std 802.1D or IEEE Std 802.1w to construct the current system spanning tree, which is the tree 51, and the auxiliary system spanning tree, which is the tree 52.

The current system flag or the auxiliary system flag can be represented using fields such as tag area 2203, Type 2204, and BPDU Type 22053 among the BPDU frame fields shown in FIG. 5.

It is assumed that, at the present time, sufficient time has elapsed since starting of the network, and sufficient exchange of BPDU frames to which the tag of the tag group 41 and the tag group 42 were added have been performed, as a result, each of the tree 51 and the tree 52 is stable with the node 11 serving as the root node for both.

Stabilization means a state in which the tree configuration of the spanning tree is in a state that does not vary for a sufficiently extended time.

The BPDU of the tree 51 is marked with the tag of the tag group 41 and the BPDU of the tree 52 is marked with the tag of the tag group 42. Specifically, a value indicating that the BPDU belongs to the tag group 41 is written in the tag area 2203 of the BPDU that is transmitted using the tree 51, and a value indicating that the BPDU belongs to the tag group 42 is written in the tag area 2203 of the BPDU that is transmitted using the tree 52.

Moreover, since the tree 51 is set as the current system at the present point of time, the tag of the tag group 41 is added by the tag insertion unit 112 to data that have been transmitted from the client to the nodes 11-16. Specifically, a value indicating that the data belongs to the tag group 41 is written in the tag area of a data signal. The data to which this tag has been added is being forwarded by the frame forwarding unit 111 along the tree 51, which, at the present point of time, is set as the current system.

When connected to the link 29 and link 30, the node 17 starts receiving the BPDU without participating in any tag groups. (The state of the main controller 1164 of the node 17 at this time is the state 11641 in FIG. 12.)

Upon reception of the BPDU of each tag group, the node 17 checks that the current system at the present point of time is the tag group 41 and the auxiliary system at the present point of time is the tag group 42. (The state of the main controller 1164 of the node 17 at this time is the state 11642 in FIG. 12.) The node 17 then sets its own node such that it participates in only the tag group 42 to transmit/receive the BPDU, and the tag group 41 only receives the BPDU without transmitting it. (The state of the main controller 1164 of the node 17 at this time is the state 11643 in FIG. 12.)

Since a change occurs in a member of the tag group 42 when the node 17 is added, an operation for updating the tree 52 is started by the spanning tree protocol. In other words, when the node 17 transmits the BPDU, and an adjacent node receives it, the adjacent node recognizes that the status of the topology has been changed, and starts the operation for updating the tree 52. Since there is no change in any member of the tag group 41, the tree 51 is not updated.

The tag of the tag group 41 is added to the frames that are transmitted by the client by each of the nodes 11-16 as before, and the frames continue to be forwarded along the tree 51.

Here, it is assumed that through the operation for updating the tree 52, the tree 52 has been stable with the node 11 serving as the root node. The configuration of the tree 52 at this time is shown in FIG. 15.

After a given length of time has elapsed since the node 17 has been connected to the network, the node 17 determines that the tree 52 has been stable, and transmits the tag group changing notification to the node 11, which serves as the root node of the tree 52, to command it to transition the tree 52 from the auxiliary system to the current system. For this command, for example, a control frame (GVRP) is used. (The state of the main controller 1164 of the node 17 at this time is the state 11644 in FIG. 12.)

Further, in addition to detecting by the fact that a given length of time has elapsed since the node 17 has been connected to the network, the detection of the fact that the tree 52 has been stable can also be detected by the fact that the BPDU arrival interval at the tree 52 in the node 17 has become longer than a given length of time.

The node 11 that has received the tag group changing notification transmits the tag group changing notification to the node 11, which serves as the root node of the tree 51, to command it to transition the tree 51 to the auxiliary system. For this tag group changing notification, for example, the control frame (GVRP) is used. The node 11 then adds the tag of the tag group 42 and sets the current system flag on the BPDU that will be transmitted for the tree 52. The BPDU is propagated to all the nodes while being forwarded by each node.

The node 11 of the tree 51 receives the tag group changing notification, transitions the tree 51 to the auxiliary system, adds the flag of the tag group 41, and sets the auxiliary system flag on the BPDU that will be transmitted for the tree 51. The auxiliary system flag is set in the predefined field of the BPDUs in FIG. 1, for example. This setting is performed by the facts that the tree managers 1151 and 1152 rewrite the tree table 11515, and the tree selector 116 rewrites the tag table 117. The BPDU is propagated to all the nodes while being forwarded by each node.

The nodes 11-17 check that the current system flag has been added to the BPDU marked with the tag of the tag group 42, and switch the tag to be added to the frame forwarded by the client from the tag group 41 to the tag group 42. At this time, the insertion tag field 1172 in the tag table 117 is rewritten. The frame to which the tag has been added is forwarded along the tree 52.

A while after the above switch has been completed, frames that flow through the tree 51 disappear.

After a given length of time has elapsed since the tag group changing notification has been sent, the node 17 determines that there are no more nodes to which the tag of the tag group 41 has to be added, and makes its own node participate in the tag group 41 to prepare for the next topology change. To make its own node participate in the tag group 41, the node 17 authorizes the tree controller in the tree manager 1151 to transmit the BPDU to authorize BPDU transmission from the BPDU transmitter/receiver 11512. (The state of the main controller 1164 of the node 17 at this time is the state 11645 in FIG. 12.)

At this time, since reconfiguration is performed on the spanning tree 51, when looking at the network while paying attention to the spanning tree 51, the network stops. However, since the communication over the network is performed using the spanning tree 52 during this time, problems concomitant to the addition of the node 17 do not occur, such as congestion and delayed arrival of frames.

In addition, the operation for making the node 17 participate in the tag group 41 may be performed by the node 11 serving as the root node of the tree 52 or the node 11 serving as the root node of the tree 51.

In the case where the node 11 serving as the root node of the tree 52 makes the node 17 participate in the tag group 41, after a given length of time has elapsed since the node 11 has received the tag group changing notification from the node 17, the node 11 determines that there are no more node to which the tag of the group 41 has to be added, and transmits the GVRP frame to the node 17 to command it to participate in the tag group 41.

In the case where the node 11 serving as the root node of the tree 51 makes the node 17 participate in the tag group 41, after a given length of time has elapsed since the node 11 has received the tag group changing notification from the node 17, the node 11 determines that there are no more nodes to which the tag of the group 41 has to be added, and transmits the GVRP frame to the node 17 to command it to participate in the tag group 41. In this case, the node 11 of the tree 51 transmits the GVRP frame directly to the node 17 (without going through the node 11 of the tree 52). The reason is that in the operation for making the node 17 participate in the tag group 41, no change occurs in the flag inserted into the BPDU, such that there is no need to go through the root node.

As mentioned above, the node 17 could be added without stopping the network. To add nodes subsequently, the same operation is repeated. However, the tag group 41 and the tag group 42 in the above description are interchanged as necessary.

Figure 16:
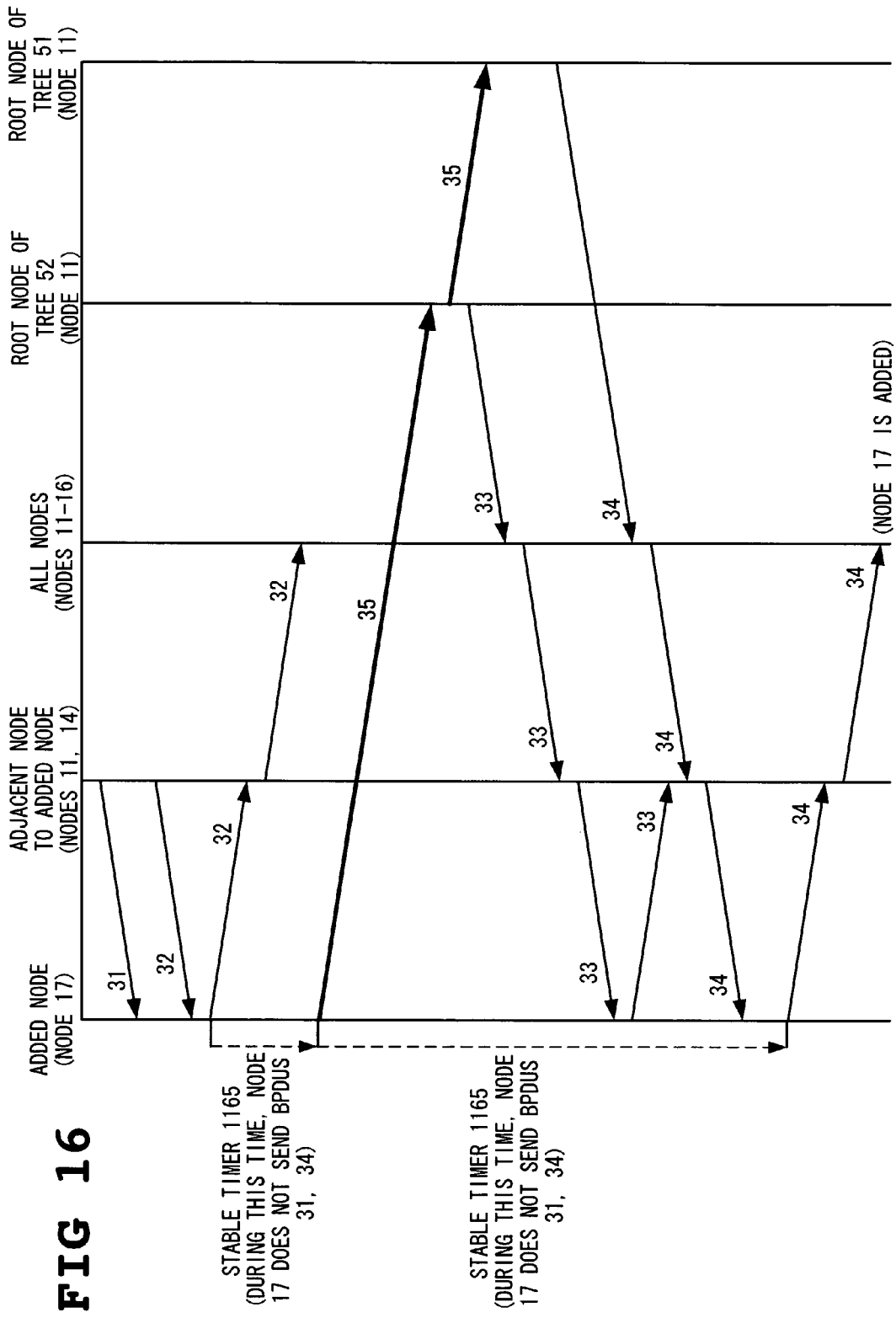
FIG. 16 is a sequence diagram illustrating the exchange of control frames in the first embodiment of the present invention.

FIG. 16 is a sequence diagram illustrating the operation for adding the node 17 described above.

An arrow 31 shows a flow of the BPDU marked with the current system flag, into which the tag indicating the tag group 41 has been inserted.

An arrow 32 shows a flow of the BPDU marked with the auxiliary system flag, into which the tag indicating the tag group 42 has been inserted.

An arrow 33 shows a flow of the BPDU marked with the current system flag, into which the tag indicating the tag group 42 has been inserted.

An arrow 34 shows a flow of the BPDU marked with the auxiliary system flag, into which the tag indicating the tag group 41 has been inserted.

An arrow 35 shows a flow of the tag group changing notification by the GVRP frame or the like, into which the tag indicating the tag group has not been inserted.

Next, by referring to FIGS. 15 and 14, an operation for removing the node 17 in the embodiment will be described in detail using a concrete example.

Referring to FIGS. 15 and 14, the operational example possesses nodes 11-17 and links 21-30.

Two tag groups to which all the ports 11-17 belong have already been set; the first tag group is referred to as a tag group 41, and the second tag group is referred to as a tag group 42.

The nodes 11-17 have two spanning tree paths that operate independently; the spanning tree that operates on the tag group 41 is referred to as a tree 51, and the spanning tree that operates on the tag group 42 is referred to as a tree 52.

The tree 52 is shown with the thick line in FIG. 15, and is stable with the node 11 serving as the root node.

The BPDU of the tree 51 is marked with the tag of the tag group 41 and the BPDU of the tree 52 is marked with the tag of the tag group 42.

At the present time, since the tree 52 is the current system, the tag of the tag group 42 is added to the data that have been transmitted from the client to the node 11-17. The data to which the tag has been added is being forwarded along the tree 52.

It is assumed that the node 17 has already received the BPDU of each tag group, and checked that the current system at the present point of time is the tag group 42 and the auxiliary system at the present point of time is the tag group 41.

Upon reception of the remove request by the configurations interface or other means, the node 17 sets its own node 17 to participate in the tag group 42 only that is the current system, and not in the tag group 41. At this time, the node 17 stops transmitting the BPDU of the tag group 41.

Due to this setting, since the BPDU is not received by the nodes that are adjacent to the node 17, the fact that the node 17 is removed is recognized, and, since a change occurs in the member of the tag group 41, an operation for updating the tree 51 is started. Since there is no change in any member of the tag group 42, the tree 52 is not updated.

The tag of the tag group 42 is added to the frames that are transmitted by the client by each of the nodes 11-17 as before, and the frames continue to be forwarded along the tree 52.

Here, the tree 51 displays a state in which it is stable, with the node 11 serving as the root node and without participation of the node 17. The configuration of the tree 51 is shown in FIG. 14.

In addition, stabilization herein means a state in which the tree configuration of the spanning tree is in a state that does not vary for a sufficiently extended time.

After a given length of time has elapsed since the node 17 has been set to not participate in the tag group 41, the node 17 determines that the tree 51 has been stable, and transmits the tag group changing notification to the node 11, which serves as the root node of the tree 51, to command it to transition the tree 51 from the auxiliary system to the current system. (The state of the main controller 1164 of the node 17 at this time is the state 11644 in FIG. 12.)

The node 11 that has received the tag group changing notification transmits the tag group changing notification to the node 11, which serves as the root node of the tree 52, to command it to transition the tree 52 to the auxiliary system. The node 11 then adds the flag of the tag group 41, and sets the current system flag on the BPDU that will be transmitted for the tree 51. The BPDU is propagated to all the nodes while being forwarded by each node.

The node 11 of the tree 51 receives the tag group changing notification, transitions the tree 52 to the auxiliary system, adds the flag of the tag group 42, and sets the auxiliary system flag on the BPDU that will be transmitted for the tree 52. The BPDU is propagated to all the nodes while being forwarded by each node.

The nodes 11-17 check that the current system flag has been added to the BPDU marked with the tag of the tag group 41, and switch the tag to be added to the frame forwarded by the client from the tag group 42 to the tag group 41. The frame to which the tag has been added is forwarded along the tree 51.

A while after the above switch has been completed, frames that flow through the tree 52 disappear.

After a given length of time has elapsed since the tag group changing notification has been sent, the node 17 determines that there are no more nodes to which the tag of the tag group 42 has to be added, and outputs to the configurations interface 118 a notice of permission to remove that permits its own node to be removed from the network. (The state of the main controller 1164 of the node 17 at this time is the state 11643 in FIG. 12.)

To remove nodes subsequently, the same operation is repeated. However, the tag group 41 and the tag group 42 in the above description are interchanged as necessary.

By referring to FIGS. 14 and 15, an operation for adding the node 17 in a case in the embodiment in which the tag is added only to the BPDU, not to the data, will de described in detail using a concrete example.

The tree 51 is shown with the thick line in FIG. 14, and is stable with the node 11 serving as the root node. Stabilization means a state in which the tree configuration of the spanning tree is in a state that does not vary for a sufficiently extended time.

The BPDU of the tree 51 is marked with the tag of the tag group 41 and the BPDU of the tree 52 is marked with the tag of the tag group 42.

At the present time, no tags are added to the data that has been transmitted from the client to the nodes 11-16. The data is being forwarded along the tree 51 according to the setting in the forwarding table of each of the nodes.

When connected to the link 29 and link 30, the node 17 starts receiving the BPDU without participating in any tag groups. (The state of the main controller 1164 of the node 17 at this time is the state 11641 in FIG. 12.)

Upon reception of the BPDU of each tag group, due to the flag in the tag that has been added to the BPDU, the node 17 checks that the current system at the present point of time is the tag group 41 and the auxiliary system at the present point of time is the tag group 42. The node 17 sets such that only the tag group 42 transmits/receives the BPDU, and tag group 41 only receive the BPDU without transmitting it. (The state of the main controller 1164 of the node 17 at this time is the state 11642 in FIG. 12.)

Since a change occurs in a member of the tag group 42 when the node 17 is added, an operation for updating the tree 52 is started by the spanning tree protocol. Since there is no change in any member of the tag group 41, the tree 51 is not updated. (The state of the main controller 1164 of the node 17 at the time is the state 11643 in FIG. 12.)

No tags are added to the frames that are transmitted by the client as before, and the frames continue to be forwarded along the tree 51.

Here, it is assumed that the tree 52 has been stable with the node 11 serving as the root node. The configuration of the tree 52 is shown in FIG. 15.

After a given length of time has elapsed since the node 17 has been connected to the network, the node 17 determines that the tree 52 has been stable, and transmits the tag group changing notification to the node 11, which serves as the root node of the tree 52, to command it to transition the tree 52 from the auxiliary system to the current system. (The state of the main controller 1164 of the node 17 at this time is the state 11644 in FIG. 12.)

The node 11 of the tree 52 that has received the tag group changing notification transmits the tag group changing notification to the node 11, which serves as the root node of the tree 51, to command it to transition the tree 51 to the auxiliary system. The node 11 then adds the flag of the tag group 42, and sets the current system flag on the BPDU that will be transmitted for the tree 52. The BPDU is propagated to all the nodes while being forwarded by each node.

The node 11 of the tree 51 receives the tag group changing notification, transitions the tree 51 to the auxiliary system, adds the flag of the tag group 41, and sets the flag of the auxiliary system on the BPDU that will be transmitted for the tree 51. The BPDU is propagated to all the nodes while being forwarded by each node.

The nodes 11-17 check that the current system flag has been added to the BPDU marked with the tag of the tag group 42, and change a routing table to a setting that follows the tree 52. Thus the frame to be forwarded at the node will be forwarded along the tree 52.

After the routing tables of all the nodes have been switched to those for use with the tree 52, frames that flow through the tree 51 disappear.

After a given length of time has elapsed since the tag group changing notification has been sent, the node 17 determines that there are no more nodes that perform table setting according to tag group 41, and makes its own node participate in the tag group 41 to prepare for the next topology change. (The state of the main controller 1164 of the node 17 at this time is the state 11644 in FIG. 12.)

As mentioned above, the node 17 could be added without stopping the network. To add nodes subsequently, the same operation is repeated. However, the tag group 41 and the tag group 42 in the above description are interchanged as necessary.

Although a timer is used to check the stable state of the tree in the description above, the method for checking the stable state is not limited thereto, and, as shown below, the arrival interval of the BPDU or the frame may be measured to check the stable state.

The tree 51 is shown with the thick line in FIG. 14, and is stable with the node 11 serving as the root node.

The BPDU of the tree 51 is marked with the tag of the tag group 41 and the BPDU of the tree 52 is marked with the tag of the tag group 42.

At the present time, the tag of the tag group 41 is added to data that have been transmitted from the client to the nodes 11-16. The data to which the tag has been added is being forwarded along the tree 51.

When connected to the link 29 and link 30, the node 17 starts receiving BPDU without participating in any tag groups.

Upon reception of the BPDU of each tag group, the node 17 checks that the current system at the present point of time is the tag group 41 and the auxiliary system at the present point of time is the tag group 42. The node 17 then sets its own node such that it participates in only the tag group 42 to transmit/receive the BPDU, and the tag group 41 only receives the BPDU without transmitting it. The frame that notifies of the fact that the node 17 has been added is transmitted to each of the node 11 serving as the root node of the tag group 42, and the node 11 serving as the root node of the tag group 41.

Since a change occurs in a member of the tag group 42 when the node 17 is added, an operation for updating the tree 52 is started by the spanning tree protocol. Since there is no change in any member of the tag group 41, the tree 51 is not updated.

The tag of the tag group 41 is added to the frames that are transmitted by the client as before, and the frames continue to be forwarded along the tree 51.

Here, it is assumed that the tree 52 has been stable with the node 11 serving as the root node. The configuration of the tree 52 is shown in FIG. 15.

Upon detection of the fact that the arrival interval of the BPDU of the tree 52 has become longer than a given length of time, the node 11 serving as the root node of the tree 52 determines that the tree 52 has been stable, and transmits the tag group changing notification to the node 11, which serves as the root node of the tree 51 to command it to transition the tree 51 to the auxiliary system. The node 11 then adds the flag of the tag group 42, and sets the current system flag on the BPDU that will be transmitted for the tree 52. The BPDU is propagated to all the nodes while being forwarded by each node.

In addition, the stabilization of the tree 52 may be detected by the node 11 serving as the root node of the tree 51. In this case, upon detection of the fact that the arrival interval of the BPDU of the tree 52 has become longer than a given length of time, the node 11 serving as the root node of the tree 51 determines that the tree 52 has been stable, and transmits the tag group changing notification to the node 11, which serves as the root node of the tree 52 to command it to transition the tree 52 to the auxiliary system. The node 11 serving as the root node of the tree 51 adds the flag of the tag group 42, and sets the current system flag on the BPDU that will be transmitted for the tree 52. The BPDU is propagated to all the nodes while being forwarded by each node.

The node 11 receives the tag group changing notification, transitions the tree 51 to the auxiliary system, adds the flag of the tag group 41, and sets the flag of the auxiliary system on the BPDU that will be transmitted for the tree 51. The BPDU is propagated to all the nodes while being forwarded by each node.

The nodes 11-17 check that the current system flag has been added to the BPDU marked with the tag of the tag group 42, and switch the tag to be added to the frame forwarded by the client from the tag group 41 to the tag group 42. The frame to which the tag has been added is forwarded along the tree 52.

A while after the above switch has been completed, frames that flow through the tree 51 disappear.

When the arrival interval of the frame marked with the tag of the tag group 41 that flows through the tree 51 has become longer than a given length of time, the node 11 which serves as the root node of the tag group 41 determines that there are no more nodes to which the tag of the tag group 41 has been added, and transmits the GVRP frame to the node 17 to command it to participate in the tag group 41 so as to prepare for the next topology change.

In addition, the operation for making the node 17 participate in the tag group 41 may be performed by the node 11 serving as the root node of the tree 52.

When the arrival interval of the frame marked with the tag of the tag group 41 that flows through the tree 51 has become longer than a given length of time, the node 11 which serves as the root node of the tree 52 determines that there are no more nodes to which the tag of the tag group 41 has been added, and transmits the GVRP frame to the node 17 to command it to participate in the tag group 41 so as to prepare for the next topology change.

As mentioned above, the node 17 could be added without stopping the network. To add nodes subsequently, the same operation is repeated. However, the tag group 41 and the tag group 42 in the above description are interchanged as necessary.

By referring to FIGS. 14 and 15, an operation for adding the node 17 in a case in the embodiment in which transition to the auxiliary system is detected by receiving a transition completion notice to the auxiliary system will de described in detail using a concrete example.

The tree 51 is shown with the thick line in FIG. 14, and is stable with the node 11 serving as the root node.

The BPDU of the tree 51 is marked with the tag of the tag group 41 and the BPDU of the tree 52 is marked with the tag of the tag group 42.

At the present time, the tag of the tag group 41 is added to the data that has been transmitted from the client to the nodes 11-16. The data to which the tag has been added is being forwarded along the tree 51.

When connected to the link 29 and link 30, the node 17 starts receiving BPDU without participating in any tag groups.

Upon reception of the BPDU of each tag group, the node 17 checks that the current system at the present point of time is the tag group 41 and the auxiliary system at the present point of time is the tag group 42. The node 17 sets its own node such that it participates in only the tag group 42 to transmit/receive the BPDU, and the tag group 41 only receives the BPDU without transmitting it.

Since a change occurs in a member of the tag group 42 when the node 17 is added, an operation for updating the tree 52 is started by the spanning tree protocol. Since there is no change in any member of the tag group 41, the tree 51 is not updated.

The tag of the tag group 41 is added to the frames that are transmitted by the client as before, and the frames continue to be forwarded along the tree 51.

Here, it is assumed that the tree 52 has been stable with the node 11 serving as the root node. The configuration of the tree 52 is shown in FIG. 15.

After a given length of time has elapsed since the node 17 has been connected to the network, the node 17 determines that the tree 52 has been stable, and transmits the tag group changing notification to the node 11, which serves as the root node of the tree 52, to command it to transition the tree 52 from the auxiliary system to the current system.

The node 11 that has received the tag group changing notification transmits the tag group changing notification to the node 11, which serves as the root node of the tree 51, to command it to transition the tree 51 to the auxiliary system. The node 11 then adds the flag of the tag group 42, and sets the current system flag on the BPDU that will be transmitted for the tree 52. The BPDU is propagated to all the nodes while being forwarded by each node.

The node 11 receives the tag group changing notification, transitions the tree 51 to the auxiliary system, adds the flag of the tag group 41, and sets the flag of the auxiliary system on the BPDU that will be transmitted for the tree 51. The BPDU is propagated to all the nodes while being forwarded by each node.

The nodes 11-17 check that the current system flag has been added to the BPDU marked with the tag of the tag group 42, switch the tag to be added to the frame forwarded by the client from the tag group 41 to the tag group 42, and transmit a switch completion notice to the node 11 which serves as the root node of the tree 52.

A while after the above switch has been completed, frames that flow through the tree 51 disappear.

Upon reception of the switch completion notice from all the nodes 11-17, the node 11 determines that there are no more nodes to which the tag of the tag group 41 has been added, and transmits the GVRP frame to the node 17 to command it to participate in the tag group 41.

In addition, the operation for making the node 17 participate in the tag group 41 may be performed by a newly added node 17 or the node 11 serving as the root node of the tree 51.

When the newly added node 17 makes the node 17 itself participate in the tag group 41, the nodes 11-16 check that the current system flag has been added to the BPDU marked with the tag of the tag group 42, and transmit the switch completion notice to the newly added node 17 when switching the tag added to the frame forwarded by the client from the tag group 41 to the tag group 42, and, when the node 17 receives the switch completion notice from all the nodes 11-16, the node 17 determines that there are no more nodes to which the tag of the tag group 41 has to be added, and makes the node 17 itself participate in the tag group 41.

When the node 11 serving as the root node of the tree 51 makes the node 17 participate in the tag group 41, the nodes 11-17 check that the current system flag has been added to the BPDU marked with the tag of the tag group 42, and transmit the switch completion notice to the node 11 serving as the root node of the tree 51 when switching the tag added to the frame forwarded by the client from the tag group 41 to the tag group 42, and, when the node 11 receives the switch completion notice from all the nodes 11-17, the node 11 determines that there are no more nodes to which the tag of the tag group 41 has to be added, and transmits the GVRP frame to the node 17 to command it to participate in the tag group 41.

As mentioned above, the node 17 can be added without stopping the network. To add nodes subsequently, the same operation is repeated. However, the tag group 41 and the tag group 42 in the above description are interchanged as necessary.

Next, the effect of the embodiment will be described.

In the past, since, at the time of addition/remove of nodes that belong to a spanning tree, forwarding of data frame was stopped in whole or in part to reconstruct the spanning tree, sometimes the network was stopped during reconstruction.

In the embodiment, by generating a spanning tree that includes a newly added node while continuing to operate the spanning tree that existed before the configuration change, and switching to the spanning tree to be used after the new spanning tree has been stable, spanning tree reconfiguration, such as performing addition/remove of the node that belongs to the spanning tree, is possible without stopping the network.

This also allows the probability of occurrence of congestion to be lowered.

Second Embodiment

Hereafter, a second embodiment of the present invention will be described in detail by referring to the drawings.

The second embodiment of the present invention is different from the first embodiment in that, when calculating the cost, the free bandwidth capacity or the number of elapsed TCP flows, the number of HTTP requests or the like are used instead of the width of the link band, furthermore, in the case that the cost is changed, the transitions of the current system and the auxiliary system are performed as is the case for the addition/remove of a node. In addition, although a description will be given in regard to a case where the free bandwidth capacity is used as the cost, the description in regard to cases where the number of elapsed TCP flows and the number of HTTP requests are used can also be achieved equally, unless otherwise noted.

In IEEE 802.1D and IEEE 802.1w, the cost of a link would be determined by means of the inverse of the width of a link band. In other words, the cost could not be changed dynamically according to a load.

In the embodiment, by determining the cost of the link by means of the inverse of the link free bandwidth, dynamic cost change is performed according to the load.

Figure 17:
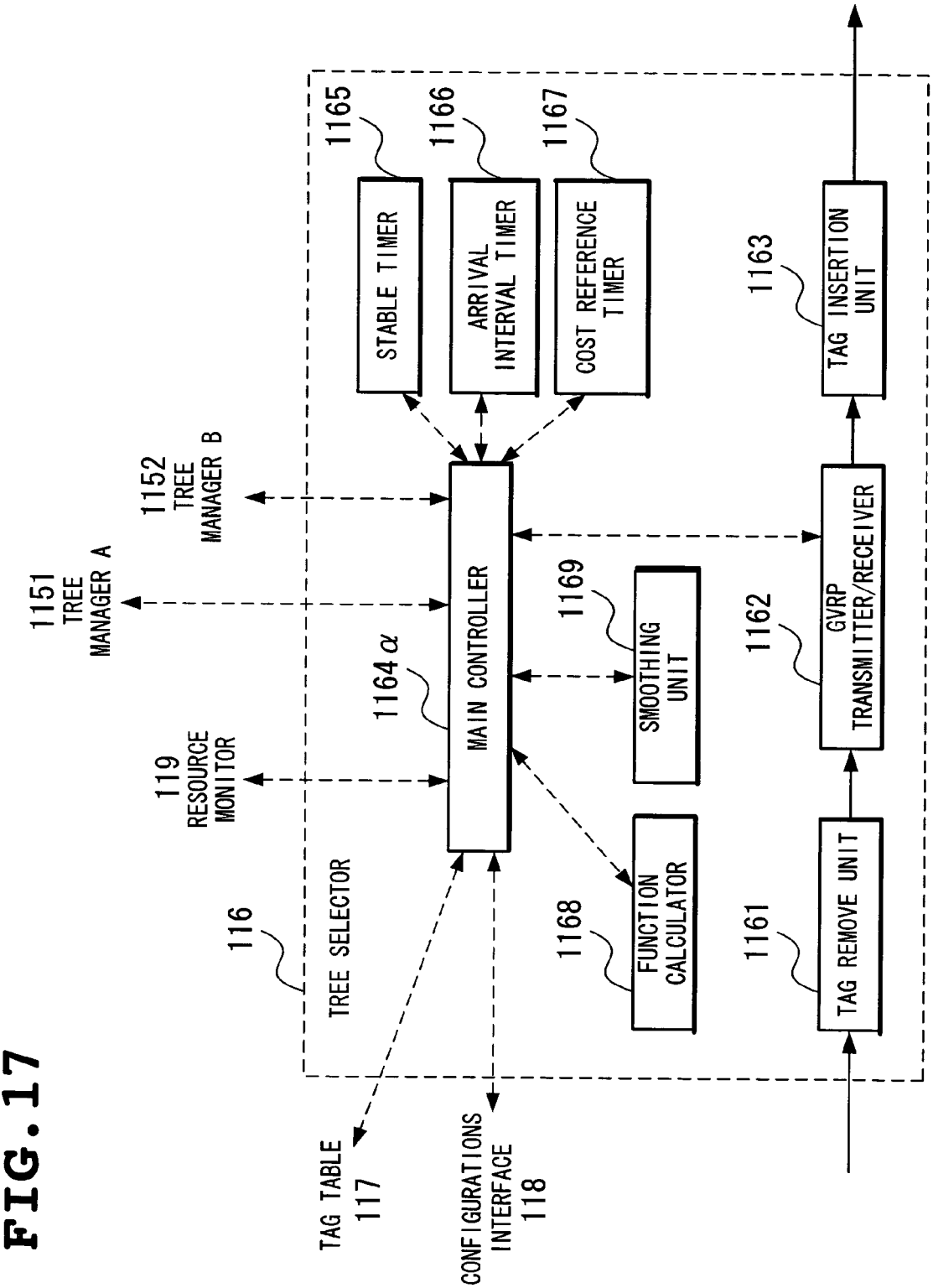
FIG. 17 is a block diagram illustrating the configuration of a tree selector 116 in a second embodiment of the present invention.

FIG. 17 shows the configuration of a tree selector 116 in the second embodiment. By referring to FIG. 17, the second embodiment of the present invention is different from the first embodiment in that a cost reference timer 1167, a function calculator 1168, and a smoothing unit 1169 are added to the tree selector in FIG. 11 of the first embodiment.

A main controller 1164α, upon reception of the expiration notice from the cost reference timer 1167, performs the operations of obtaining from the resource monitor the flow rate information, the number of TCP flows, or the number of HTTP requests of the frames that have flowed through the link since the previous cost reference timer expired, calculating the cost based on the flow rate, the number of flows, or the number of requests, and notifying of it the tree manager registered as the auxiliary system (hereinafter referred as to auxiliary system tree manager) in addition to the operation in the first embodiment. In the case of the flow rate, the free bandwidth of the link is obtained from the flow rate and the width of the link band, and the inverse of the link free bandwidth is used as the cost. In the cases of the number of TCP flows and the number of HTTP requests, the difference between the preset maximum allowable number of flows or the preset maximum allowable number of requests and the number of TCP flows or the number of requests that actually passes through the link is taken, and the inverse of the difference is used as the cost.

After calculating the cost by the above means, the main controller 1164α passes the cost to the function calculator 1168 for evaluation, passes the result of the evaluation by the function calculator to the smoothing unit 1169 for smoothing, and transmits the value of the smoothed result to the tree manager of the auxiliary system.

The function calculator 1168 can prevent the state transition from oscillating by the operation of the function calculator 1168 that determines an output cost value by means of the cost value entered by the main controller 1164α as a parameter, using any prespecified function such as a proportional function, a hysteresis function, and a step function, and returns the value to the main controller 1164. This is because rapid fluctuations in the cost value is inhibited and the cost is changed smoothly.

The smoothing unit 1169 smoothes the previous input parameter, which is prestored, and a new input parameter, which is newly passed from the main controller 1164α, using a low pass filter or the like, and notifies the main controller 1164α of the result. The operation of the smoothing unit 1169 can prevent rapid fluctuations in the cost and oscillation of state transition.

The cost reference timer 1167 transmits a timer expiration notice to the main controller 1164α after a preset time has elapsed since the reception of the setting notice that has been transmitted by the main controller 1164α.

Figure 18:
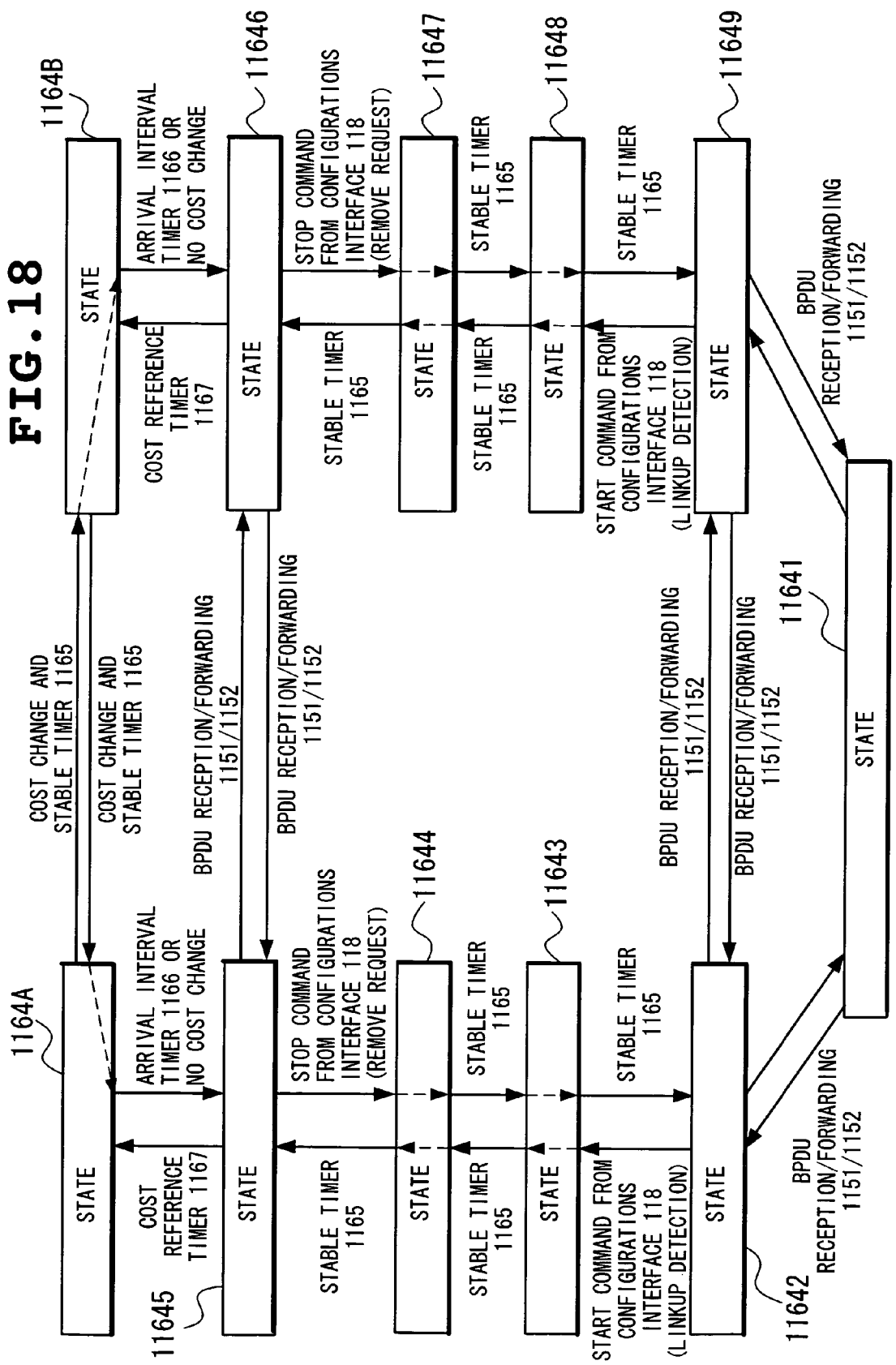
FIG. 18 is a flow diagram illustrating the operation of a main controller 1164 in the second embodiment of the present invention.

FIG. 18 is a diagram illustrating in detail the state transition of a main controller 1164A in FIG. 17 of the second embodiment of the present invention. By referring to FIG. 18, the second embodiment of the present invention is different from the first embodiment in that a state 1164A and a state 1164B are added to FIG. 12 of the first embodiment.

State 1164A is a state in which the current system tree manager is the tree manager 1152 and the auxiliary system tree manager is the tree manager 1151, and in which the BPDU transmission function of the BPDU transmitter/receiver 11522 in the tree manager 1152 is enabled, and the BPDU transmission function of the BPDU transmitter/receiver 11512 in the tree manager 1151 is also enabled. In addition, the BPDU reception functions of the BPDU transmitter/receiver 11512 and the BPDU transmitter/receiver 11522 are always enabled regardless of whether the transmission function is enabled or disabled.

State 1164B is a state in which the current system tree manager is the tree manager 1151 and the auxiliary system tree manager is the tree manager 1152, and in which the BPDU transmission function of the BPDU transmitter/receiver 11512 in the tree manager 1151 is enabled, and the BPDU transmission function of the BPDU transmitter/receiver 11522 in the tree manager 1152 is also enabled. In addition, the BPDU reception functions of the BPDU transmitter/receiver 11512 and the BPDU transmitter/receiver 11522 are always enabled regardless of whether the transmission function is enabled or disabled.

Hereafter, although a description of the flow of cost calculation will be given using the state 11645 as a starting point by referring to FIG. 18, the description is also applicable equally to the case where the state 11646 is taken as a starting point.

If transitioned to the state 11645, the main controller 1164α sets the cost reference timer 1167 when it is instructed to use dynamic cost calculation by the configurations interface 118 or the GVRP transmitter/receiver 1162. (State 11645)

Upon reception of the timer expiration notice from the cost reference timer 1167, the main controller 1164α receives information on the number of accumulated pass-through bytes from the resource monitor 119, and at the same time issues a count reset notice to reset the number of accumulated pass-through bytes of the resource monitor 119 to zero. Moreover, it calculates the cost from the number of accumulated pass-through bytes or the number of TCP flows, or the number of HTTP requests, and passes the result to the function calculator 1168.

The function calculator 1168 evaluates via a preset function the value entered by the main controller 1164α, and returns the result to the main controller 1164α. Here, an example will be described, in which a proportional function is set, and the output value is identical to an input value.

Upon reception of the result of cost evaluation from the function calculator 1168, the main controller 1164α notifies the smoothing unit 1169 of the value.

The smoothing unit 1169 smoothes the input value according to the setting by means of the low pass filter or the like, and returns the result to the main controller 1164α.

Upon reception of the cost value after completion of smoothing from the smoothing unit 1169, the main controller 1164α notifies of the cost value the tree manager 1151 of the auxiliary system. The tree manager 1151 recalculates the spanning tree based on the cost information, and notifies the main controller 1164α whether the topology has changed as a result of the calculation. (State 1164A in FIG. 18)

In the state 1164A, in the case that the tree after recalculation is the same as the tree before calculation, or the degree of change is lower than a preset change, the main controller 1164α transitions to the state 11645 to reset the cost reference timer. The state transition diagram in FIG. 18 is an example that illustrates a setting in which transition to the state 11645 does not occur if there is even a slight change. (State 1164A)

In the state 1164A, in the case that the tree after recalculation is different from the tree before calculation, and the degree of change is higher than the preset change, the main controller 1164α sets a stable timer 1165 and transitions to the state 1164B after the timer expires. The state transition diagram in FIG. 18 is an example that illustrates a setting in which transition to the state 1164B occurs if there is even a slight change. (State 1164A)

Upon reception of the timer expiration notice from the stable timer 1165, the main controller 1164α replaces the tree manager 1152 registered as current with the tree manager 1151 registered as auxiliary, such that the tree manager 1151 newly becomes current, and the tree manager 1152 becomes auxiliary. Moreover, it transmits the tag group changing notification to the root node of the new tree through the GVRP transmitter/receiver 1162. The contents of the tag group changing notification is reflected in the BPDU, and communicated to all the nodes. Thereafter, it activates the stable timer 1165 and transitions to the state 11646. (State 1164B)

Upon reception of the expiration notice from the stable timer 1165, the main controller 1164α notifies the tree manager 1152 of a new cost to recalculate the spanning tree based on the newly calculated cost information. It also schedules the cost reference timer 1167. (State 11646)

Next, by using FIG. 7, a spanning tree switching operation in a case where, in the embodiment, a forwarding path is changed from the node 15 to the node 13, will be described in detail using a concrete example.

By referring to FIG. 7, the operational example includes nodes 11-16, clients 91-96, two-way links 81-86, and two-way links 21-28.

The client 91 is connected to the node 11 by the link 81, the client 92 is connected to the node 12 by the link 82, the client 93 is connected to the node 13 by the link 83, the client 94 is connected to the node 14 by the link 84, the client 95 is connected to the node 15 by the link 85, and the client 96 is connected to the node 16 by the link 26, respectively.

The node 11 and the node 12 are connected by the link 21, the node 12 and the node 13 are by the link 22, the node 13 and the node 14 are by the link 23, the node 11 and the node 15 are by the link 24, the node 15 and the node 16 are by the link 25, the node 16 and the node 14 are by the link 26, the node 12 and the node 15 are by the link 27, and the node 13 and the node 16 are by the link 28, respectively.

Two tag groups to which all the ports 11-16 belong have already been set; the first tag group is referred to as a tag group 41, and the second tag group is referred to as a tag group 42.

The nodes 11-16 have two spanning tree circuits that operate independently; the spanning tree that operates on the tag group 41 is referred to as a tree 51, and the spanning tree that operates on the tag group 42 is referred to as a tree 52.

In FIG. 7, it is assumed that the tree 41 has been already stable with the node 13 serving as the root node, using an initial cost that has been set equally to 10 for all the links. The BPDU of the tree 51 is marked with the tag of the tag group 41 and the BPDU of the tree 52 is marked with the tag of the tag group 42.

At the present time, the tag of the tag group 41, which is the current system, is added to the data that has been transmitted from the client to the node 11-16. The data to which the tag has been added is being forwarded along the tree 51.

In the initial state, no clients among the clients 91-96 have performed data forwarding.

Each node checks the state of the BPDU at each given length of time, by transmitting/receiving the BPDU with a period specified in Hello Time. This frame has the identification flags of the current system and the auxiliary system, the flag of the current system is attached only to the BPDU marked with the tag of the tag group 41, which is the current system at the present time, and the flag of the current system is not attached to the BPDU marked with the tag of the tag group 42, which is the auxiliary system.

Since each node has already been instructed to use the dynamic cost calculation by the configurations interface 118 or the GVRP transmitter/receiver 1162, each time the cost reference timer expires, it refers to the flow rate of the frames that have flowed through the link since the previous timer expired, and recalculates the cost and the spanning tree using the auxiliary system tree.

Here, it is assumed that the data forwarding was started from the client 95 to the client 93, and from the client 96 to the client 93.

At the beginning of the forwarding, the data from the client 95 to the client 93 is forwarded using the tree 51 through the links 85, 25, 28, and 83. The data from the client 96 to the client 93 is also forwarded using the tree 51 through the links 86, 28, and 83.

After a given length of time has elapsed since the data forwarding (when the cost reference timer 1167 of each node expires), the cost of the links 21-28 on the tree 52 is recalculated based on the amount of free space of the links 21-28, and the cost is processed by the function calculator and the smoothing unit. Here, it is assumed that, since the free bandwidth of the link 28 has decreased, the cost of the link 28 on the tree 52 is changed to 15 by the node 16, and since the free bandwidth of the link 25 has decreased, although not as low as the link 28, the cost of the link 25 on the tree 52 is changed to 12 by the node 15, respectively. At this time, the cost of the tree 51 that is in use is not changed.

The node 16 detects the change in cost, and transmits BPDUs that have been created using the cost after the change (the value of Root path Cost 22056 in FIG. 5 is changed) to the adjacent nodes 13, 14 and 15, respectively. The tag of the tag group 42 is added to this BPDU.

The node 15 also detects the change in cost, and transmits BPDUs that have been created using the cost after the change to the adjacent nodes 11, 12, and 16, respectively.

Upon reception from the node 16, of the BPDU to which the cost 15 has been added, the node 15 recognizes that it will cost the cost 27 to reach the node 13 through the link 25 and the link 28 after adding the cost of the link 25.

Thereafter, upon reception from the node 12, of the BPDU to which the cost 10 has been added (the node 12 periodically transmits the cost up to the root node (node 13) to the adjacent nodes (node 11 and node 15)), the node 15 recognizes that it will cost the cost 20 to reach the node 13 through the link 27 and the link 22 after adding the cost of the link 27. Since this cost is lower than the cost via link 25, the node 15 switches a stop port from the link 27 side to the link 25 side, and forms a tree that reaches the link 13 using the link 27 and the link 22. The spanning tree protocol is also used to create a tree that passes through the links 27 and 22. The node 15 then activates the stable timer 1165 and waits for the tree to be stable.

Here, it is assumed that the tree 52 has been stable with the node 13 serving as the root node.

After the stable timer 1165 in FIG. 13 expires, the node 13 serving as the root node of the tree 51 determines that the tree formation has been stable, and transmits a change of tag group message to the node 13 serving as the root node of the tree 52, which is the new tree, commanding that the current system tree, which is used for forwarding, be switched from the tree 51 to the tree 52. Thereafter, it activates the stable timer 1165.

Upon reception of the tree switch message, the node 13 serving as the root node of the tree 52 transmits the change of tag group message to the node 13 serving as the root node of the tree 41, which is the former current system tree, commanding that the current system tree, which is used for forwarding, be switched from the tree 51 to the tree 52. The contents of the tag group changing notification is reflected in each of the BPDUs of the tree 51 and the tree 52 that are transmitted from the node 13, and communicated to all the nodes.

After completing transmitting of the change of tag group message to the root node of the former current system, the node 13 switches the tree, which its own node uses to forward the frames that it receives from the client 93 and transmits into the network, from the tree 51 that has been used until then to the tree 52. After completing the switch, the frames that have been transmitted from the client 93 to the client 95 are forwarded to the client 95 through the link 83, the link 22, the link 27, and the link 85.

In this manner, the forwarding paths of the frames that are transmitted from the client 93 to the client 95 and from the client 93 to the client 96 are distributed to resolve the congestion of the link 28.

Thereafter, every time the cost reference timer expires, the spanning tree is recalculated using the cost calculation based on the free bandwidth of the link, and the dynamical path change to reflect the free bandwidth in the cost is periodically performed. As a result, the traffic of each link is distributed, such that it is possible to distribute the load of the link, and prevent congestion.

Next, the effect of the embodiment will be described.

In the past, since the cost was calculated using link capacity and used to select a path at the time of spanning tree construction, it was impossible to change the path for dynamic load distribution according to the traffic.

In the embodiment, by calculating the link cost based on dynamic information such as the free bandwidth and the server load, it is possible to distribute the traffic load.

Moreover, in the past, when attempting to vary the cost dynamically according to the traffic status, the spanning tree was reconstructed to change the paths while forwarding of data frame was stopped locally or over the entire network, such that sometimes the network stopped during reconstruction.

In the embodiment, by generating the spanning tree after a change in cost while continuing to operate the tree that existed before the change, and switching the spanning tree that is to be used after the new spanning tree has been stable, it is possible to distribute the load without stopping the network for a spanning tree reconfiguration concomitant to a path change.

This also allows the probability of occurrence of congestion to be lowered.

Third Embodiment

Hereafter, a third embodiment of the present invention will be described in detail by referring to the drawings.

The third embodiment of the present invention is different from the second embodiment in that the transition between the current system and the auxiliary system is performed regardless of whether the cost is changed or not. In addition, although a description will be given in regard to a case where the free bandwidth capacity is used as the cost, the description in regard to cases where the number of elapsed TCP flows and the number of HTTP requests are used can also be achieved equally, unless otherwise noted.

Figure 19:
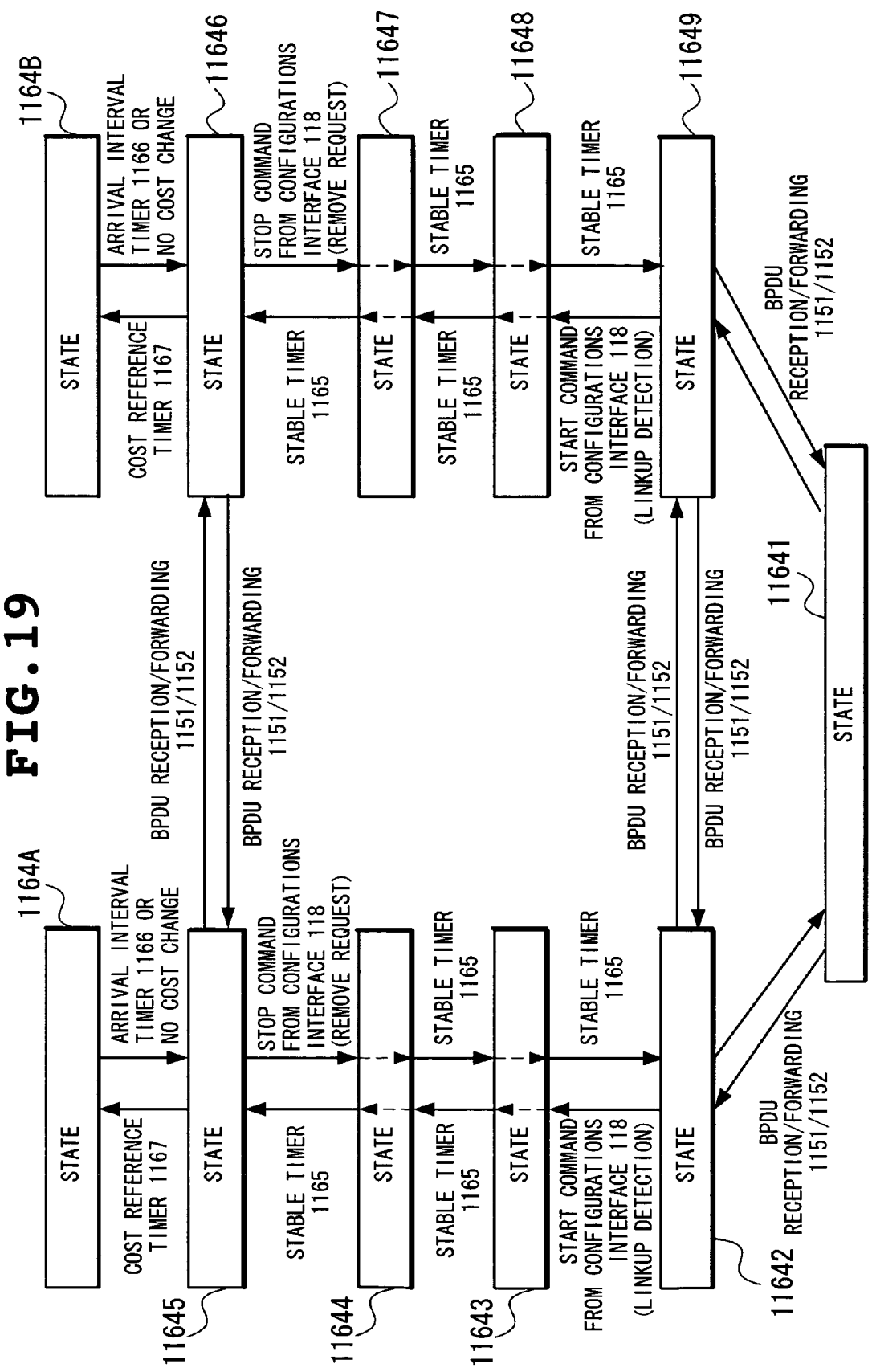
FIG. 19 is a flow diagram illustrating the operation of a main controller 1164 in a third embodiment of the present invention.

By referring to FIG. 19, the third embodiment of the present invention is different from the second embodiment in that the transition between the state 1164A and the state 1164B does not occur, and that the transition between the state 11643 and the state 11644, and the transition between the state 11647 and the state 11648 occur by detection of the switch of the current system flag in the BPDU, not by expiration of the stable timer 1165, in FIG. 18 of the second embodiment.

When receiving a notice that it is newly connected to the network from the resource monitor 119, the main controller 1164β in the third embodiment waits for a current system notice to arrive from the tree manager 1151 or the tree manager 1152. Upon reception of the current system notice contained in the BPDU from the tree manager 1151 or the tree manager 1152, the main controller 1164β sets the tree manager 1151 or the tree manager 1152 specified in the notice to current, and the tree manager 1151 or 1152 specified for auxiliary use to auxiliary, and transitions into state 11642 or state 11649. Here, although a case where transition is into the state 11642 is described as an example, the following description is identical for a case where transition is into the state 11649. (State 11641 in FIG. 19)

The main controller 1164β sets the tree manager 1151 to current and the tree manager 1152 to auxiliary. Moreover, it transmits a command to stop BPDU transmission to each of the tree managers 1151 and 1152. (State 11642 in FIG. 19)

In the state 11642, in the case that the main controller 1164β receives a node addition request from the configurations interface 118, it transitions into the state 11643. In the case that it receives a current system notice from the tree manager 1151 or the tree manager 1152, and a change occurs in the relationship between the current system and the auxiliary system, it transitions into the state 11649. (State 11642 in FIG. 19)

The main controller 1164β transmits a linkup notice to the tree manager 1152 and at the same time authorizes the tree manager 1152 to transmit the BPDU. Moreover, it activates the stable timer 1165. (State 11643 in FIG. 19)

In the state 11643, in the case that the main controller 1164β receives a current system notice contained in the BPDU from the tree manager 1151 or the tree manager 1152, and a change occurs in the relationship between the current system and the auxiliary system, it replaces the tree manager 1151 registered as current with the tree manager 1152 registered as auxiliary, such that the tree manager 1152 newly becomes current, and the tree manager 1151 becomes auxiliary. Thereafter, it activates the stable timer 1165. (State 11644 in FIG. 19)

Upon reception of the timer expiration notice from the stable timer 1165, the main controller 1164β transmits a linkup notice to the tree manager 1151 and at the same time authorizes the tree manager 1152 to transmit the BPDU. It normally is stable in this state. (State 11645 in FIG. 19)

In the state 11645, in the case that the tree manager 1152, which is the current system, serves as the root node, the main controller 1164β of this node activates the stable timer 1165, and, upon reception of the timer expiration notice from the stable timer 1165, it replaces the tree manager 1152 registered as current with the tree manager 1151 registered as auxiliary, such that the tree manager 1151 newly becomes current, and the tree manager 1152 becomes auxiliary. Moreover, it transmits the tag group changing notification to the root node of the new tree through the GVRP transmitter/receiver 1162. The contents of the tag group changing notification is reflected in the BPDU, and communicated to all the nodes. (State 11645 in FIG. 19)

The replacement of the tree managers may be performed by the tree manager 1151, which is the auxiliary system. In this case, in the state 11645, in the case that the tree manager 1151, which is the auxiliary system, serves as the root node, the main controller 1164 of the node activates the stable timer 1165, and, upon reception of the timer expiration notice from the stable timer 1165, it replaces the tree manager 1152 registered as current with the tree manager 1151 registered as auxiliary, such that the tree manager 1151 newly becomes current, and the tree manager 1152 becomes auxiliary. Moreover, it transmits the tag group changing notification to the root node of the former current tree through the GVRP transmitter/receiver 1162. The contents of the tag group changing notification is reflected in the BPDU, and communicated to all the nodes. (State 11645 in FIG. 19)

In the state 11645, in the case that the main controller 1164β receives a current system notice contained in the BPDU from the tree manager 1151 or the tree manager 1152, and a change occurs in the relationship between the current system and the auxiliary system, it transitions into the state 11646. The main controller then replaces the tree manager 1152 registered as current with the tree manager 1151 registered as auxiliary, such that the tree manager 1151 newly becomes current, and the tree manager 1152 becomes auxiliary. (State 11645 in FIG. 19)

In the state 11645, in the case that the main controller 1164β receives a node remove request from the configurations interface 118, it transitions into the state 11644. (State 11645 in FIG. 19)

The main controller 1164β notifies the tree manager 1151 of link down of all the links that are connected and at the same time transmits the command to stop BPDU transmission to the tree manager 1151. (State 11644 in FIG. 19)

In the state 11644, in the case that the main controller 1164β receives a current system notice contained in the BPDU from the tree manager 1151 or the tree manager 1152, and a change occurs in the relationship between the current system and the auxiliary system, it transitions to the state 11643, and replaces the tree manager 1152 registered as current with the tree manager 1151 registered as auxiliary, such that the tree manager 1151 newly becomes current, and the tree manager 1152 becomes auxiliary. Thereafter, it activates the stable timer 1165. (State 11643 in FIG. 19)

Upon reception of the timer expiration notice from the stable timer 1165, the main controller 1164β notifies the link manager 1151 of the link down, and at the same time transmits the command to stop BPDU reception to the tree manager 1151. Moreover, it transitions unconditionally into the state 11641 and waits until node separation. (State 11642 in FIG. 19)

When the main controller 1164β is instructed to use dynamic cost calculation by the configurations interface 118 or the GVRP transmitter/receiver 1162, it sets the cost reference timer 1167 such that it expires after a given length of time elapses since the tag group changing notification has been received. (State 11645 in FIG. 19)

Upon reception of the timer expiration notice from the cost reference timer 1167, the main controller 1164β receives information on the number of accumulated pass-through bytes from the resource monitor 119, and at the same time issues a count reset notice to reset the number of accumulated passed-through bytes of the resource monitor 119 to zero. Moreover, it calculates the cost from the accumulated pass-through bytes or the number of TCP flows, or the number of HTTP requests, and notifies of it the tree manager 1151, which is the auxiliary system. The tree manager 1151 recalculates the spanning tree based on the newly calculated cost information and notifies the main controller 1164β whether the topology has changed as a result of the calculation. It then transitions unconditionally into the state 11645. (State 1164A in FIG. 19)

By referring to FIGS. 14 and 15, an operation for adding the node 17 in the embodiment will be described in detail using a concrete example.

Referring to FIG. 14, the operational example possesses nodes 11-17 and links 21-30. However, the node 17 and the links 29 and 30 are not connected in the initial state.

Referring to FIG. 15, the operational example possesses nodes 11-17 and links 21-30.

In the initial state, all the nodes 11-16, and two tag groups to which all the ports belong have already been set; the first tag group is referred to as a tag group 41, and the second tag group is referred to as a tag group 42.

In addition, although basically all the nodes and all the ports participate in the two tag groups, a tag group may be created which consists of only some of the ports or the nodes. Hereafter, a description will be given assuming that all the nodes and all the ports participate in the two tag groups.

The nodes 11-16 have two spanning tree circuits that operate independently; the spanning tree that operates on the tag group 41 is referred to as a tree 51, and the spanning tree that operates on the tag group 42 is referred to as a tree 52.

Two systems must be created for the spanning tree, however creating two tag groups is not necessary. It is also possible to refer to as the tree 51 a spanning tree that operates on the tag group 41, and as the tree 52 a spanning tree that operates without belonging to a tag group, by setting the tag group 41 only and without using the tag group 42. Conversely, it is also possible to refer to as the tree 51 a spanning tree that operates without belonging to a tag group, and as the tree 52 a spanning tree that operates on the tag group 42, by setting the tag group 42 only and without using the tag group 41.

Although a description will particularly be given herein for a case where both the tag group 41 and the tag group 42 are used, the operation in a case where the tag group 41 and the tag group 42 are used is equally applicable to a case where only the tag group 41 is used, or only the tag group 42 is used.

The tree 51 is shown with the thick line in FIG. 14, and is stable with the node 11 serving as the root node.

The BPDU of the tree 51 is marked with the tag of the tag group 41 and the BPDU of the tree 52 is marked with the tag of the tag group 42.

At the present time, the tag of the tag group 41 is added to the data that has been transmitted from the client to the nodes 11-16. The data to which the tag has been added is being forwarded along the tree 51.

When connected to the link 29 and link 30, the node 17 starts receiving BPDU without participating in any tag groups.

Upon reception of the BPDU of each tag group, the node 17 checks that the current system at the present point of time is the tag group 41 and the auxiliary system at the present point of time is the tag group 42. The node 17 then sets its own node such that it participates in only the tag group 42 to transmit/receive the BPDU, and the tag group 41 only receives the BPDU without transmitting it.

Since a change occurs in a member of the tag group 42 when the node 17 is added, an operation for updating the tree 52 is started by the spanning tree protocol. Since there is no change in any member of the tag group 41, the tree 51 is not updated.

The tag of the tag group 41 is added to the frames that are transmitted by the client as before, and the frames continue to be forwarded along the tree 51.

After the stable timer 1165 expires, the node 11 serving as the root node of the tree 51, which is the current system tree, transmits the tag group changing notification to the node 11, which serves as the root node of the tree 51, to command it to transition the tree 51 to the auxiliary system. The node 11 then adds the tag of the tag group 42, and sets the current system flag on the BPDU that will be transmitted for the tree 52. The BPDU is propagated to all the nodes while being forwarded by each node.

The node 11 detects a change in the status of the addition of the current system flag, transitions the tree 51 to the auxiliary system, adds the flag of the tag group 41, and sets the flag of the auxiliary system on the BPDU that will be transmitted for the tree 51. The BPDU is propagated to all the nodes while being forwarded by each node.

The nodes 11-17 check that the current system flag has been added to the BPDU marked with the tag of the tag group 42, and switch the tag to be added to the frame forwarded by the client from the tag group 41 to the tag group 42. The frame to which the tag has been added is forwarded along the tree 52.

A while after the above switch has been completed, frames that flow through the tree 51 disappear.

After a given length of time has elapsed since the tag group changing notification has been sent, the node 17 determines that there are no more nodes to which the tag of the tag group 41 has to be added, and makes its own node participate in the tag group 41 to prepare for the next topology change.

As mentioned above, the node 17 could be added without stopping the network. To add nodes subsequently, the same operation is repeated. However, the tag group 41 and the tag group 42 in the above description are interchanged.

Next, by using FIG. 7, a spanning tree switching operation in a case where, in the embodiment, a forwarding path is changed from the node 15 to the node 13, will be described in detail using a concrete example.

By referring to FIG. 7, the operational example includes nodes 11-16, clients 91-96, two-way links 81-86, and two-way links 21-28.

The client 91 is connected to the node 11 by the link 81, the client 92 is connected to the node 12 by the link 82, the client 93 is connected to the node 13 by the link 83, the client 94 is connected to the node 14 by the link 84, the client 95 is connected to the node 15 by the link 85, and the client 96 is connected to the node 16 by the link 26, respectively.

The node 11 and the node 12 are connected by the link 21, the node 12 and the node 13 are by the link 22, the node 13 and the node 14 are by the link 23, the node 11 and the node 15 are by the link 24, the node 15 and the node 16 are by the link 25, the node 16 and the node 14 are by the link 26, the node 12 and the node 15 are by the link 27, and the node 13 and the node 16 are by the link 28, respectively.

Two tag groups to which all the ports of the nodes 11-16 belong have already been set; the first tag group is referred to as a tag group 41, and the second tag group is referred to as a tag group 42.

The nodes 11-16 have two spanning tree circuits that operate independently; the spanning tree that operates on the tag group 41 is referred to as a tree 51, and the spanning tree that operates on the tag group 42 is referred to as a tree 52.

The tree 41 is shown with the thick line and it is assumed that the tree 41 has been already stable with the node 13 serving as the root node, using an initial cost that has been set equally to 10 for all the links. The BPDU of the tree 51 is marked with the tag of the tag group 41 and the BPDU of the tree 52 is marked with the tag of the tag group 42.

At the present time, the tag of the tag group 41, which is the current system, is added to the data that has been transmitted from the client to the node 11-16. The data to which the tag has been added is being forwarded along the tree 51.

In the initial state, no clients among the clients 91-96 have performed data forwarding.

Each node checks the state of the BPDU at each given length of time, by transmitting a HELLO frame. This frame has the identification flags of the current system and the auxiliary system, the flag of the current system is attached only to the BPDU marked with the tag of the tag group 41, which is the current system at the present time, and the flag of the current system is not attached to the BPDU marked with the tag of the tag group 42, which is the auxiliary system.

Since each node has already been instructed to use the dynamic cost calculation by the configurations interface 118 or the GVRP transmitter/receiver 1162, each time the cost reference timer expires, it refers to the flow rate of the frames that have flowed through the link since the previous timer expired, and recalculates the cost and the spanning tree using the auxiliary system tree.

Here, it is assumed that the data forwarding was started from the client 95 to the client 93, and from the client 96 to the client 93.

At the beginning of the forwarding, the data from the client 95 to the client 93 is forwarded using the tree 51 through the links 85, 25, 28, and 83. The data from the client 96 to the client 93 is also forwarded using the tree 51 through the links 86, 28, and 83.

After a given length of time has elapsed since the data forwarding, the cost of the links 21-28 on the tree 52 is recalculated one side at a time, based on the amount of free space of the links 21-28. Here, it is assumed that, since the free bandwidth of the link 28 has decreased the cost of the link 28 on the tree 52 is changed to 15 by the node 16, and since the free bandwidth of the link 25 has decreased, although not as low as the link 28, the cost of the link 25 on the tree 52 is changed to 12 by the node 15, respectively. At this time, the cost of the tree 51 that is in use is not changed.

The node 16 detects the change in cost, and transmits the BPDUs that have been created using the cost after the change to the adjacent nodes 13, 14, and 15, respectively.

The node 15 also detects the change in cost, and transmits BPDUs that have been created using the cost after the change to the adjacent nodes 11, 12, and 16, respectively.

Upon reception from the node 16, of the BPDU to which the cost 15 has been added, the node 15 recognizes that it will cost the cost 27 to reach the node 13 through the link 25 and the link 28 after adding the cost of the link 25.

Thereafter, upon reception from the node 12, of the BPDU to which the cost 10 has been added, the node 15 recognizes that it will cost the cost 20 to reach the node 13 through the link 27 and the link 22 after adding the cost of the link 27. Since this cost is lower than the cost via link 25, the node 15 switches a stop port from the link 27 side to the link 25 side, and forms a tree that reaches the link 13 using the link 27 and the link 22.

After a topology stable timer, which was active on the node 13 serving as the root node of the tree 51, expires, the node 15 transmits the change of tag group message to the node 13 serving as the root node of the tree 41, which is the former current system tree, commanding that the current system tree, which is used for forwarding, be switched from the tree 51 to the tree 52. The contents of the tag group changing notification is reflected in each of the BPDUs of the tree 51 and the tree 52 that are transmitted from the node 13, and communicated to all the nodes.

After completing transmitting of the change of tag group message to the root node of the former current system, the node 13 switches the tree, which its own node uses to forward the frames that it receives from the client 93 and transmits into the network, from the tree 51 that has been used until then to the tree 52. After completing the switch, the frames that have been transmitted from the client 93 to the client 95 are forwarded to the client 95 through the link 83, the link 22, the link 27, and the link 85.

In this manner, the forwarding paths of the frames that are transmitted from the client 93 to the client 95 and from the client 93 to the client 96 are distributed to resolve the congestion of the link 28.

Thereafter, every time the cost reference timer expires, the spanning tree is recalculated using the cost calculation based on the free bandwidth of the link, and the dynamical path change to reflect the free bandwidth in the cost is periodically performed. As a result, the traffic of each link is distributed, such that it is possible to distribute the load of the link, and prevent congestion.

Next, the effect of the embodiment will be described.

In the past, since the cost was calculated using link capacity and used to select a path at the time of spanning tree construction, it was impossible to change the path for dynamic load distribution according to the traffic.

In the embodiment, by calculating the link cost based on dynamic information such as the free bandwidth and the server load, it is possible to distribute the traffic load.

Moreover, in the past, every time the cost is dynamically varied according to the traffic status, the spanning tree was reconstructed to change the paths while forwarding of data frame was stopped locally or over the entire network, such that sometimes the network stopped during reconstruction.

In the embodiment, by generating the spanning tree after a change in cost while continuing to operate the tree that existed before the change, and switching the spanning tree that is to be used after the new spanning tree has been stable, it is possible to distribute the load without stopping the network for a spanning tree reconfiguration concomitant to a path change.

This also allows the probability of occurrence of congestion to be lowered.

Fourth Embodiment

Hereafter, a fourth embodiment of the present invention will be described in detail by referring to the drawings.

The fourth embodiment of the present invention is suited to a case where, in the first embodiment, the tags and the spanning trees that are to be used are switched as a function of the destination node, and the destination node is set to be a root node.

If frames were transmitted over a network in which IEEE 802.1D and IEEE 802.1w are operating, there were the problems that the path with the minimum cost to a destination would not always be selected, unused links would appear, the load would concentrate on the root node, and the network would stop for an extended time in the event of a root node failure and so on.

In the embodiment, by forwarding frames using a tree whose destination serves as the root node, frame transmission to the destination at minimum cost, improvement in the utilization ratio of a link, and enhancement of resistance to a root node failure are realized.

Figure 20:
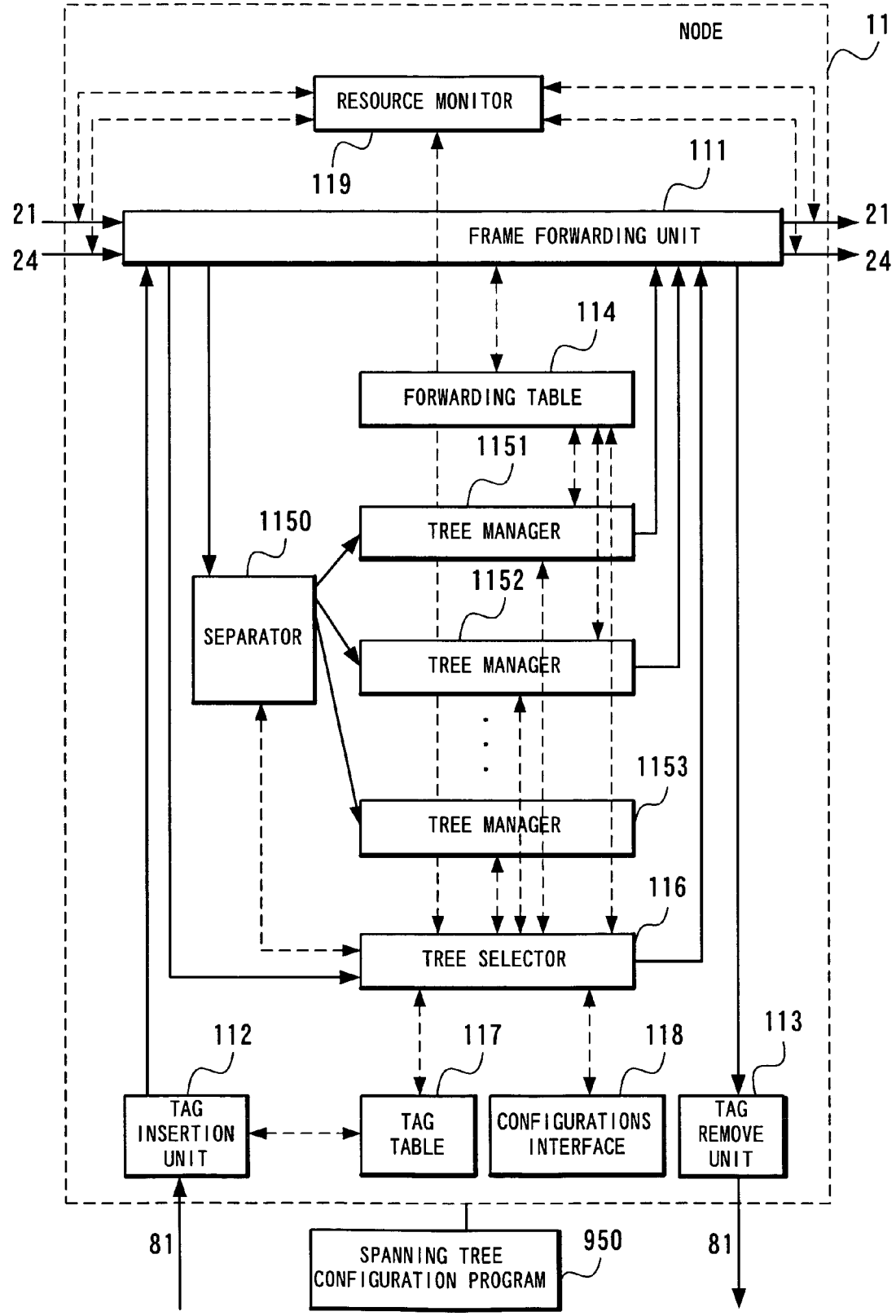
FIG. 20 is a block diagram illustrating the configuration of a node 11 in a fourth embodiment of the present invention.

By referring to FIG. 20, the fourth embodiment of the present invention is different from the first embodiment in that as many tree managers 1151 as the number of nodes that exist in the network are established in FIG. 8 of the first embodiment.

The tree manager 1151 possesses the same functions as the tree manager 1151 shown in FIG. 8 of the first embodiment of the present invention.

The tree manager 1152 and the tree manager 1153 are the same tree manager as the tree manager 1151. Hereafter, although a description will be given using the tree manager 1151 as a representative of the tree managers 1151-1153, the description in regard to the tree manager 1151 is also applicable equally to the tree managers 1152-1153, unless otherwise noted.

As many tree managers as the number of nodes that exist in the network, or, in the case that a subnet or the like is partitioned to create a hierarchy, the number of nodes that exist in the same hierarchy, are created by the tree selector 116. Therefore, although the number of tree managers may increase from one to infinity, the tree managers are collectively represented as the tree managers 1151-1153 in FIG. 20.

The tree selector 116 of FIG. 20 possesses, in addition to the function of the tree selector 116 shown in FIG. 8 of the first embodiment of the present invention, a function of generating a new tree manager in the case that a new node is detected in the network or the hierarchy. It also possesses a function of notifying other nodes of the detection of a new node, and a function of receiving new node detection notices from other nodes to generate a tree manager. Moreover, it possesses a function of detecting the remove of nodes to remove tree managers, a function of notifying other nodes of the detection of removed nodes, and a function of receiving node remove notices from other nodes to remove the tree manager.

Figure 21:
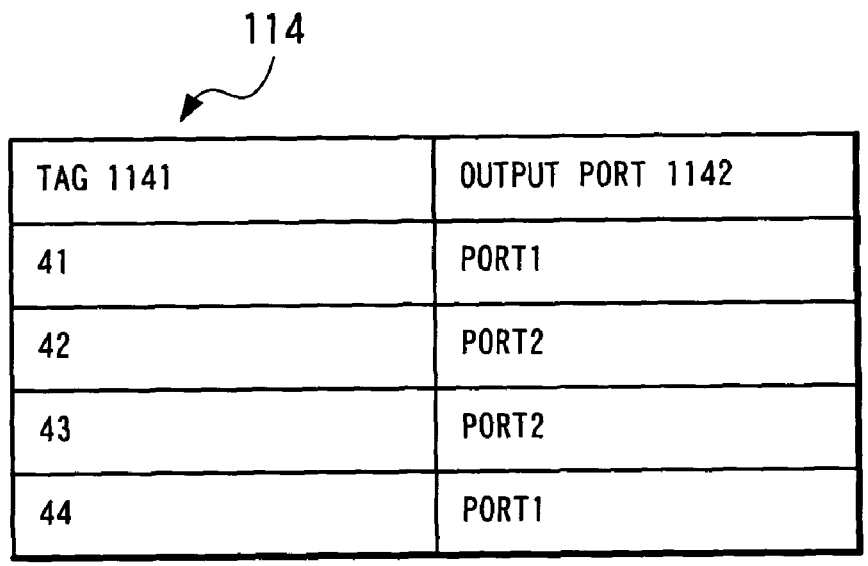
FIG. 21 is a table illustrating a configuration example of a forwarding table 114 in the fourth embodiment of the present invention.

FIG. 21 is a configuration example of a forwarding table 114 in FIG. 20 of the embodiment, in which an output port is determined by taking a tag as a key.

The tag field 1141, which is a field serving as an index for searches, checks whether the information in this field matches the contents written in the tag of the frame that has been received.

The output port 1142 is a field in which the ports to which the frame should be forwarded when the contents written in the tag of the frame that has been received match the contents of the field 1141 is described.

In addition, the embodiment is applicable not only to cases where tag forwarding is performed to determine a forwarding destination port according to the contents of the tag as shown in the operational example, but equally to conventionally performed normal MAC address forwarding, which determines a forwarding destination according to a MAC address. In this case, a plurality of ports corresponding to the suitable MAC addresses may be written in the output port field 1142.

Figure 22:
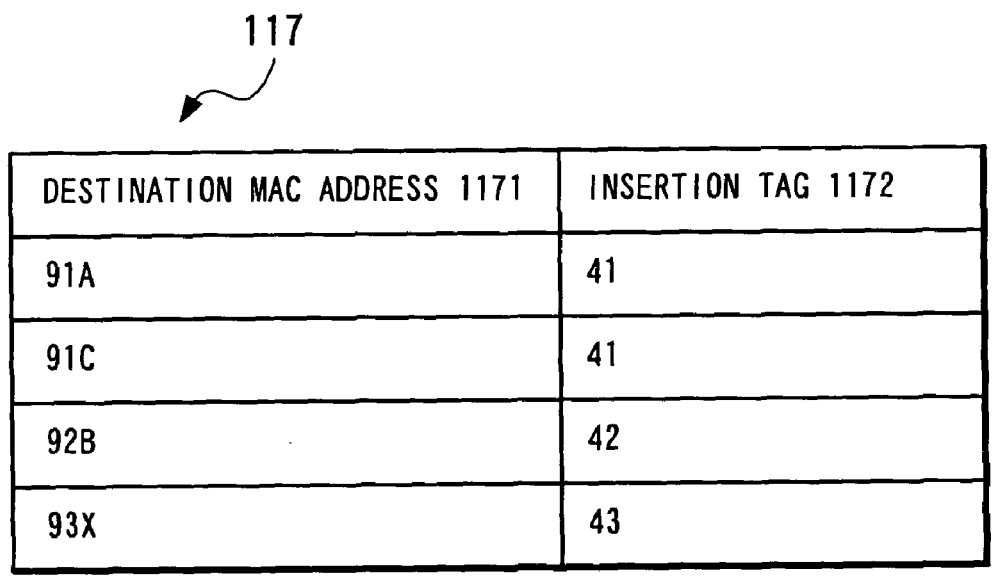
FIG. 22 is a table illustrating a configuration example of a tag table 117 in the fourth embodiment of the present invention.

FIG. 22 is a configuration example of a tag table 117 in FIG. 20 of the embodiment, in which a tag where a destination MAC address is inserted as a key is determined.

A destination MAC address 1171, which is a field serving as an index for searches, checks whether the information in this field matches the contents written in the destination MAC address field, that is, a MAC DA field, of the frame that has been received and if they match, inserts the tag described in an insertion tag field 1172 into the frame that has been received.

The insertion tag field 1172 is a field in which a tag to be inserted is written with respect to the destination MAC address field 1171. In the embodiment, the destination node ID is written, and the ID is inserted into the frame as a tag.

Figure 23:
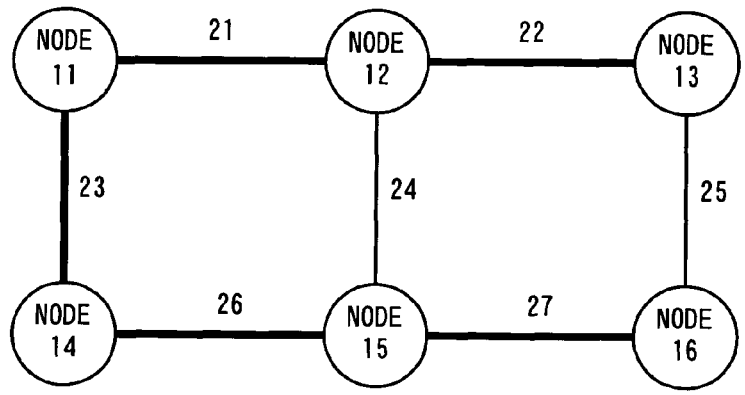
FIG. 23 is a block diagram illustrating the configuration of a tree 61 in the fourth embodiment of the present invention.

FIG. 23 is a configuration diagram of a tree 61 that is a configuration diagram of the spanning tree in which the node 11 serves as the root node. The tree 61 is created such that the priority value of the node 11 is set to a value lower than each of the nodes 12-16. The tree 61 is used for transmitting frames that are directed to the node 11 and for transmitting broadcast frames from the node 11 to each of the nodes 12-16.

Figure 24:
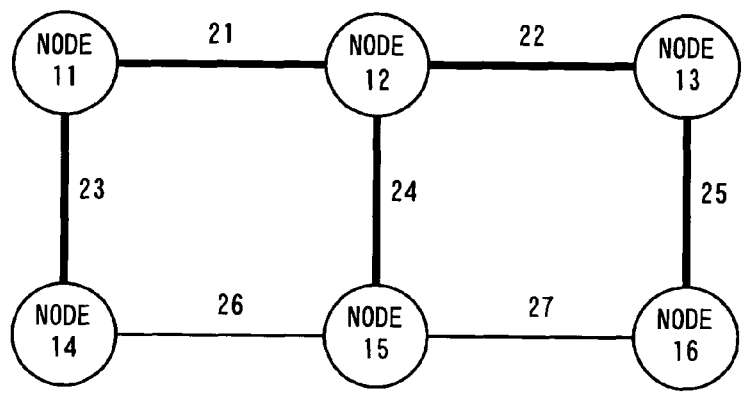
FIG. 24 is a block diagram illustrating the configuration of a tree 62 in the fourth embodiment of the present invention.

FIG. 24 is a configuration diagram of a tree 62 that is a configuration diagram of the spanning tree in which the node 12 serves as the root node. The tree 62 is created such that the priority value of the node 12 is set to a value lower than each of the node 11 and the nodes 13-16. The tree 62 is used for transmitting frames that are directed to the node 12 and for transmitting broadcast frames from the node 12 to each of the node 11 and the nodes 13-16.

Figure 25:
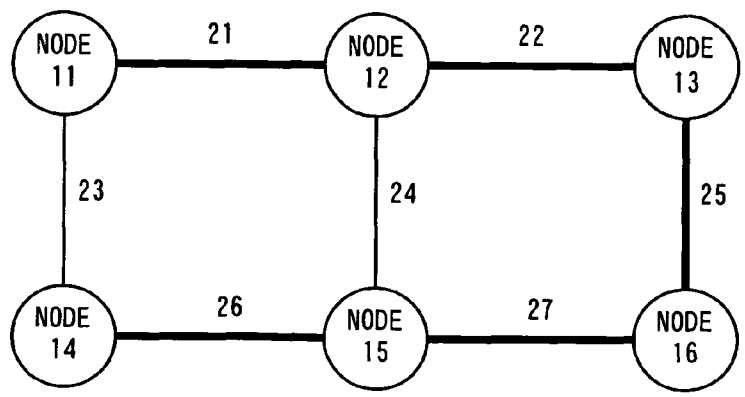
FIG. 25 is a block diagram illustrating the configuration of a tree 63 in the fourth embodiment of the present invention.

FIG. 25 is a configuration diagram of a tree 63 that is a configuration diagram of the spanning tree in which the node 13 serves as the root node. The tree 63 is created such that the priority value of the node 13 is set to a value lower than each of the nodes 11-12 and the nodes 14-16. The tree 63 is used for transmitting frames that are directed to the node 13 and for transmitting broadcast frames from the node 13 to each of the nodes 11-12 and the nodes 14-16.

Figure 26:
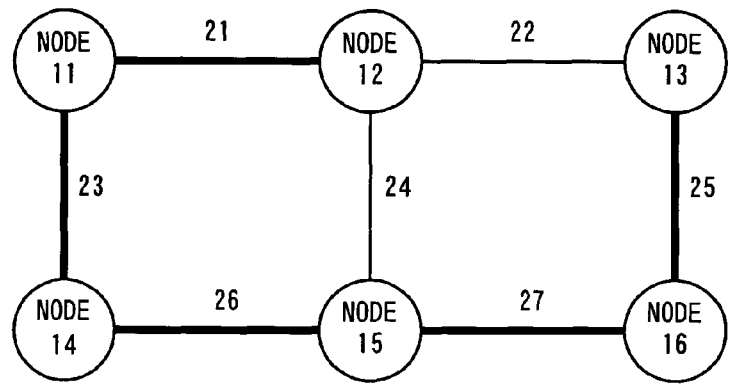
FIG. 26 is a block diagram illustrating the configuration of a tree 64 in the fourth embodiment of the present invention.

FIG. 26 is a configuration diagram of a tree 64 that is a configuration diagram of the spanning tree in which the node 14 serves as the root node. The tree 64 is created such that the priority value of the node 14 is set to a value lower than each of the nodes 11-13 and the nodes 15-16. The tree 64 is used for transmitting frames that are directed to the node 14 and for transmitting broadcast frames from the node 14 to each of the nodes 11-13 and the nodes 15-16.

Figure 27:
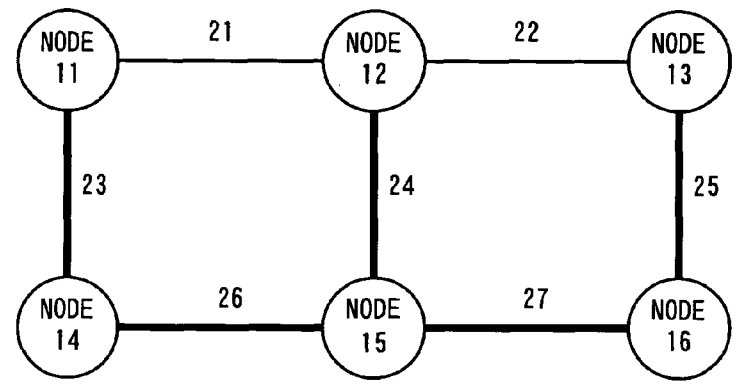
FIG. 27 is a block diagram illustrating the configuration of a tree 65 in the fourth embodiment of the present invention.

FIG. 27 is a configuration diagram of a tree 65 that is a configuration diagram of the spanning tree in which the node 15 serves as the root node. The tree 65 is created such that the priority value of the node 15 is set to a value lower than each of the nodes 11-14 and the node 16. The tree 65 is used for transmitting frames that are directed to the node 15 and for transmitting broadcast frames from the node 15 to each of the nodes 11-14 and the node 16.

Figure 28:
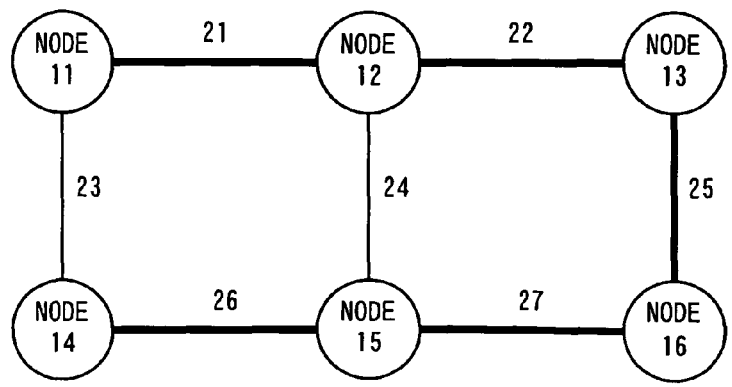
FIG. 28 is a block diagram illustrating the configuration of a tree 66 in the fourth embodiment of the present invention.

FIG. 28 is a configuration diagram of a tree 66 that is a configuration diagram of the spanning tree in which the node 16 serves as the root node. The tree 66 is created such that the priority value of the node 16 is set to a value lower than each of the nodes 11-15. The tree 66 is used for transmitting frames that are directed to the node 16 and for transmitting broadcast frames from the node 16 to each of the nodes 11-15.

Next, by using FIGS. 23-28, an operation for creating the tree 63 will be described, in a case where the node 13 is newly added to the network that has already been formed by the nodes 11-12 and the nodes 1416.

When the node 13 is added to the network, the node 13 receives the BPDU frame that is transmitted from the adjacent node and generates a tree manager for each identification tag that is newly detected. In this example, five tree managers are created, in which each of the nodes 11-12 and the nodes 14-16 serves as a root node.

Next, the node 13 generates a tag ID from a node ID, generates a tree manager in which the priority value of its own node is set to be low, adds the tag ID to a BPDU that is to be outputted by the tree manager and transmits it. Here, it is assumed that the tag ID is 43.

The nodes 12 and 16 newly receive the BPDU whose tag ID is 43, generate a tree manager and transmit the BPDU to which the tag ID 43 has been added to the adjacent node.

By repeating the above operation for transmitting the BPDU, the tree 63 is completed.

Next, by referring to FIGS. 23-28, a procedure will be described, in which each of the nodes 11-16 in each of the diagrams transmits a frame to each of the nodes 11-16, to show that the frame that has been transmitted is delivered to the destination through a path with the minimum cost, and that load distribution is realized for the link resources. In addition, it is assumed that the costs of each link are equal, the configuration of each of the trees 61-66 in each of the diagrams is completed, and the topology is stable.

The tree 61 is used to transmit frames from each of the nodes 12-16 to the node 11. For example, when a frame is transmitted from the node 15 to the node 11, the node 15 adds the tag ID 41, which is an identification tag of the tree 61, to the data frame, and transmits it.

The tree 62 is used to transmit frames from each of the node 11 and nodes 13-16 to the node 12. For example, when a frame is transmitted from the node 14 to the node 12, the node 14 adds the tag ID 42, which is an identification tag of the tree 62, to the data frame, and transmits it.

The tree 63 is used to transmit frames from each of the nodes 11-12 and the nodes 14-16 to the node 13. For example, when a frame is transmitted from the node 11 to the node 13, the node 11 adds the tag ID 43, which is an identification tag of the tree 63, to the data frame, and transmits it.

The tree 64 is used to transmit frames from each of the nodes 11-13 and the nodes 15-16 to the node 14. For example, when a frame is transmitted from the node 12 to the node 14, the node 12 adds the tag ID 44, which is an identification tag of the tree 64, to the data frame, and transmits it.

The tree 65 is used to transmit frames from each of and the nodes 11-14 and the node 16 to the node 15. For example, when a frame is transmitted from the node 16 to the node 15, the node 16 adds the tag ID 45, which is an identification tag of the tree 65, to the data frame, and transmits it.

The tree 66 is used to transmit frames from each of the nodes 11-15 to the node 16. For example, when a frame is transmitted from the node 14 to the node 16, the node 14 adds the tag ID 46, which is an identification tag of the tree 66, to the data frame, and transmits it.

The tree 61 is used to broadcast frames from the node 11 to all the nodes in the network. For example, the node 11 adds the tag ID 41, which is an identification tag of the tree 61, to the data frame whose destination serves as the broadcast, and transmits it.

The tree 62 is used to broadcast frames from the node 12 to all the nodes in the network. For example, the node 12 adds the tag ID 42, which is an identification tag of the tree 62, to the data frame whose destination serves as the broadcast, and transmits it.

The tree 63 is used to broadcast frames from the node 13 to all the nodes in the network. For example, the node 13 adds the tag ID 43, which is an identification tag of the tree 63, to the data frame whose destination serves as the broadcast, and transmits it.

The tree 64 is used to broadcast frames from the node 14 to all the nodes in the network. For example, the node 14 adds the tag ID 44, which is an identification tag of the tree 64, to the data frame whose destination serves as the broadcast, and transmits it.

The tree 65 is used to broadcast frames from the node 15 to all the nodes in the network. For example, the node 15 adds the tag ID 45, which is an identification tag of the tree 65, to the data frame whose destination serves as the broadcast, and transmits it.

The tree 66 is used to broadcast frames from the node 16 to all the nodes in the network. For example, the node 16 adds the tag ID 46, which is an identification tag of the tree 66, to the data frame whose destination serves as the broadcast, and transmits it.

By forwarding the data frame after adding the tag in transmission in the above manner, the data frame can be forwarded through the path with the minimum cost. Moreover, since the frame is forwarded using a plurality of trees each having a different root node, it is understood that the traffic load can be distributed without the occurrence of phenomena that the traffic concentrates in the vicinity of the root node and the further from the root node, the lower the link utilization rate becomes, as in the spanning trees shown in the conventional technologies 1 and 2.

Next, in FIGS. 23-28, an operation in case a failure occurs at the node will be described by taking as an example a case in which a failure occurs at the node 12. In addition, it is assumed that in the initial state, the trees 61-66 have already been constructed and are stable.

For the tree 61, if the node 12 stops due to a failure, by means of a rapid spanning tree scheme specified in IEEE 802.1w, a route that passes through the link 25, the link 27, the link 26, and the link 23 is selected as a route from the node 13 to the node 11 to continue to forward the frames to the node 11 and the frames that are broadcast from the node 11 to each of the nodes.

For the tree 62, if the node 12 stops due to a failure, the tree must be reconfigured because the node 12 is the root node. A node different from the node 12 becomes the root node to reconfigure the tree 62 before recovery of the node 12. Although it takes several tens of seconds in IEEE 802.1D and several seconds in IEEE 802.1w for the reconfiguration, since the tree 62 is originally a tree for the frames that are transmitted from each of nodes to the root 12, and the frames that are broadcast from the root 12 to each of nodes, the reconfiguration does not affect communication between the nodes other than the node 12 even if the reconfiguration takes a long time.

For the tree 63, if the node 12 stops due to a failure, by means of a rapid spanning tree scheme specified in IEEE 802.1w, a route that passes through the link 23, the link 26, the link 27, and the link 25 is selected as a route from the node 11 to the node 13 to continue to forward the frames to the node 13 and the frames that are broadcast from the node 13 to each of the nodes.

For the tree 64, if the node 12 stops due to a failure, by means of a rapid spanning tree scheme specified in IEEE 802.1w, the tree is reconfigured to continue to forward the frames from each of the nodes to the node 14 and the frames that are broadcast from the node 14 to each of the nodes.

For the tree 65, if the node 12 stops due to a failure, by means of a rapid spanning tree scheme specified in IEEE 802.1w, the tree is reconfigured to continue to forward the frames from each of the nodes to the node 15 and the frames that are broadcast from the node 15 to each of the nodes.

For the tree 66, if the node 12 stops due to a failure, by means of a rapid spanning tree scheme specified in IEEE 802.1w, a route that passes through the link 23, the link 26, and the link 27 is selected as a route from the node 11 to the node 16 to continue to forward the frames to the node 16 and the frames that are broadcast from the node 16 to each of the nodes.

Figure 29:
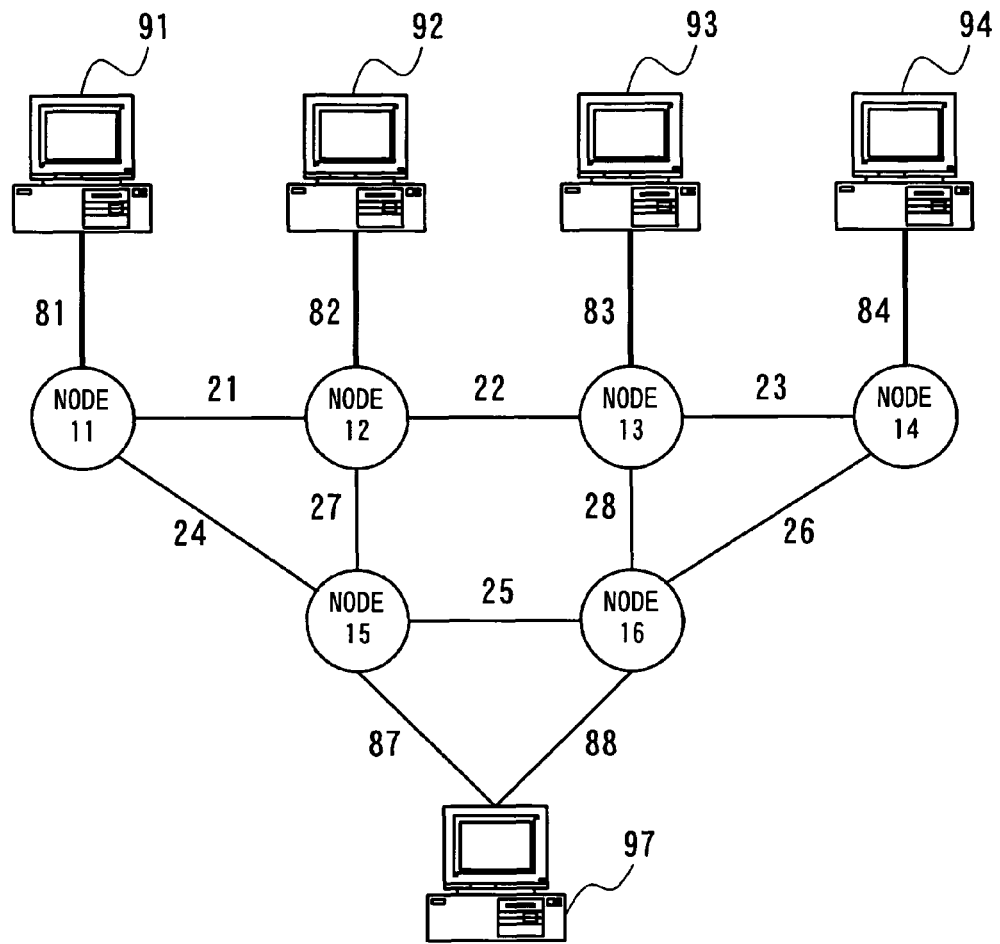
FIG. 29 is a block diagram illustrating the configuration of the fourth embodiment of the present invention.
Figure 30:
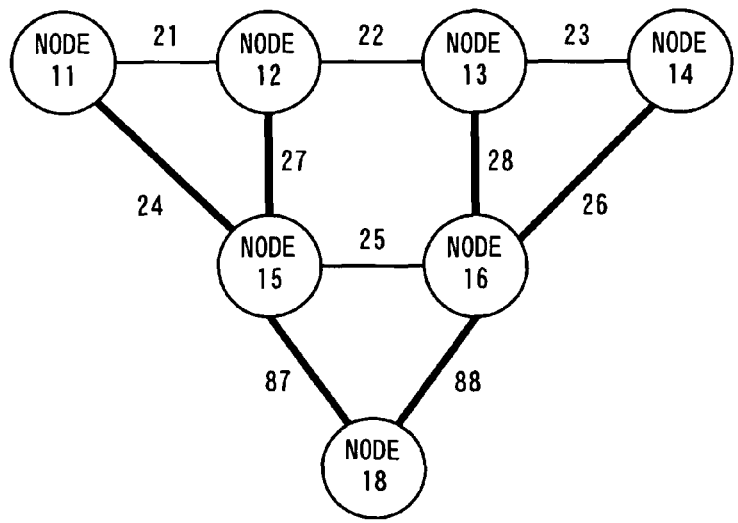
FIG. 30 is a block diagram illustrating the configuration of a tree 74 in the fourth embodiment of the present invention.

Next, by referring to FIGS. 29 and 30, a method for configuring a spanning tree will be de described, in a case where a portion of the clients of FIG. 7 in the first embodiment is connected to a plurality of nodes by dual homing.

In FIG. 29, a client 97 is a collection of one or more clients, and possesses a function of transmitting/receiving frames between itself and the node 15 and the node 16 through the link 87 and link 88.

The link 87 is a two-way link that connects from the client 97 to the node 15 and from the node 15 to the client 97.

The link 88 is a two-way link that connects from the client 97 to the node 16 and from the node 16 to the client 97.

As in the case of the client 97 in FIG. 29, if a group of clients that is connected to a plurality of nodes exist, the spanning tree is set by considering the client as a virtual node.

FIG. 30 is a network configuration diagram in the case that the client 97 is assumed to be a virtual node 18 in FIG. 29.

A spanning tree 74 is a spanning tree with the node 18 serving as the root node. The frames that have been transmitted from each of the nodes 11-16 to the node 18 reach the node 18, that is, the client 97, using the spanning tree 74. Moreover, the broadcast frame that has been transmitted from the client 97, that is, the node 18, is also broadcast to each of the nodes 11-16 along the spanning tree 74.

In addition, since the node 18 is a virtual node, the node 15 or 16 performs the actual operation of the node 18 on its behalf. Which of the node 15 or the node 16 acts for the operation of the node 18 is determined by methods such as manual setting via the configurations interface 118, and automatic setting to the node with a lower node ID or to the node with a higher node ID.

Next, by referring to FIG. 29, a method for performing communication without establishing a virtual node will be described, in a case where the client 97 is connected by dual homing to the node 15 and the node 16 through the link 87 and the link 88.

In FIG. 29, the node 15 and the node 16 detect that the client 97 is connected to a plurality of nodes through the setting in the configurations interface or by learning. The node 15 detects that the client 97 is connected to the node 16. The node 16 detects that the client 97 is connected to the node 15.

The node 15 and the node 16 exchange a control message with each other to determine which of the node 15 or the node 16 forwards the frame to the client 97. The forwarding node is determined to the node with a lower node ID or a higher node ID, or the node that was preset by the settings and so on.

Upon determination of the forwarding node, the client 97 is assumed to be connected only to the node 16, and forwarding of the frame is started. The nodes 11-16 recognize by leaning or the like that the client 97 is connected to the node 16, add the identification tag of the tree with the node 16 serving as the root node to the frame addressed to the client 97, and transmit it.

The node 15 and the node 16 always monitor the status of each other by means of Keep Alive or the like. If the node 15 cannot check the operation of the node 16, the node 15 forwards the frame from the client 97 to the nodes 11-16. The nodes 11-16 then learn that 15 is added as the node ID to the frame that has been transmitted from the client 97, and transmit the frame addressed to the client 97 to the node 15.

The above operation allows the client 97 to transmit/receive the frames. The above operation is also applicable equally to the case where the node 15 is replaced by the node 16.

Next, by referring to FIG. 29, a method for rapidly notifying the fact that the connection destination of the client 97 is changed by performing communication without establishing a virtual node, and, having a failure detection node transmit a switch notice to all the nodes in the network, will be described in the case where the client 97 is connected by dual homing to the node 15 and the node 16 through the link 87 and the link 88.

In FIG. 29, the node 15 and the node 16 detect that the client 97 is connected to a plurality of nodes through the setting in the configurations interface 118 or by learning. The node 15 detects that the client 97 is connected to the node 16. The node 16 detects that the client 97 is connected to the node 15.

The node 15 and the node 16 exchange a control message with each other to determine which of the node 15 or the node 16 forwards the frame to the client 97. The forwarding node is determined to the node with a lower node ID or a higher node ID, or the node that was preset by the settings and so on.

Upon determination of the forwarding node, the client 97 is assumed to be connected only to the node 16, and forwarding of the frame is started. The nodes 11-16 recognize by leaning or the like that the client 97 is connected to the node 16, add the identification tag of the tree with the node 16 serving as the root node to the frame addressed to the client 97, and transmit it.

The node 15 and the node 16 always monitor the status of each other by means of Keep Alive or the like. If the node 15 cannot check the operation of the node 16, the node 15 forwards the frame from the client 97 to the nodes 11-16. Moreover, the node 15 notifies all the nodes in the network that the node 15 has become in charge of forwarding the frame addressed to the client 97 on behalf of the node 16.

The nodes 11-16 then receive the notice, insert the tag addressed to the node 15 into the frame addressed to the client 97 and transmit the frame addressed to the client 97 in the direction of the node 15.

The above operation allows the client 97 to transmit/receive the frames. The above operation is also applicable equally to the case where the node 15 is replaced by the node 16.

Next, the effect of the embodiment will be described.

In the past, the path with the minimum cost to a destination was not always selected.

In the embodiment, by forwarding the frame using the tree whose destination serves as the root node, it is possible to select the path with the minimum cost to the destination.

Also, in the past, there was the problem that the load would concentrate in the vicinity of the root node while the link utilization rate would be low.

In the embodiment, by setting a plurality of systems of spanning trees that have different root nodes, it is possible to increase the utilization ratio of a link, and distribute the load without concentrating the load in the vicinity of the root node.

Also, in the past, there was the problem that tree construction in the event of a root node failure would take time, the network being stopped during that period.

In the embodiment, since forwarding frames by using the trees with the destination serving as the root node eliminates the fact that frames other than the frames whose destination serves as the root node cannot be forwarded for an extended time under the influence of the root node failure, it is possible to circumvent a network halt due to a root node failure.

This also allows the probability of occurrence of congestion to be lowered.

Fifth Embodiment

Hereafter, a fifth embodiment of the present invention will be described in detail by referring to the drawings.

The fifth embodiment of the present invention is suited to a case where, in the first embodiment, by identifying the version of the BPDU, a spanning tree is generated in which the cost at a section where a low-speed IEEE 802.1D is used, that is, the conventional technology 1, is set to be higher, and the cost at a section where a high-speed IEEE 802.1w is used, that is, the conventional technology 2, is set to be lower.

There was the problem that, in the section that uses IEEE 802.1D, since switching of the route was slow in the event of a failure, and reconfiguration of the spanning tree taking also a long time, if a tree that passes through the section was set, switching and route changes in the event of failure took time and congestion occurred, causing the loss of frames.

In the embodiment, by setting the cost in the section that uses IEEE 802.1D to be higher, it is possible to prevent the spanning tree from being set by passing through the section that uses IEEE802.1D, accelerate switching and route changes in the event of a failure, and prevent the occurrence of congestion and loss of a frame.

Figure 31:
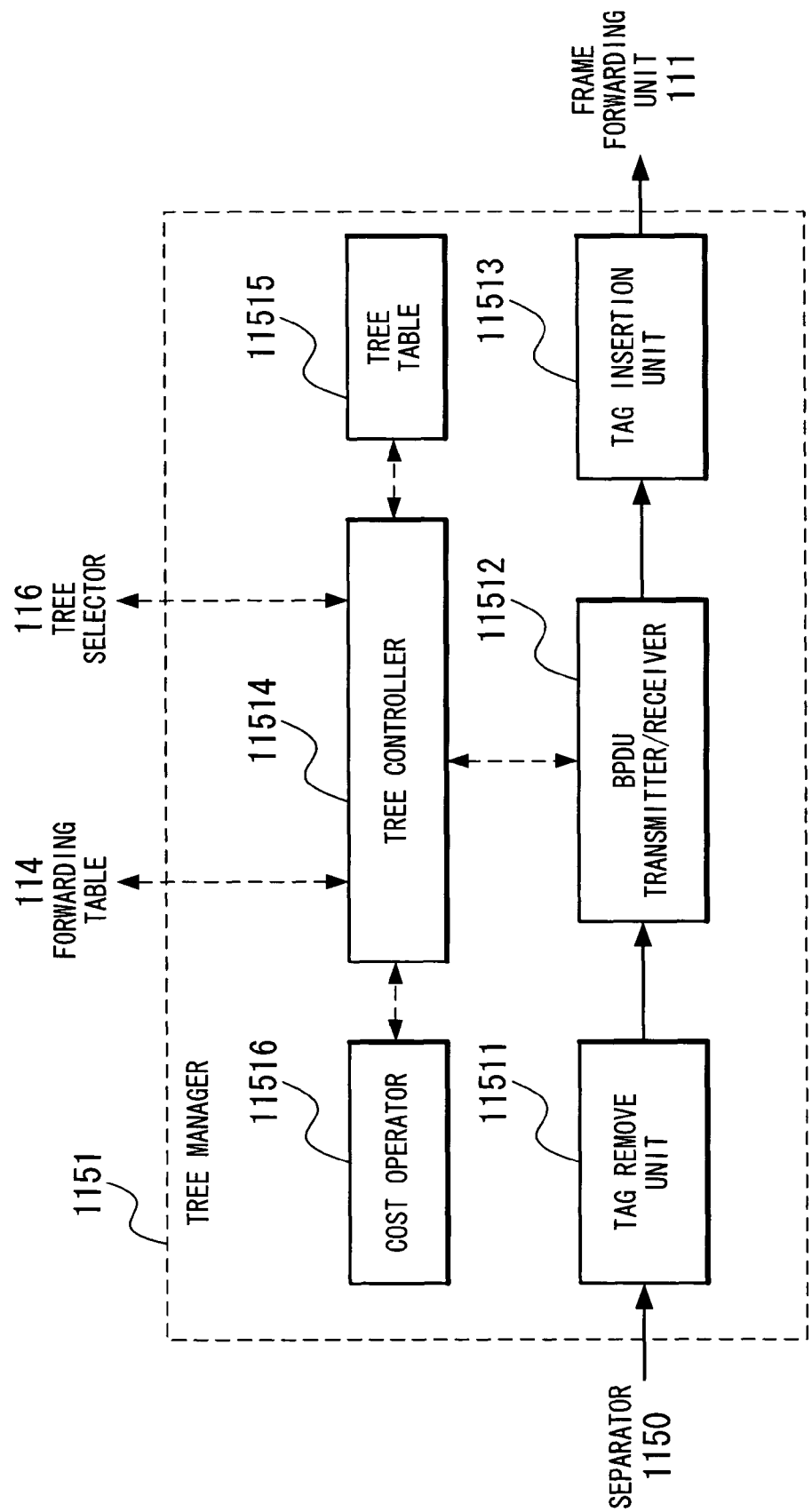
FIG. 31 is a block diagram illustrating the configuration of a tree manager 1151 in a fifth embodiment of the present invention.

By referring to FIG. 31, the fifth embodiment of the present invention is different from the first embodiment in that a cost operator 11516 is added to FIG. 10 of the first embodiment.

The tree controller 11514, in addition to performing the operations of the tree controller 11514 in the first embodiment of the present invention, determines the version of the BPDU that has been received, and, if a BPDU whose version is lower than a preset version is received, it resets the cost of the link to which the node that has transmitted the BPDU is connected with the cost operator 11516, and writes it in the tree table 11515. In addition, this operation is performed once, each time a cost change notice is received from the tree selector 116.

The cost operator 11516 adds a preset value to the value that has been entered by the tree controller 11514 and returns it to the tree controller 11514.

Upon reception of the BPDU reception notice from the BPDU transmitter/receiver 11512, the tree controller 11514 sets the value in the tree table 11515 according to the contents of the notice. The BPDU reception notice includes information on the version of the BPDU that has been received and the reception port, which is also retained in the tree table 11515.

When the cost information is notified by the tree selector 116, the tree controller 11514 sets the cost value in the table according to the information that has been notified. At this time, in the case that the cost is set for the port that has received a BPDU with a version older than the preset version, the tree controller 11514 notifies the cost operator 11516 of the cost that has been notified by the tree selector 116.

The cost operator 11516 adds a preset value to the value that has been entered by the tree controller 11514 and returns it to the tree controller 11514.

The tree controller 11514 notifies the tree table 11515 of the cost, which has been returned by the cost operator 11516, as the cost of the port.

Upon completion of the cost update for all the ports, the tree controller 11514 reconfigures the tree according to a spanning tree algorithm.

Next, by referring to FIGS. 32-34, an operation for creating a spanning tree in the embodiment will be described.

Figure 32:
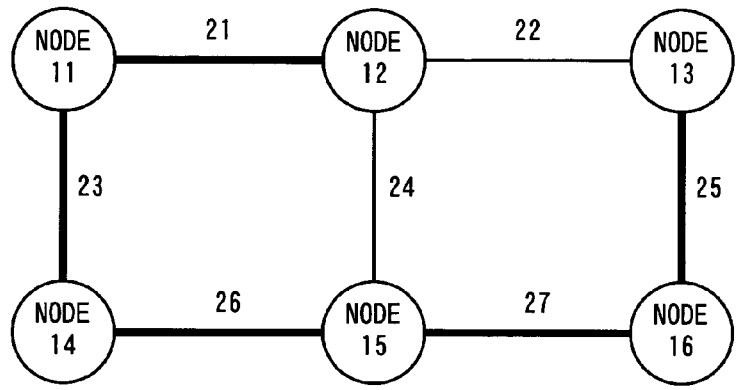
FIG. 32 is a block diagram illustrating the configuration of a tree 71 in the fifth embodiment of the present invention.
Figure 33:
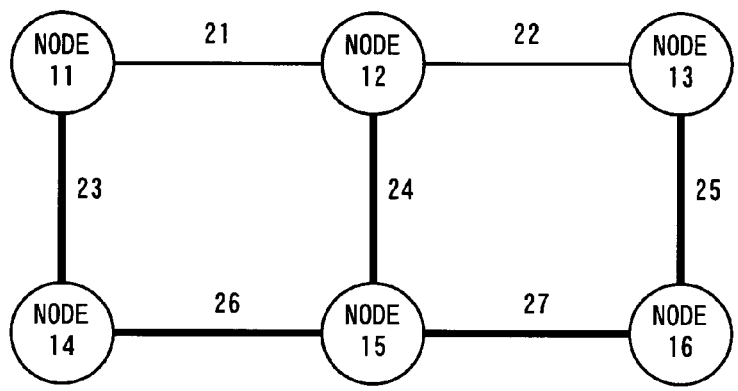
FIG. 33 is a block diagram illustrating the configuration of a tree 72 in the fifth embodiment of the present invention.
Figure 34:
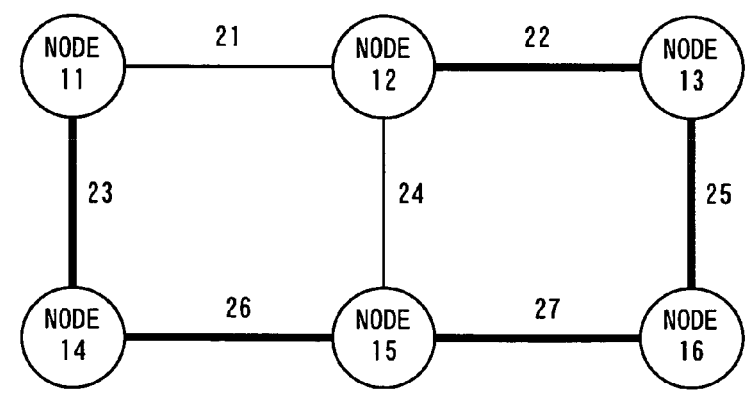
FIG. 34 is a block diagram illustrating the configuration of a tree 73 in the fifth embodiment of the present invention.

In FIGS. 32-34, it is assumed that the node 12 supports only IEEE 802.1D, not IEEE 802.1w. It is assumed that nodes other than the node 12, that is, the node 11, the node 13, the node 14, the node 15, and the node 16 support IEEE 802.1w.

Each of the node 11, the node 15, and the node 13 recognizes that the node 12 supports only 802.1D based on the version information or the protocol ID in the BPDU frame that is transmitted from the node 12.

Each of the node 11, the node 15, and the node 13 sets the cost of each of the link 21, the link 22, and the link 24 to be sufficiently higher than the cost of the other links. Here, the costs of the link 21, the link 22, and the link 24 are set to 10, and the costs of the other links, that is, the link 23, the link 26, the link 27, and the link 25, are set to 1.

FIG. 32 is a configuration diagram of the spanning tree in a case where the node 11 or the node 14 serves as the root node in the cost setting state.

FIG. 33 is a configuration diagram of the spanning tree in a case where the node 15, the node 16, or the node 14 serves as the root node in the cost setting state.

FIG. 34 is a configuration diagram of the spanning tree in a case where the node 13 or the node 16 serves as the root node in the cost setting state.

As shown in FIGS. 32-34, the embodiment allows the tree to be configured so as to detour the section that uses IEEE 802.1D, where recovery from the failure takes time, to reduce the influence on the entire network in the event of a failure, and to rapidly recover from the failure.

Next, the effect of the embodiment will be described.

In the past, in the section that uses IEEE 802.1D, switching of the route was slow in the event of a failure, also, reconfiguration of the spanning tree took a long time.

In the embodiment, by setting the cost in the section that uses IEEE 802.1D to be higher, it is possible to prevent the spanning tree from being set by passing through the section that uses IEEE802.1D, accelerate switching and route changes in the event of a failure, and lower the probabilities of occurrence of congestion and loss of a frame.

Sixth Embodiment

Hereafter, a sixth embodiment of the present invention will be described in detail by referring to the drawings.

The sixth embodiment of the present invention is suited to a case where, in the first embodiment, a separator identifies the version of the BPDU to create through the tree selector as many tree managers as the number of low-speed sections that use IEEE 802.1D, such that, in the event of a failure at the section that uses IEEE 802.1D, a route that detours the section is rapidly provided.

There was the problem that, in the section that uses IEEE 802.1D, since switching of the route was slow in the event of a failure, and reconfiguration of the spanning tree taking also a long time, in the event of a failure at the section switching and route changes in the event of failure took time and congestion occurred, causing the loss of frames.

In the embodiment, by creating as many tree managers as the number of sections that use IEEE 802.1D, creating a different tree for each section that uses IEEE 802.1D, in which the costs of the sections that use IEEE 802.1D are set to be higher, and, in case there is a need to detour the section due to a failure or the like, using the tree in which a higher cost is assigned to the sections, it is possible to take a detour rapidly, and prevent the occurrence of congestion and loss of a frame.

Figure 35:
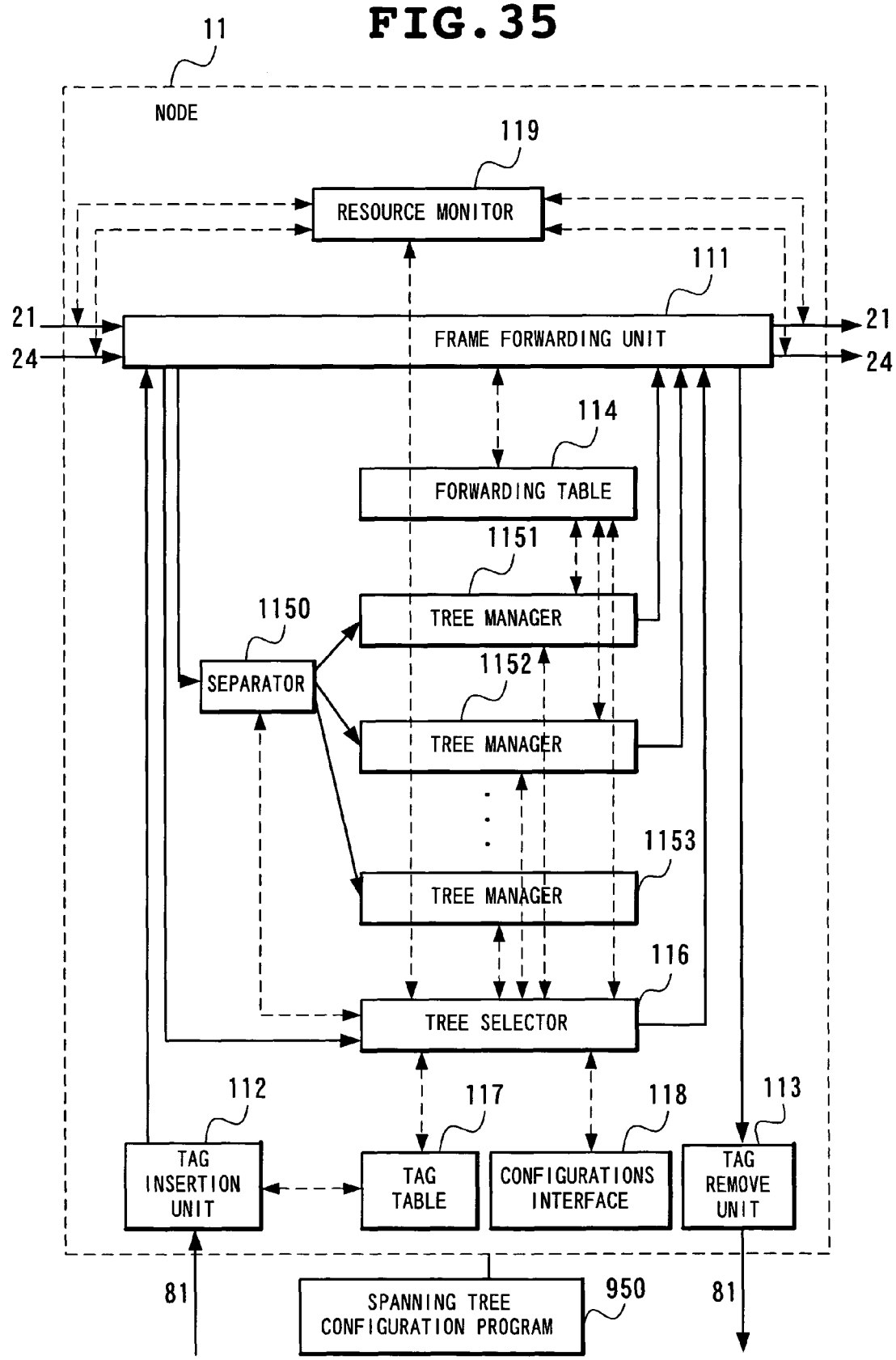
FIG. 35 is a block diagram illustrating the configuration of a node 11 in a sixth embodiment of the present invention.

By referring to FIG. 35, the sixth embodiment of the present invention is different from the first embodiment in that as many tree managers 1151 as the number of sections that use IEEE 802.1D exist in FIG. 8 of the first embodiment of the present invention.

The tree manager 1151, in addition to possessing the functions of the tree manager 1151 shown in FIG. 8 of the first embodiment of the present invention, transmits a 802.1D frame reception notice in regard to the BPDU frame to the tree selector 116 when it could confirm that the BPDU frame that has been received is compliant with IEEE 802.1D from the version field or by other means. The node ID of the node that has transmitted the BPDU frame compliant with 802.1D is written in the 802.1D frame reception notice.

The tree manager 1152 and the tree manager 1153 are the same tree manager as the tree manager 1151. Hereafter, although a description will be given using the tree manager 1151 as a representative of the tree managers 1151-1153, the description in regard to the tree manager 1151 is also applicable equally to the tree managers 1152-1153, unless otherwise noted.

As many tree managers as the number of sections that use IEEE 802.1D are created by the tree selector 116. Therefore, although the number of tree managers may increase from one to infinity, the tree managers are collectively represented as the tree managers 1151-1153 in FIG. 35.

The tree selector 116, in addition to possessing the functions of the tree selector 116 shown in FIG. 8 of the first embodiment of the present invention, possesses a function of generating a new tree manager in the case that it receives the 802.1D frame reception notice from any of the tree managers 1151-1153, a function of notifying of the node that uses 802.1D other nodes in the network, and a function of generating a tree manager based on the notices about the node that uses 802.1D, which has been transmitted by the other nodes.

The tree selector 116 possesses, in addition to the above functions, a function of detecting the fact that the node that uses 802.1D can use 802.1w due to any cause such as version upgrade to remove the tree manager, a function of communicating the information on the remove to the other nodes in the network, and a function of removing the tree manager based on the information on the remove that has been notified by the other nodes.

Figure 36:
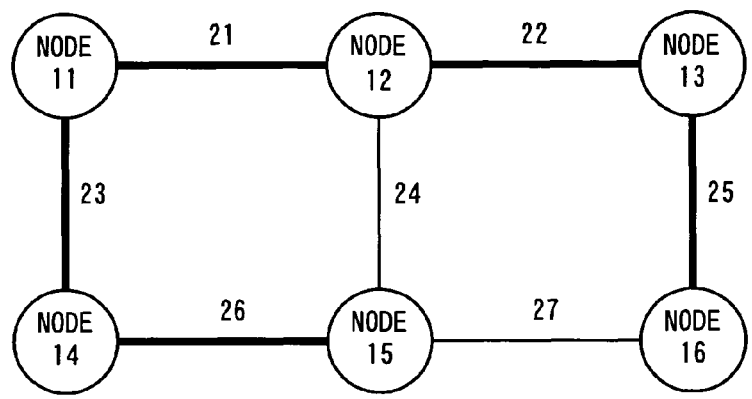
FIG. 36 is a block diagram illustrating the configuration of a tree 67 in the sixth embodiment of the present invention.

FIG. 36 is the configuration diagram of the tree 67, in which the node 11 serves as the root node, and which is created through a normal procedure of IEEE 802.1w.

Figure 37:
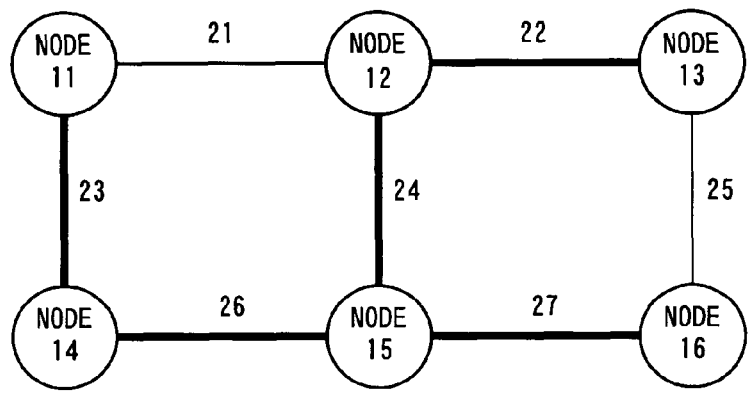
FIG. 37 is a block diagram illustrating the configuration of a tree 68 in the sixth embodiment of the present invention.

FIG. 37 is the configuration diagram of the tree 68, in which the node 11 serves as the root node, and which is created by setting the cost of the tree 21 to be higher. This tree is also used in case that a failure occurs at the link 21.

Figure 38:
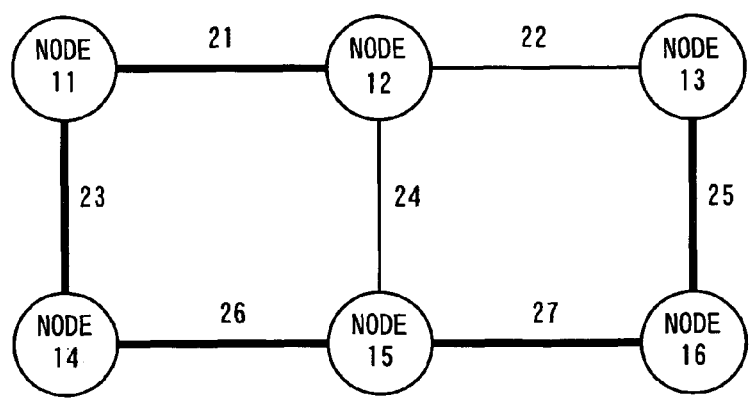
FIG. 38 is a block diagram illustrating the configuration of a tree 69 in the sixth embodiment of the present invention.

FIG. 38 is the configuration diagram of the tree 69, in which the node 11 serves as the root node, and which is created by setting the cost of the tree 22 to be higher. This tree is also used in case that a failure occurs at the link 22.

Figure 39:
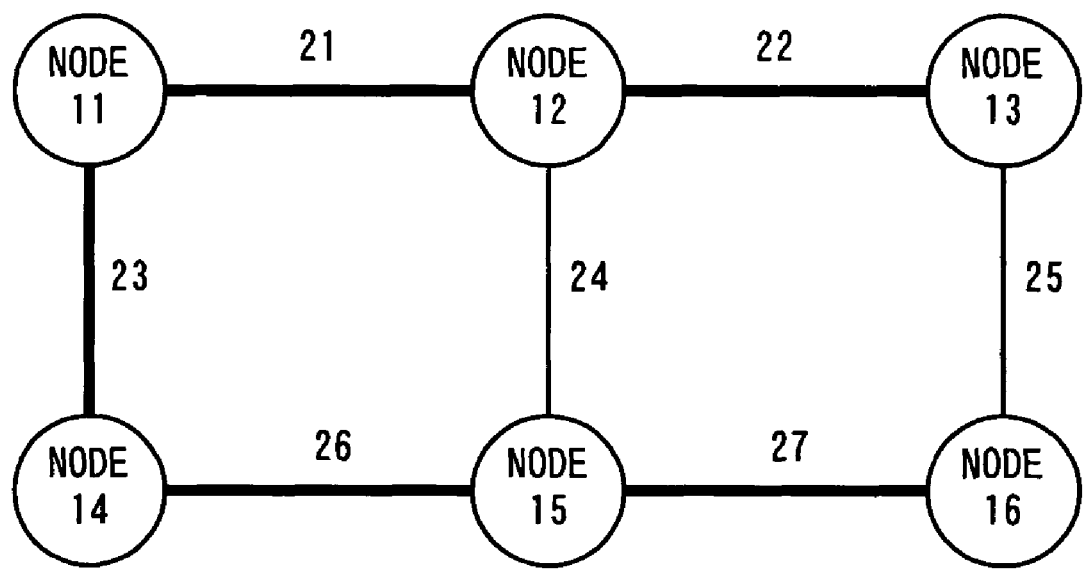
FIG. 39 is a block diagram illustrating the configuration of a tree 70 in the sixth embodiment of the present invention.

FIG. 39 is the configuration diagram of the tree 70, in which the node 11 serves as the root node, and which is created by setting the cost of the tree 24 to be higher. This tree is also used in case that a failure occurs at the link 24.

Next, by referring to FIGS. 36-39, an operation in a case where the node 12 of FIGS. 36-39 does not support IEEE 802.1w and where IEEE 802.1D is used in the link 21, the link 22, and the link 24 will be described. In addition, the root node is the node 11.

First, the spanning tree 67 shown in FIG. 36 is formed through the normal procedure according to IEEE 802.1w. At this time, since the node 12 does not support 802.1w, the BPDU frame to which the protocol ID of IEEE 802.1D has been added is transmitted from the node 12.

Upon reception of the BPDU, to which the protocol ID of IEEE 802.1D has been added, from the node 12, the node 11 generates a new tree manager, assigns a specific tag ID, which is calculated from the link ID, the node ID, and so on, to the tree manager, and broadcasts the creation of a new group to all the nodes via the GVRP frame or other frames. Here, it is assumed that a tag ID 48 is assigned as a new tag ID. At this time, the cost of the link 21 is set to be higher.

The nodes 12-16 receive and forward the new group creation notice that has been transmitted by the node 11 and generate tree managers to start exchanging the BPDU. The tag with the tag ID 48 is added to the BPDU exchanged between the tree managers that have been newly created. It is assumed that the spanning tree that is created at this time is the tree 68.

Upon reception of the BPDU, to which the protocol ID of IEEE 802.1D has been added, from the node 12, the node 13 generates a new tree manager, assigns a specific tag ID, which is calculated from the link ID, the node ID, and so on, to the tree manager, and broadcasts the creation of a new group to all the nodes via the GVRP frame or other frames. Here, it is assumed that a tag ID 49 is assigned as a new tag ID. At this time, the cost of the link 22 is set to be higher.

The nodes 11-12 and the nodes 14-16 receive and forward the new group creation notice that has been transmitted by the node 13 and generate tree managers to start exchanging the BPDU. The tag with the tag ID 49 is added to the BPDU exchanged between the tree managers that have been newly created. It is assumed that the spanning tree that is created at this time is the tree 69.

Upon reception of the BPDU, to which the protocol ID of IEEE 802.1D has been added, from the node 12, the node 15 generates a new tree manager, assigns a specific tag ID, which is calculated from the link ID, the node ID, and so on, to the tree manager, and broadcasts the creation of a new group to all the nodes via the GVRP frame or other frames. Here, it is assumed that a tag ID 50 is assigned as a new tag ID. At this time, the cost of the link 24 is set to be higher.

The nodes 11-14 and the node 16 receive and forward the new group creation notice that has been transmitted by the node 15 and generate tree managers to start exchanging the BPDU. The tag with the tag ID 50 is added to the BPDU exchanged between the tree managers that have been newly created. It is assumed that the spanning tree that is created at this time is the tree 70.

In normal times, the tree 67 is used for communication between each of the nodes, and the trees 68-70 are not used.

In case that a failure occurs at the link 21, the node 11 detects the failure at the link 21, and switches the tree that is used for forwarding immediately from the tree 67 to the tree 68. Moreover, it broadcasts the tag group changing notification to all the nodes to notify to switch the tag to be used for forwarding to the tag ID 48.

Each of the nodes 12-16 receives the tag group changing notification that has been transmitted by the node 11, and inserts the tag with the tag ID 48 to the frame to be transmitted from its own node to switch the tree to be used for forwarding from the tree 67 to the tree 68.

In addition, switching to the tree 68 in the event of a failure at the link 21 may be performed by the node 12 instead of the node 11. If the node 12 detects the failure at the link 21, it switches the tree to be used for forwarding immediately from the tree 67 to the tree 68. Moreover, it broadcasts the tag group changing notification to all the nodes to notify to switch the tag to be used for forwarding to the tag ID 48. Subsequent operations are the same as the case where the node 11 detects a failure.

Although the tree 67 is reconfigured due to the failure at the link 21, since reconfiguration at the link 21 is performed according to 802.1D, it may take time until the reconfiguration is completed.

In the embodiment, in the event of a failure at the link 21, by immediately switching the tree to be used for forwarding from the tree 67 to the tree 68, it is possible to continue to forward the frame without waiting for the reconfiguration of the tree 67.

Although the operation in a case where a failure occurs at the link 21 has been described, the operation is also applicable equally to the case where a failure occurs at the link 22 or the link 24.

Next, the effect of the embodiment will be described.

In the past, in the section that uses IEEE 802.1D, switching of the route was slow in the event of a failure, also, reconfiguration of the spanning tree took a long time.

In the embodiment, by creating as many tree manager as the number of sections that use IEEE 802.1D, creating a different tree for each section that uses IEEE 802.1D, in which the cost of the sections that use IEEE 802.1D are set to be higher, and, in case that there is a need to detour the section due to a failure or the like, performing a switch to use the tree in which the higher cost is assigned to the section, it is possible to accelerate a detour, and lower the probabilities of occurrence of congestion and loss of a frame.

Seventh Embodiment

Hereafter, a seventh embodiment of the present invention will be described in detail by referring to the drawings.

The seventh embodiment of the present invention is different from the first embodiment in that frames for failure detection are transmitted at regular short intervals using a failure detector, failure detection is performed on the ground that the frames for failure detection no longer arrive, and the failure information is notified through the resource monitor and the tree selector, to the tree manager.

In IEEE 802.1D and IEEE 802.1w, failures were detected on the ground of non arrival of HELLO frames, which are transmitted at regular intervals. However, since the transmission intervals of the HELLO frames were long, an extended time would elapse before detecting failures.

In the embodiment, the frames for failure detection are transmitted from the failure detector at regular short intervals, and rapid failure detection is performed on the ground of non arrival of a given number or for a given length of time or more of frames for failure detection.

Figure 40:
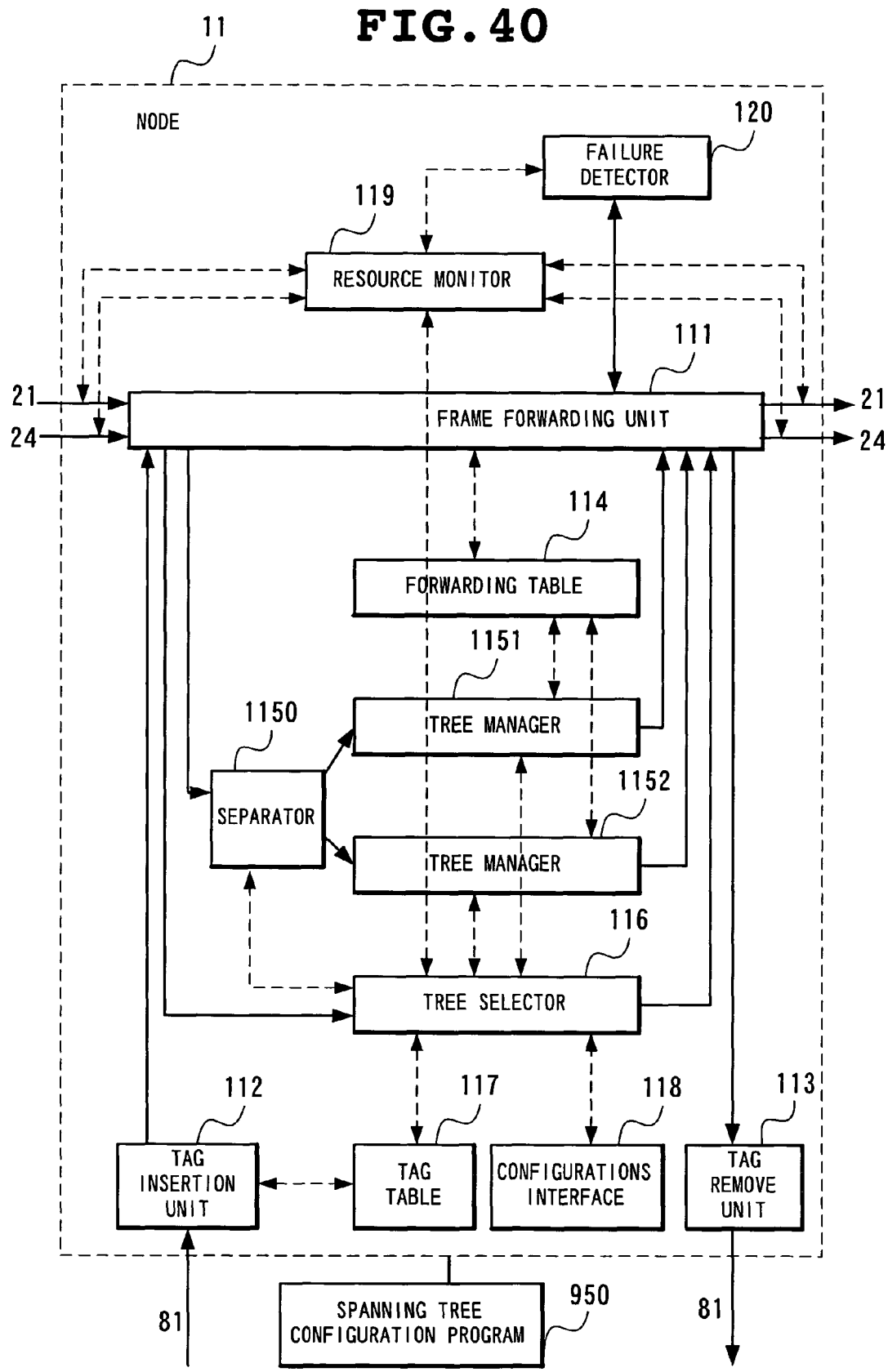
FIG. 40 is a block diagram illustrating the configuration of a node 11 in a seventh embodiment of the present invention.

By referring to FIG. 40, the seventh embodiment of the present invention is different from the first embodiment in that a failure detector 120 which transmits/receives the frame for failure detection to detect failures is added to FIG. 4 in the first embodiment.

The failure detector 120 transmits the frame for failure detection at regular intervals to the adjacent node through the frame forwarding unit 111, receives the frame for failure detection that has been transmitted by the adjacent node through the frame forwarding unit 111, and, in the case that the frame for failure detection that has been transmitted by the adjacent node cannot be received for a given length of time or more, and, in the case that non-arrival of a given number or more frames for failure detection is detected, it transmits a failure detection notice to the resource monitor 119.

The resource monitor 119 possesses, in addition to the functions of the resource monitor 119 of the first embodiment, a function of receiving the failure notice from the failure detector 120 and forwarding the failure notice to the tree selector 116.

The tree selector 116 possesses, in addition to the function of the tree selector 116 of the first embodiment, a function of receiving the failure notice from the resource monitor 119 and forwarding it to the tree managers 1151 and 1152.

The tree managers 1151 and 1152, in addition to performing the functions of the tree managers 1151-1152 of the first embodiment of the present invention, receive the failure notice from the tree selector 116 and reconfigure the spanning tree according to IEEE 802.1w and IEEE 802.1D.

Next, by referring to FIG. 40, an operational example in a case where the node 11 detects a failure at the link 21 in the embodiment will be described.

The failure detector 120 transmits the frame for failure detection at regular intervals to the node 12 and the node 15, which are adjacent nodes, through the frame forwarding unit 111, and the link 21 or the link 24.

The failure detector 120 also receives the frame for failure detection that has been transmitted from the adjacent nodes 12 and 15 through the link 21 or the link 24 and the frame forwarding unit 111. At this time, the failure detector 120 can also identify the ID of the port where the frame for failure detection arrived.

When the frame for failure detection arrives, the failure detector 120 activates the timer of the port where the frame for failure detection arrived to set it to issue a notice after a given length of time has elapsed.

Upon reception of the frame for failure detection, the failure detector 120 resets the timers established for each port. For example, when it receives the frame for failure detection from the link 21, the timer of the port to which the link 21 is connected is reset. When it receives the frame for failure detection from the link 24, the timer of the port to which the link 24 is connected is reset.

If, due to a link failure or the like, no frames for failure detection arrive at the failure detector 120 after a given length of time or more has elapsed, a time out occurs because the timer is not reset. When the time out occurs, the failure detector 120 recognizes that some sort of failure occurred, and notifies the tree manager 1151 and the tree manager 1152 of the occurrence of the failure, through the resource monitor 119 and the tree selector 116.

The tree manager 1151 and the tree manager 1152, which have received the notice, consider that the port where the failure occurred is unavailable, and reconfigure the spanning tree immediately to circumvent the failure.

Next, the effect of the embodiment will be described.

In the past, since the transmission intervals of HELLO frames that are used by the spanning tree protocol were long, a failure could not be detected rapidly.

In the embodiment, by adding a failure detector which transmits/receives the frame for failure detection at short intervals, it is possible to detect a failure more rapidly than with the HELLO frame.

This also allows the possibilities of occurrence of congestion and loss of a frame to be lowered.

Eighth Embodiment

Hereafter, an eighth embodiment of the present invention will be described in detail by referring to the drawings.

The eighth embodiment of the present invention has a configuration such that, in the first embodiment, the tags and the spanning trees that are to be used are switched as a function of the destination node, and the destination node is set to be a root node.

If frames were transmitted over a network in which IEEE 802.1D and IEEE 802.1w are operating, there were the problems that the path with the minimum cost to a destination would not always be selected, unused links would appear, the load would concentrate on the root node, and the network would stop for an extended time in the event of a root node failure and so on.

In the embodiment, by forwarding frames using a tree whose destination serves as the root node, frame transmission to the destination at minimum cost, improvement in the utilization ratio of a link, and enhancement of resistance to a root node failure are realized.

Figure 41:
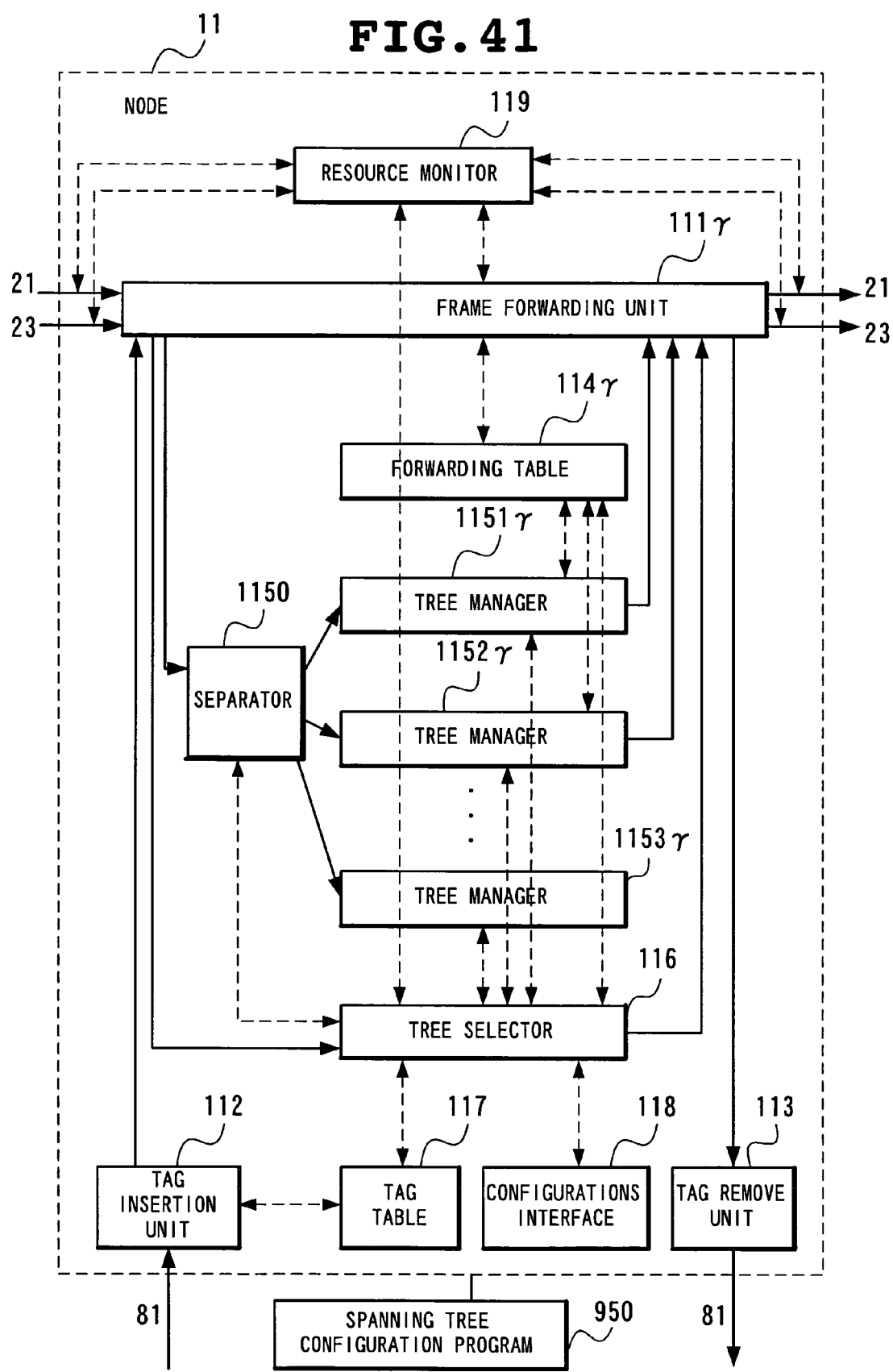
FIG. 41 is a block diagram illustrating the configuration of a node 11 in an eighth embodiment of the present invention.

By referring to FIG. 41, the eighth embodiment of the present invention is different from the first embodiment in that the frame forwarding unit 111 is replaced by a frame forwarding unit 111γ and the forwarding table 114 is replaced by a forwarding table 114γ, and, as many tree managers 1115 as the number of nodes that exist in the network after the operation has been changed are established, which are replaced by the tree managers 1151γ-1153γ, in FIG. 8 of the first embodiment.

FIG. 41 shows a case where the embodiment is applied to the node 11 shown in FIG. 23.

The frame forwarding unit 111 forwards a frame that has been received from the link 21 or the link 23 and the tag insertion unit 112 to the link 21 or the link 23 and the tag remove unit 113 or the tree selector 116 according to the description of the output port 1142 in the forwarding table 114γ. In so doing, if the description of the output port 1142 is the initial value, the frame that has been received is discarded.

The forwarding table 114γ is the same forwarding table as the forwarding table 114.

Although the tree manager 1151γ has the same configuration as the tree manager 1151, its function and operation are different. Hereafter, although a description will be given using the tree manager 1151γ as a representative of the tree managers 1151γ-1153γ, the description in regard to the tree manager 1151γ is also applicable equally to the tree managers 1152γ-1153γ, unless otherwise noted.

Figures 42, 43:
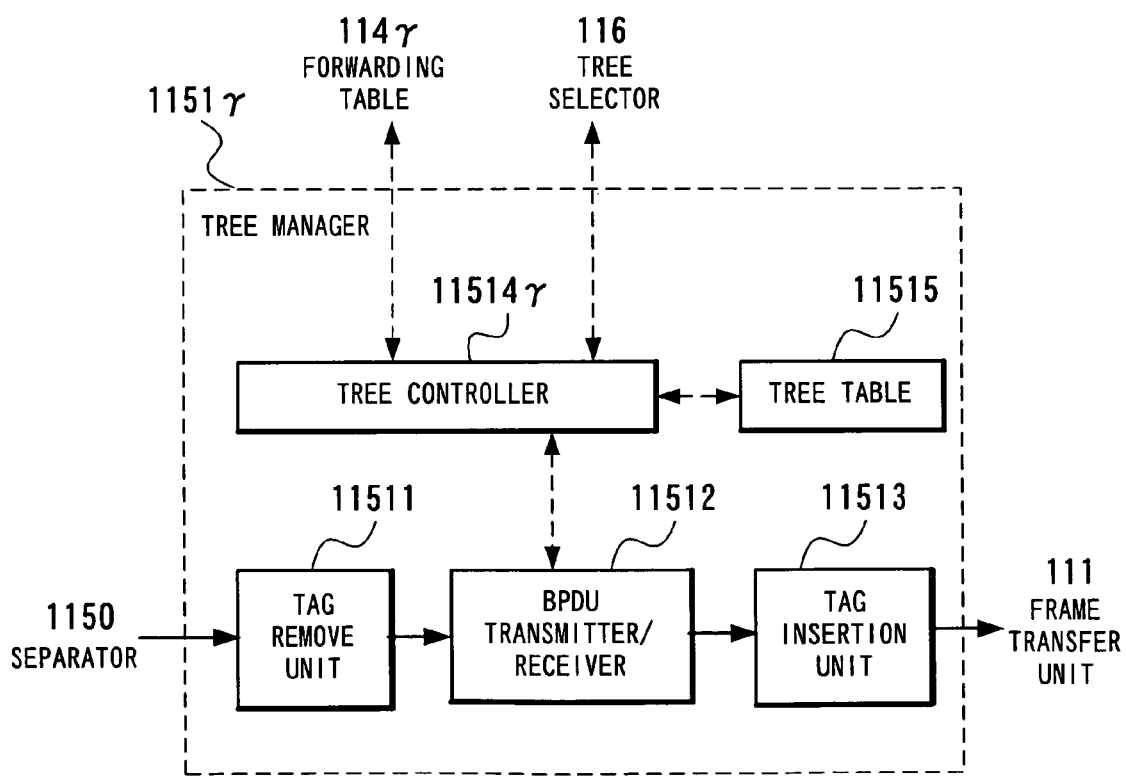
FIG. 42 is a table illustrating a configuration example of a forwarding table 114γ in the eighth embodiment of the present invention.
FIG. 43 is a block diagram illustrating the configuration of a tree manager 1151γ in the eighth embodiment of the present invention.

FIG. 42 is a configuration example of the forwarding table 114γ, in which an output port is determined by taking a forwarding tag as a key.

The tag field 1141 is the same tag field as the tag field in the forwarding table 114.

The output port 1142 is the same output port as the output port in the forwarding table 114, and referenced by the frame forwarding unit 111γ when a unicast frame is forwarded.

In FIG. 42, the "END" in the output port 1142 is an identifier that indicates that the output port entry for a destination node ID at an edge node is its own node, and is written in the output port field for a node identifier entry equal to its own node ID, for example.

FIG. 43 is a block diagram illustrating the configuration of the tree manager 1151γ.

Figure 54:
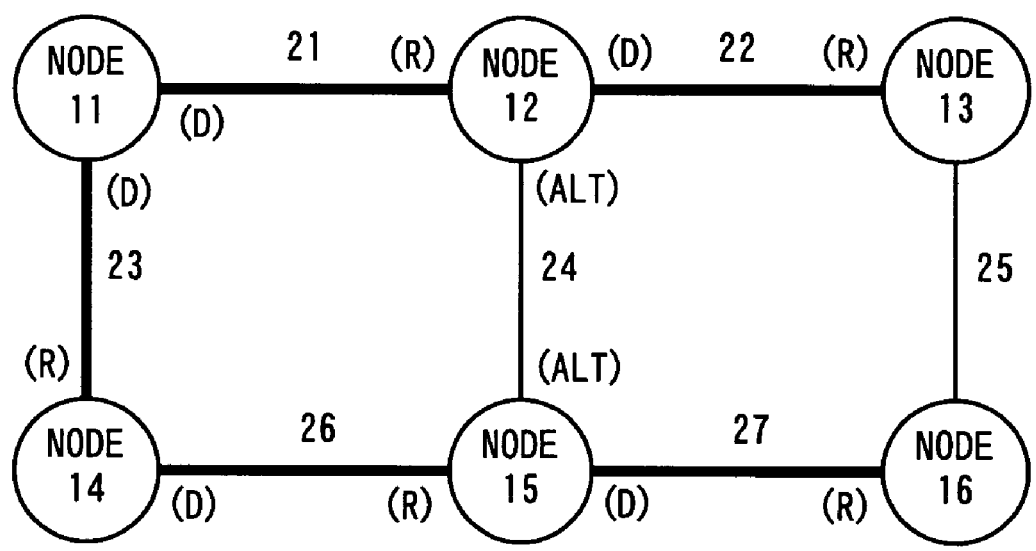
FIG. 54 is a diagram illustrating a port state of each node in the spanning tree configuration shown in FIG. 23.

In the case that the spanning tree is configured as shown in FIG. 23, the port of each of the nodes is determined as a Root Port, a Designated Port, or an Alternate Port as shown in FIG. 54 according to the configuration of the spanning tree. The Root Port is shown as (R), the Designated Port as (D), and the Alternate Port as (ALT). Of course, the types of the ports depend on the configuration of the spanning tree (position of the root node).

In the case that the tag of the tag group 41 has been added to the BPDU frame that the tree manager 1151γ transmits/receives, the tree controller 1151γ determines the Root Port according to the protocol of IEEE802.1w or IEEE802.1D. In the embodiment, the Root Port that has been determined as the output port 1142 in the entry of the tag group 41 in the forwarding table 114γ is set. In this case, at least six BPDU frames are transmitted/received.

If no Root Ports exist (node 11 in FIG. 54), the column for the output port 1142 is set to a port directed to its own node, and the frame that is marked with the tag of the tag group 41 entered by the frame forwarding unit is forwarded to the tag remove unit 113.

Next, by using FIG. 23 and FIG. 44, an operation for forwarding a unicast frame will be described by taking the unicast frame forwarding from the node 13 to the node 11 as an example.

FIG. 44 is a table illustrating the status of the port setting of each node in a spanning tree 61 and the setting of the forwarding table. In addition, FIG. 44 strictly shows the status of the settings, not the contents of the actual table.

It is assumed that in the state shown in FIG. 23, the tree 61, which is the tree of the tag group 41, has already been constructed and is stable, and that the Root Port of each of the nodes 11-16 has been determined as shown in the root port 6102 in FIG. 44, as a result, that the output port in the forwarding table 114 of each of the nodes has been determined as shown in the output port 1142 in FIG. 44.

Here, the tree 61 represents a tree with the node 11 serving as the root node. The tag 41 represents the ID (value) of the tag that indicates the tree 61. In other words, adding the tag 41 to a frame means forwarding the frame using the tree 61. It is thus shown that the number at the unit place of each of the tree number, the node number, and the tag number corresponds to each other. For example, the tree 62 represents the tree with the node 12 serving as the root, and the tag 42 represents the ID (value) of the tag that indicates the tree 62. This aspect is identical in the following description.

As mentioned above as an example, the case where a different number is assigned to each of the trees, nodes, and tags has been described, in addition, it is possible to assign the same number (ID) to the trees, node, and tags that correspond to each other, to simplify correspondence between each other for management purposes.

First, the node 13 adds the tag of the tag group 41 to a unicast frame addressed to the node 11 and transmits it. In so doing, the port on the link 22 side, which is the root port of the tree 61, is specified as the output destination port of the frame of the tag group 41 in the node 13. Therefore, the frame is outputted to the link 22 side.

Upon reception of the frame from the link 22, the node 12 searches the forwarding table by taking the tag group 41 as a key to obtain the port on the link 21 side as the output port. It then outputs the frame that has been received to the link 21 side.

Upon reception of the frame from the link 21, the node 11 checks that it is addressed to its own node, and forwards it to the tag remove unit 113.

The above operation allows the unicast frame to be forwarded from the node 13 to the node 11 through the path with the minimum cost, using the tag of the tag group 41 and the spanning tree 61.

Next, the effect of the above eighth embodiment will be described.

In the past, although the path with the minimum cost to a destination was not always selected, in the embodiment, by forwarding the frame using the tree whose destination serves as the root node, it is possible to select the path with the minimum cost to the destination.

Also, in the past, although there was the problem that the load would concentrate in the vicinity of the root node while the link utilization rate would be low, in the embodiment, by setting a plurality of systems of spanning trees that have different root nodes, it is possible to increase the utilization ratio of a link, and distribute the load without concentrating the load in the vicinity of the root node.

Also, in the past, although there was the problem that tree construction in the event of a root node failure would take time, the network being stopped during that period, in the embodiment, since forwarding frames by using the trees with the destination serving as the root node eliminates the fact that frames other than the frames whose destination serves as the root node cannot be forwarded for an extended time under the influence of the root node failure, it is possible to circumvent a network halt due to a root node failure. This also allows the probability of occurrence of congestion to be lowered.

Ninth Embodiment

Hereafter, a ninth embodiment of the present invention will be described in detail by referring to the drawings.

The ninth embodiment of the present invention has a configuration in which, in addition to a conventional output port for unicast as in the eighth embodiment, a plurality of output ports for broadcast can be written in the forwarding table to forward a broadcast frame.

In the embodiment, by forwarding the broadcast frame using a tree in which a source node in a broadcast frame serves as a root node, a broadcast frame can be transmitted to each node through the shortest paths to achieve rapid forwarding.

Figure 45:
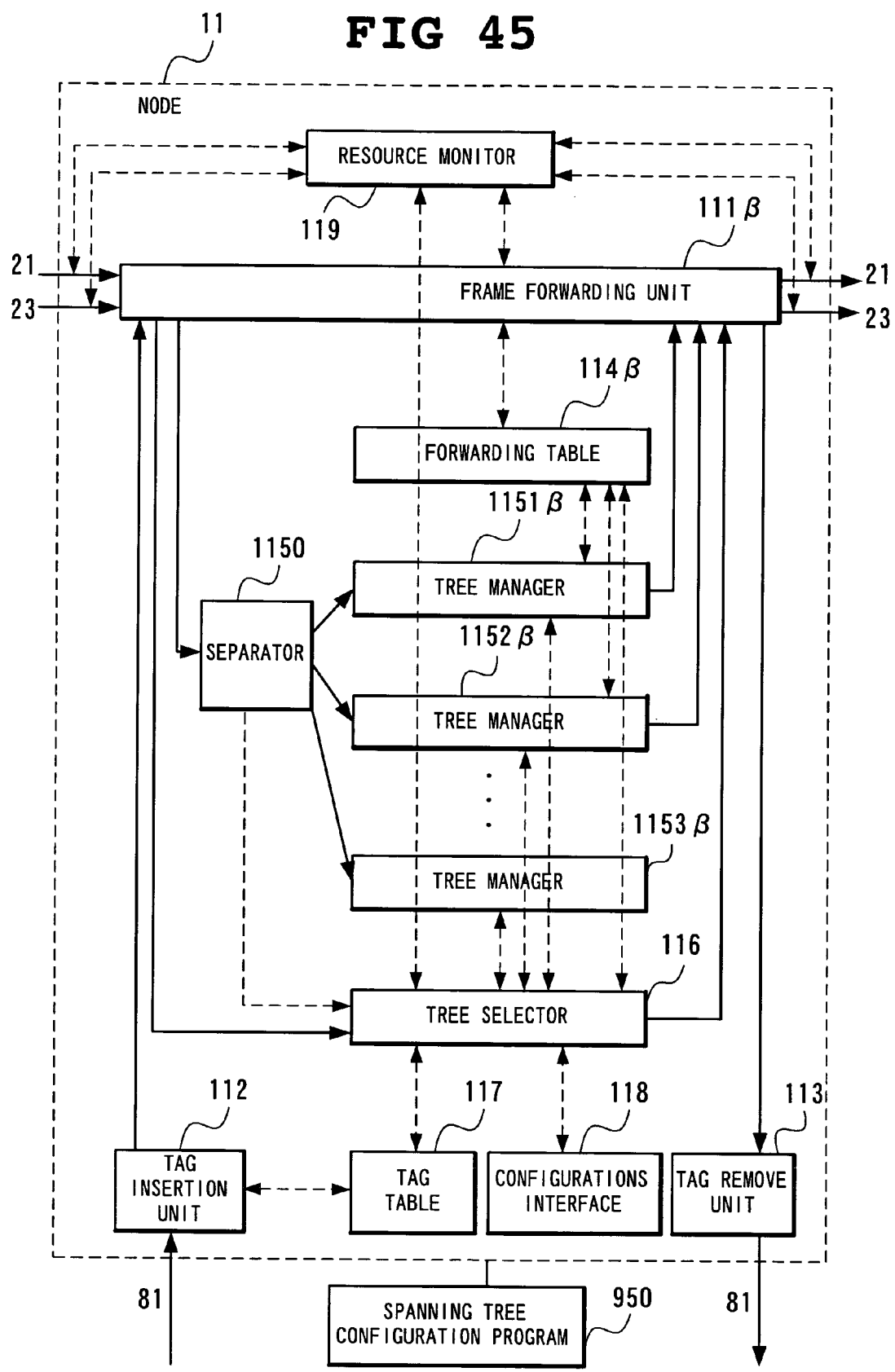
FIG. 45 is a block diagram illustrating the configuration of a node 11 in a ninth embodiment of the present invention.

By referring to FIG. 45, the ninth embodiment of the present invention is different from the eighth embodiment in that the frame forwarding unit 111 is replaced by a frame forwarding unit 111β, the forwarding table 114 is replaced by a forwarding table 114β, and the tree managers 1151-1153 are replaced by the tree managers 1151β-1153β, in FIG. 41 of the eighth embodiment.

FIG. 45 shows a case where the embodiment is applied to the node 11 shown in FIG. 23.

The frame forwarding unit 111β forwards a frame that has been received from the link 21 or the link 24, and the tag insertion unit 112 to the link 21 or the link 24 and the tag remove unit 113 or the tree selector 116 according to the description in the forwarding table 114β.

In so doing, if the frame that has been entered is a unicast frame, the frame that has been received is forwarded to the port written in the output port 1142 in the forwarding table 114β.

If the frame that has been entered is a broadcast frame, the frame that has been received is copied and forwarded to a plurality of ports written in the broadcast output port 1144 in the forwarding table 114β and to tag remove unit. Moreover, if an initial value has been set in the broadcast output port, the frame that has been received is forwarded only to the tag remove unit.

Discrimination between the broadcast frame and the unicast frame is performed based on a destination MAC address 3201, or a Priority 5003 of an expansion tag or an expansion tag information field 5004.

Figures 46, 47:
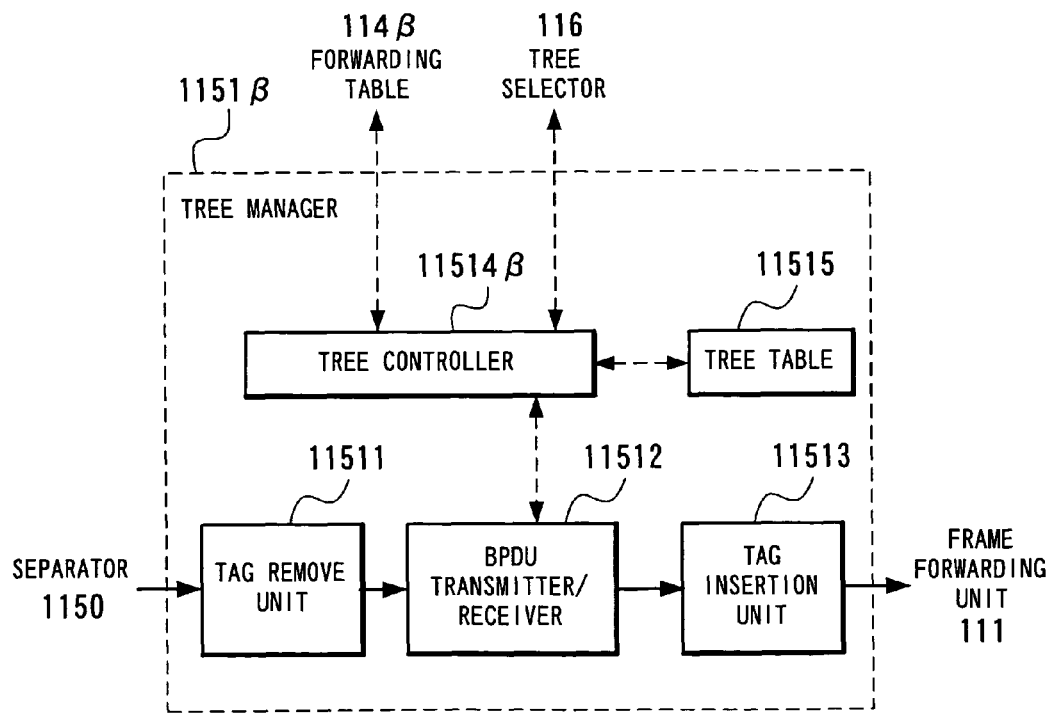
FIG. 46 is a table illustrating a configuration example of a forwarding table 114β in the ninth embodiment of the present invention.
FIG. 47 is a block diagram illustrating the configuration of a tree manager 1151β in the ninth embodiment of the present invention.

The forwarding table 114β is a forwarding table consisting of the forwarding table 114 to which a broadcast output port 1144 column has been added. The broadcast output port 1144 column indicates the port that becomes the forwarding destination when a broadcast signal that has been transmitted from the node shown in the corresponding tag ID is received. An example of the forwarding table in the embodiment is shown in FIG. 46. In FIG. 46, a link name is used as showing the forwarding destination port. FIG. 46 shows the forwarding table 114β of the node 11 in the network formed from a physical topology shown in FIGS. 23-28. As mentioned above, the tree to be used for frame forwarding is different for each destination node in the present invention. For example, frame forwarding is performed by using the tree in FIG. 23 for the frame addressed to the node 11, while the tree in FIG. 24 is used for the frame addressed to the node 12.

Here, the way to read FIG. 46 will be described by taking as an example a case of the broadcast of the frame to which tag 42 has been added. The fact that the tag 42 has been added indicates that the broadcast frame has been transmitted from the node 12. The broadcast frame that has been transmitted from the node 12 is forwarded using the tree of FIG. 24 in the present invention. Therefore, upon reception of the broadcast frame, the node 11 has to forward it to the link 23 side. FIG. 46 is prepared based on such a reasoning.

Although the tree manager 1151β has the same configuration as the tree manager 1151, its function and operation are different. Hereafter, although a description will be given using the tree manager 1151β as a representative of the tree managers 1151β-1153β, the description in regard to the tree manager 1151β is also applicable equally to the tree managers 1152β-1153β, unless otherwise noted.

FIG. 46 is a configuration example of a forwarding table 114β, in which an output port is determined by taking a tag as a key.

The tag field 1141 is the same tag field as the tag field in the forwarding table 114.

The output port 1142 is the same output port as the output port in the forwarding table 114, and referenced by the frame forwarding unit 111β when a unicast frame is forwarded.

The broadcast output port 1144 is an output port that is referenced by the frame forwarding unit 111β when a broadcast frame is forwarded. A plurality of ports are written in the column, and if two or more ports are written, as many frames as the number of ports that are written are copied and forwarded. If the value that has been set in the column is still the initial value when referenced by the frame forwarding unit 111β, the frame forwarding unit 111β forwards the frame only to the tag remove unit.

In addition, (END) in FIG. 46 means that the identifier "END" is written if the node is an edge node.

FIG. 47 is a block diagram illustrating the configuration of the tree manager 1151β.

In the case that the tag of the tag group 41 has been added to the BPDU frame that the tree manager 1151β transmits/receives, the tree controller 11514β determines the Root Port and the Designated Port according to the protocol of IEEE802.1w or IEEE802.1D. In the embodiment, the Root Port that has been determined as the output port 1142 in the entry of the tag group 41 in the forwarding table 114β, and one or mode Designated Ports that has been determined as the broadcast output port 1144, are respectively set.

If no Root Ports exist, the column for the output port 1142 is set to a port directed to its own node, and the frame that is marked with the tag of the tag group 41 entered by the frame forwarding unit is forwarded to the tag remove unit 113.

If there are no Designated Ports, the column of the broadcast output port 1144 is set to the initial value of the table.

Next, by using FIG. 23 and FIG. 48, an operation for forwarding a broadcast frame will be described.

FIG. 48 is a table illustrating the setting of port of each node in a spanning tree 61 and the setting of the forwarding table.

It is assumed that in the initial state, the tree 61, which is the tree of the tag group 41, has already been constructed and is stable, and that the Root Port and the Designated Port of each of the nodes 11-16 have been determined as shown in the root port 6102 and the designated port 6104 in FIG. 48, as a result, that the output port and the auxiliary port in the forwarding table 114β of each of the nodes have been determined as shown in the output port 1142 and the broadcast output port 1144 in FIG. 48.

First, the node 11 adds the tag of the tag group 41 to a broadcast frame, and transmits it. In so doing, the ports on the link 21 side and the link 23 side, which are the designated ports of the tree 61, are specified as the output destination port of the broadcast frame of the tag group 41 in the node 11. Therefore, the frame is copied and outputted to the link 21 side and the link 23 side, and, to the tag remove unit.

Upon reception of the broadcast frame from the link 21, the node 12 searches the forwarding table by taking the tag group 41 as a key to obtain the port on the link 22 side as the broadcast output port. It then outputs the broadcast frame that has been received to the link 22 side and the tag remove unit.

Upon reception of the broadcast frame from the link 22, the node 13 searches the forwarding table by taking the tag group 41 as a key to obtain the initial value as the broadcast output port. It then outputs the frame that has been received to the tag remove unit.

Upon reception of the broadcast frame from the link 23, the node 14 searches the forwarding table by taking the tag group 41 as a key to obtain the port on the link 26 side as the broadcast output port. It then outputs the frame that has been received to the link 26 side and the tag remove unit.

Upon reception of the broadcast frame from the link 26, the node 15 searches the forwarding table by taking the tag group 41 as a key to obtain the port on the link 27 side as the broadcast output port. It then outputs the frame that has been received to the link 27 side and the tag remove unit.

Upon reception of the broadcast frame from the link 27, the node 16 searches the forwarding table by taking the tag group 41 as a key to obtain the initial value as the broadcast output port. It then outputs the frame that has been received to the tag remove unit.

The above operation allows the broadcast frame that has been outputted from the node 11 to be forwarded to each of the nodes on the network through the path with the minimum cost.

Next, the effect of the above ninth embodiment will be described.

In the past, although the path with the minimum cost to a destination was not always selected when broadcasting, in the embodiment, by forwarding the broadcast frame using the tree whose source node serves as the root node, it is possible to select the path with the minimum cost to all the nodes to forward the broadcast frame.

Also, in the past, although there was the problem that the load would concentrate in the vicinity of the root node while the link utilization rate would be low, in the embodiment, by setting a plurality of systems of spanning trees that have different root nodes, it is possible to increase the utilization ratio of a link, and distribute the load without concentrating the load in the vicinity of the root node.

Also, in the past, although there was the problem that tree construction in the event of a root node failure would take time, the network being stopped during that period, in the embodiment, since forwarding broadcast frames by using the trees with the source node serving as the root node eliminates the fact that broadcast frames other than the frames whose source node serves as the root node cannot be forwarded for an extended time under the influence of the root node failure, it is possible to circumvent a network halt due to the root node failure. This also allows the probability of occurrence of congestion to be lowered.

Tenth Embodiment

Hereafter, a tenth embodiment of the present invention will be described in detail by referring to the drawings.

The tenth embodiment of the present invention has a configuration in which two output ports are written in the forwarding table so that one output port can be used if the other output port cannot be used due to a failure or the like in the eighth embodiment, and the failure detector in the seventh embodiment is used for rapid failure detection.

In the embodiment, by forwarding the unicast frame using the tree with the destination serving as the root node, and pre-registering with the forwarding table an alternate output port that is determined by the spanning tree, a rapid recovery from a failure is achieved.

Figure 49:
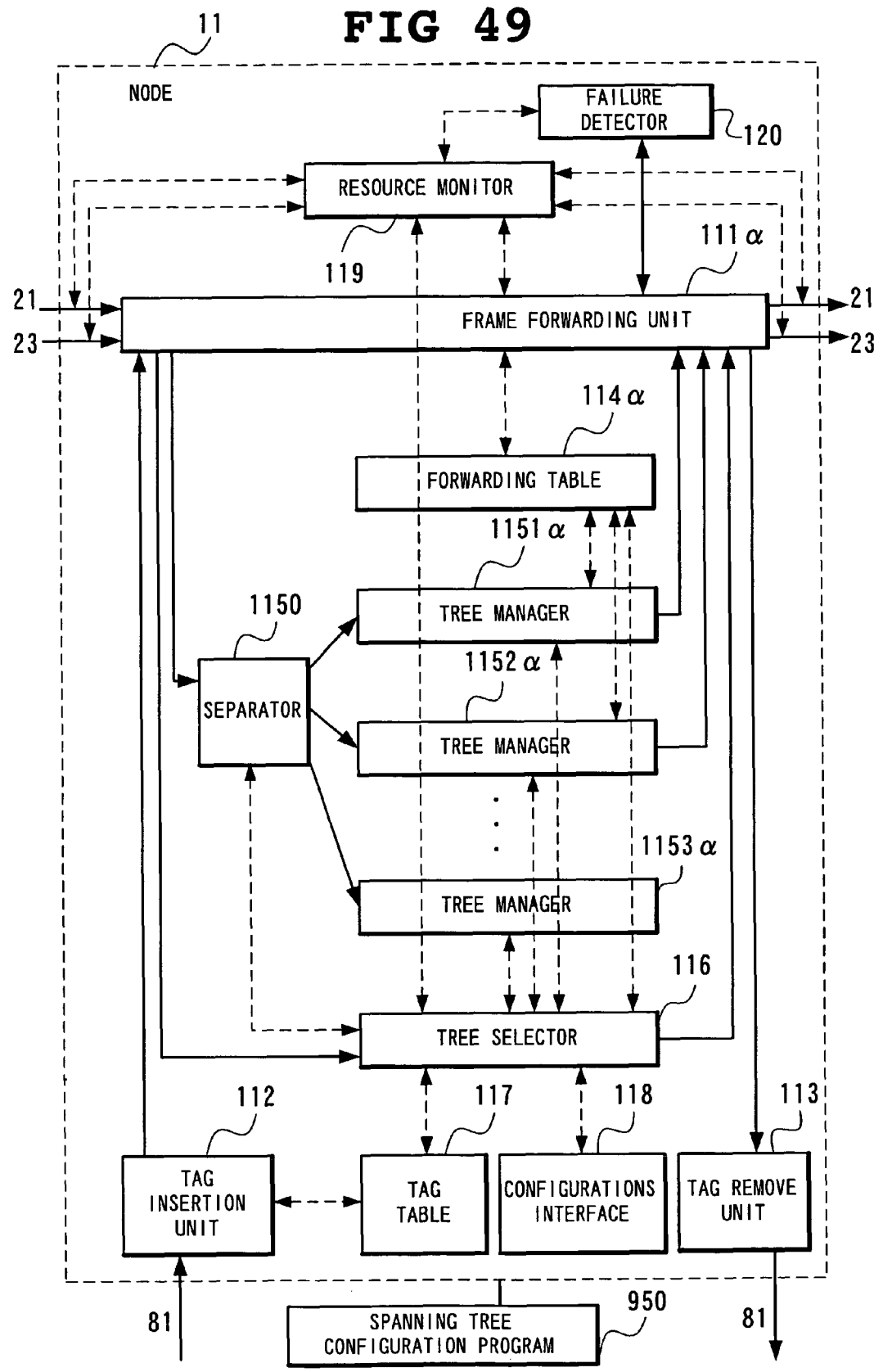
FIG. 49 is a block diagram illustrating the configuration of a node 11 in a tenth embodiment of the present invention.

By referring to FIG. 49, the eighth embodiment of the present invention is different from the fourth embodiment in that the frame forwarding unit 111 is replaced by a frame forwarding unit 111α, the forwarding table 114 is replaced by a forwarding table 114α, and the tree managers 1151-1153 are replaced by the tree managers 1151α-1153α, and that the failure detector 120 of the seventh embodiment is added, to FIG. 41 of the fourth embodiment.

FIG. 49 shows a case where the embodiment is applied to the node 11 shown in FIG. 23.

The frame forwarding unit 111α forwards a frame that has been received from the link 21 or the link 23, and the tag insertion unit 112, to the link 21 or the link 23 and the tag remove unit 113 or the tree selector 116 according to the description in the forwarding table 114α.

In so doing, if the resource monitor 119 has detected that there is a failure at the port written in the output port 1142 in the forwarding table 114α, the frame that has been received is forwarded to the port written in the auxiliary output port 1143. If the failure at the port written in the output port 1142 has been detected but the description of the auxiliary output port is the initial value (or not set), the frame that has been received is discarded.

The forwarding table 114α is a forwarding table consisting of the forwarding table 114 to which the auxiliary output port 1143 column has been added.

Although the tree manager 1151α has the same configuration as the tree manager 1151, its function and operation are different. Hereafter, although a description will be given using the tree manager 1151α as a representative of the tree managers 1151α-1153α, the description in regard to the tree manager 1151α is also applicable equally to the tree managers 1152α-1153α, unless otherwise noted.

Figures 50, 51:
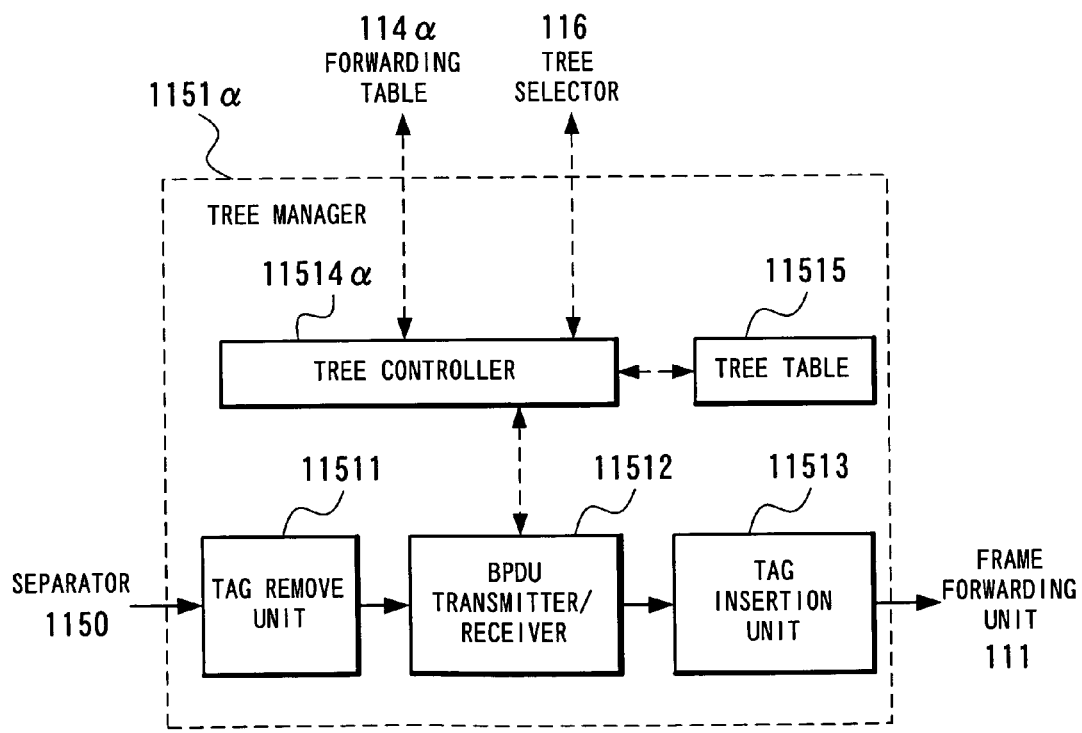
FIG. 50 is a table illustrating a configuration example of a forwarding table 114α in the tenth embodiment of the present invention.
FIG. 51 is a block diagram illustrating the configuration of a tree manager 1151α in the tenth embodiment of the present invention.

FIG. 50 is a configuration example of a forwarding table 114α of the node 12 in FIG. 23, in which an output port is determined by taking a tag as a key.

The tag field 1141 is the same tag field as the tag field in the forwarding table 114.

The output port 1142 is the same output port as the output port in the forwarding table 114.

The auxiliary output port 1143 is a field in which the output destination port is written, which is used in case the port written in the output port 1142 becomes unusable. When the frame forwarding unit 111α detects that the port written in the output port 1142 is unavailable, it forwards the frame to the port written in the entry of the auxiliary output port 1143.

FIG. 51 is a block diagram illustrating the configuration of the tree manager 1151α.

In the case that the tag of the tag group 41 has been added to the BPDU frame that the tree manager 1151α transmits/receives, the tree controller 11514α determines the Root Port and the Alternate Port according to the protocol of IEEE802.1w. In the embodiment, the Root Port that has been determined as the output port 1142 in the entry of the tag group 41 in the forwarding table 114α, and the Alternate Port that has been determined as the auxiliary output port 1143, are respectively set.

If no Root Ports exist, the column for the output port 1142 is set to a port directed to its own node, and the frame that is marked with the tag of the tag group 41 entered by the frame forwarding unit is forwarded to the tag remove unit 113.

If there are no Alternate Ports, the column of the auxiliary output port 1143 is set to the initial value of the table.

Next, using FIG. 23 and FIG. 52, an operation for forwarding a unicast frame in case a failure occurs at the link will be described by taking as an example a case in which a failure occurs at the link 21.

FIG. 52 is a table illustrating the setting of port of each node in a spanning tree 61 and the setting of the forwarding table.

It is assumed that in the initial state, the tree 61, which is the tree of the tag group 41, has already been constructed and is stable, that the Root Port and the Alternate Port of each of the nodes 11-16 have been determined as shown in the root port 6102 and the alternate port 6103 in FIG. 52, as a result, that the output port and the auxiliary output port in the forwarding table 114α of each of the nodes have been determined as shown in the output port 1142 and the auxiliary output port 1143 in FIG. 52.

First, the node 13 adds the tag of the tag group 41 to a unicast frame addressed to the node 11 and transmits it. In so doing, the port on the link 22 side, which is the root port of the tree 61, is specified as the output destination port of the frame of the tag group 41 in the node 13. Therefore, the frame is outputted to the link 22 side.

It is assumed that a failure occurs at the link 21 in this state.

Upon reception of the frame from the link 22, the node 12 searches the forwarding table by taking the tag group 41 as a key to obtain the port on the link 21 side as the output port and the port on the link 24 side as the auxiliary output port. Then attempt will be made to output the frame that has been received to the link 21 side, however, since the failure detection information of the link 21 has been received from the resource monitor, the frame that has been received is outputted to the link 24 side, which is the auxiliary output port.

Upon reception of the frame from the link 24, the node 15 searches the forwarding table by taking the tag group 41 as a key to obtain the port on the link 26 side as the output port and the port on the link 24 side as the auxiliary output port. It is then verified that there is no failure on the link 26 side, and the frame that has been received is outputted to the link 26 side.

Upon reception of the frame from the link 26, the node 14 searches the forwarding table by taking the tag group 41 as a key to obtain the port on the link 23 side as the output port, and the initial value as the auxiliary output port. It is then verified that there is no failure on the link 23 side, and the frame that has been received is outputted to the link 23 side.

Upon reception of the frame from the link 23, the node 11 checks that it is addressed to its own node, and forwards it to the tag remove unit 113.

Through the above operation, if a failure occurs at the link 21, the auxiliary output port that has been preset is referenced, a route that passes through the link 22, the link 23, the link 24, the link 26, and the link 23 is immediately selected as a route to forward the unicast frame from the node 13 to the node 11, and forwarding of frames to the node 11 continues. Thus, a rapid detour in the event of a failure is achieved, and congestion of the network can be avoided.

Next, the effect of the above tenth embodiment will be described.

In the past, although the path with the minimum cost to a destination was not always selected, in the embodiment, by forwarding the unicast frame using the tree whose destination serves as the root node, it is possible to select the path with the minimum cost to the destination.

Also, in the past, although there was the problem that the load would concentrate in the vicinity of the root node while the link utilization rate would be low, in the embodiment, by setting a plurality of systems of spanning trees that have different root nodes, it is possible to increase the utilization ratio of a link, and distribute the load without concentrating the load in the vicinity of the root node.

Also, in the past, although there was the problem that tree construction in the event of a root node failure would take time, the network being stopped during that period, in the embodiment, since forwarding frames by using the trees with the destination serving as the root node eliminates the fact that frames other than the frames whose destination serves as the root node cannot be forwarded for an extended time under the influence of the root node failure, it is possible to circumvent a network halt due to a root node failure. This also allows the probability of occurrence of congestion to be lowered.

Moreover, in the past, although there was the problems that switching of the output destination port in the event of a link failure on the root port side would take time, frame forwarding being stopped during that period, in the embodiment, by presetting in the forwarding table an auxiliary output link for use in the event of an output link failure, it is possible to make a rapid path change in the event of a failure at the root port side link, that is, the output link. This allows the probability of occurrence of congestion to be lowered.

Regarding the functions of each means that is a component of the spanning tree configuration node in the network of the present invention, it is obvious that it can be achieved through hardware, and it can also be achieved by loading the spanning tree reconfiguration program (application program) 950 that executes each means mentioned above into the memory of a computer processing unit to control the computer processing unit. The spanning tree reconfiguration program 950 is stored on a magnetic disk, a semiconductor memory, or other storage media, and loaded from the storage medium into the computer processing unit to control the operation of the computer processing unit, in order to achieve the functions.

Although the present invention has been described by illustrating preferred embodiments and examples, the present invention is not necessarily limited to the above embodiments and examples, and may be altered in many ways for implementation within the scope of the technical idea.

As described, according to the present invention, the following effects can be achieved.

First, it is possible to lower the probability of occurrence of congestion and reduce the frequency with which delayed arrival or loss of frames occurs due to congestion. The reason is that a spanning tree that includes a newly added node is generated while the spanning tree that existed before the configuration change continues to operate, switching of the spanning tree to be used after the new spanning tree has been stable is performed, and a plurality of systems of spanning trees that have different root nodes are set.

Second, it is possible to reconfigure the spanning tree, such as performing addition/remove of a node that belongs to the spanning tree, without stopping the network. The reason is that a spanning tree that includes a newly added node is generated while the spanning tree that existed before the configuration change continues to operate, and switching of the spanning tree to be used after the new spanning tree has been stable is performed.

Third, it is possible to distribute the traffic load. The reason is that the link cost is calculated based on dynamic information such as the free bandwidth and the load of the server.

Fourth, it is possible to distribute the load, without stopping the network for spanning tree reconfiguration concomitant to a path change. The reason is that a tree after change in cost is generated while the tree that existed before the change continues to operate, and switching of the tree to be used after a new spanning tree has been stable is performed.

Fifth, it is possible to select a path with the minimum cost to a destination. The reason is that the frame is forwarded using a tree whose destination serves as the root node.

Sixth, it is possible to increase the utilization ratio of a link, and distribute the load without concentrating the load in the vicinity of the root node. The reason is that a plurality of systems of spanning trees that have different root nodes are set.

Seventh, it is possible to circumvent a network halt due to root node failure. The reason is that forwarding frames by using a tree whose destination serves as the root node eliminates the fact that a frame other than the frame whose destination serves as the root node cannot be forwarded for an extended time under the influence of the root node failure.

Eighth, it is possible to prevent the spanning tree from being set by passing through the section that uses IEEE802.1D, accelerate switching and route changes in the event of a failure, and lower the possibilities of occurrence of congestion and loss of a frame. The reason is that the cost in the section that uses IEEE 802.1D is set to be higher to prevent the spanning tree from being set by passing through the section that uses IEEE802.1D.

Ninth, it is possible to accelerate a detour, and prevent the occurrence of congestion and loss of a frame. The reason is that as many tree managers as the number of sections that use IEEE 802.1D are created, a different tree is created for each of the sections that use IEEE 802.1D, in which the costs of the sections that use IEEE 802.1D are set to be higher, and, in case there is a need to detour the section due to a failure or the like, switching is performed to use the tree in which the higher cost is assigned to the section.

Tenth, in the past, since the transmission intervals of HELLO frames that are used by the spanning tree protocol were long, a failure could not be detected rapidly, however, by adding a failure detector which transmits/receives a frame for failure detection at short intervals, it is possible to detect a failure more rapidly than when using the HELLO frame. This also allows the possibilities of occurrence of congestion and loss of a frame to be lowered.

Eleventh, in the past, although the path with the minimum cost to a destination was not always selected when broadcasting, in the embodiment, by forwarding the broadcast frame using the tree whose source node serves as the root node, it is possible to select the path with the minimum cost to all the nodes to forward the broadcast frame.

Twelfth, since forwarding broadcast frames by using the trees with the source node serving as the root node eliminates the fact that broadcast frames other than the frame whose source node serves as the root node cannot be forwarded for an extended time under the influence of the root node failure, it is possible to circumvent a network halt due to the root node failure. This also allows the probability of occurrence of congestion to be lowered.

Thirteenth, in the past, although the path with the minimum cost to a destination was not always selected, by forwarding the unicast frame using the tree whose destination serves as the root node, it is possible to select the path with the minimum cost to the destination.

Fourteenth, in the past, although there was the problem that switching of the output destination port in the event of a link failure on the root port side would take time, frame forwarding being stopped during that period, in the present invention, by presetting in the forwarding table an auxiliary output link for use in the event of an output link failure, it is possible to make a rapid path change in the event of a failure at the root port side link, that is, the output link. This allows the probability of occurrence of congestion to be lowered.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A node that configures a spanning tree over a network to which a plurality of nodes are connected, the node comprising:

means for generating a new spanning tree after a network configuration change while continuing to operate only a spanning tree that existed before the network configuration change;

a stable timer that notifies of an expiration of a specified time indicating a stabilization of said new spanning tree; and means for switching the existed spanning tree to be used for forwarding to said new spanning tree only after receiving a notification of the expiration of the specified time from said stable timer.

2. The node as set forth in claim 1, wherein said network configuration change comprises an addition or a removal of a node or a change in a link topology.

3. A node that configures a spanning tree over a network to which a plurality of nodes are connected, the node comprising:

means for generating, at a time of a link cost change of the network, a new spanning tree after the cost change while continuing to operate an existing spanning tree;

a stable timer that notifies of an expiration of a specified time indicating of a stabilization of said new spanning tree; and means for switching the existing spanning tree to be used for forwarding to said new spanning tree only after receiving a notification of the expiration of the specified time from said stable timer.

4. The node as set forth in claim 3, wherein said link cost is calculated based on an availability status.

5. The node as set forth in claim 4, wherein said availability status is defined as a free bandwidth.

6. The node as set forth in claim 4, wherein said availability status is defined as a CPU (Central Processing Unit) load, said CPU load comprising a portion of a CPU capability being utilized.

7. A non-transitory computer-readable storage medium on which is encoded a spanning tree configuration program of machine-readable instructions that operates on each node that configures a spanning tree over a network to which a plurality of nodes are connected, said instructions comprising:
a function that generates a new spanning tree after a network configuration change while continuing to operate only a spanning tree that existed before the network configuration change; and
a function that switches the existed spanning tree to be used for forwarding to said new spanning tree only after receiving a notification of an expiration of a specified time from a stable timer that notifies of the expiration of the specified time indicating of a stabilization of said new spanning tree.

8. The non-transitory computer-readable storage medium on which is encoded a spanning tree configuration program as set forth in claim 7, wherein said network configuration change comprises an addition or a removal of a node or a change in a link topology.

9. A non-transitory computer-readable storage medium on which is encoded a spanning tree configuration program of machine-readable instructions that operates on each node that configures a spanning tree over a network to which a plurality of nodes are connected, said instructions comprising:
a function that generates, at a time of a link cost change of the network, a new spanning tree after the link cost change while continuing to operate only an existing spanning tree, and switches the existing spanning tree to be used for forwarding to said new spanning tree only after receiving a notification of an expiration of a specified time from a stable timer that notifies of the expiration of the specified time indicating a stabilization of said new spanning tree.

10. The computer-readable storage medium on which is encoded a spanning tree configuration program as set forth in claim 9, further comprising a function for executing a function that calculates the link cost based on an availability status.

11. The computer-readable storage medium on which is encoded a spanning tree configuration program as set forth in claim 10, wherein said availability status is defined as a free bandwidth.

12. The computer-readable storage medium on which is encoded a spanning tree configuration program as set forth in claim 10, wherein said availability status is defined as a CPU (Central Processing Unit) load, said CPU load comprising a portion of a CPU capability being utilized.

13. A network system in which a forwarding path is set by a spanning tree over a network to which a plurality of nodes are connected, wherein each of said nodes comprises:
means for generating a new spanning tree after a network configuration change while continuing to operate only a spanning tree that existed before the network configuration change;
a stable timer that notifies of an expiration of a specified time indicating of a stabilization of said new spanning tree; and
means for switching the existed spanning tree to be used for forwarding to said new spanning tree only after receiving a notification of the expiration of the specified time from the stable timer.

14. A network system in which a forwarding path is set by a spanning tree over a network to which a plurality of nodes are connected wherein
each of said nodes generates, at a time of a link cost change of the network, a new spanning tree after the link cost change while continuing to operate only an existing spanning tree, and switches the existing spanning tree to be used for forwarding to said new spanning tree only after receiving a notification of an expiration of a specified time from a stable timer that notifies of the expiration of the specified time indicating of a stabilization of said new spanning tree.

15. The network system as set forth in claim 14, wherein a link cost is calculated based on an availability status.

16. The network system as set forth in claim 14, wherein a tree manager that generates the spanning tree comprises a cost operator that adjusts a cost value based on a type and a version of a spanning tree protocol.

17. A spanning tree configuration method in a network to which a plurality of nodes are connected, the method comprising:
generating a new spanning tree after a network configuration change while continuing to operate only a spanning tree that existed before the network configuration change, and switching the existed spanning tree to be used for forwarding to said new spanning tree only after receiving a notification of an expiration of a specified time from a stable timer that notifies of the expiration of the specified time indicating of a stabilization of said new spanning tree.

18. The spanning tree configuration method as set forth in claim 17, further comprising:
creating a new tree after a change using an auxiliary system, wherein the network continues to use only an existing spanning tree while said new spanning tree is being created, when a network configuration has changed.

19. A spanning tree configuration method in a network to which a plurality of nodes are connected, the method comprising:
generating, at a time of a link cost change of the network, a new spanning tree after the link cost change while continuing to operate only an existing spanning tree, and switching the existing spanning tree to be used for forwarding to said new spanning tree only after receiving a notification of an expiration of a specified time from a stable timer that notifies of the expiration of the specified time indicating of a stabilization of said new spanning tree.

20. The spanning tree configuration method as set forth in claim 19, further comprising:
using a link free bandwidth to calculate a cost of a spanning tree; and
selecting a spanning tree based on said cost.

21. A method of forming a logical topology that is used for signal transmission in a network to which a plurality of nodes are connected, the method comprising:
generating a logical topology after a network configuration change with a signal transmission being performed using only a logical topology that existed before the network configuration change; and only after the logical topology generated after receiving a notification of an expiration of a specified time from a stable timer that notifies of the expiration of the specified time indicating of a stabilization of the logical topology, switching the existed logical topology to be used for signal transmission to the logical topology generated after said network configuration change.

22. A node comprising:
an element which generates a logical topology after a network configuration change, when changing a configuration of said network to which said element belongs itself, with a signal transmission being performed using an existing logical topology in said network;
a stable timer that notifies of an expiration of a specified time indicating of a stabilization of the logical topology, and
an element which switches, only after receiving the notification of the expiration of the specified time from said stable timer, the existing logical topology to be used for signal transmission to the logical topology generated after said configuration change.

23. A non-transitory computer-readable storage medium on which is encoded a program comprising:
a function of generating a logical topology after a network configuration change, when changing the configuration of said network to which said non-transitory computer-readable storage medium belongs itself, with a signal transmission being performed using an existing logical topology in said network; and
a function of switching, only after receiving a notification of an expiration of a specified time from a stable timer that notifies of the expiration of the specified time indicating of a stabilization of the logical topology, the existing logical topology to be used for signal transmission to the logical topology generated after said configuration change.

24. A network system to which a plurality of nodes are connected, the network system comprising:
a tree manager generating a logical topology after a network configuration change with a signal transmission being performed using a logical topology that existed before the network configuration change, and only after receiving a notification of an expiration of a specified time from a stable timer that notifies of the expiration of the specified time indicating of a stabilization of the logical topology, switching the existed logical topology to be used for signal transmission to the logical topology generated after said network configuration change.

* * * * *